(12) United States Patent
Ito et al.

(10) Patent No.: US 8,885,922 B2
(45) Date of Patent: Nov. 11, 2014

(54) IMAGE PROCESSING APPARATUS, IMAGE PROCESSING METHOD, AND PROGRAM

(75) Inventors: Atsushi Ito, Tokyo (JP); Seiji Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 205 days.

(21) Appl. No.: 13/491,023

(22) Filed: Jun. 7, 2012

(65) Prior Publication Data

US 2012/0321171 A1 Dec. 20, 2012

(30) Foreign Application Priority Data

Jun. 17, 2011 (JP) ................................. 2011-134929

(51) Int. Cl.
*G06K 9/00* (2006.01)
*H04N 13/00* (2006.01)
*H04N 13/02* (2006.01)

(52) U.S. Cl.
CPC ....... *H04N 13/0011* (2013.01); *H04N 13/0022* (2013.01); *H04N 13/0033* (2013.01); *H04N 13/0239* (2013.01)
USPC .............. 382/154; 382/117; 382/172; 348/42

(58) Field of Classification Search
CPC ................ G06T 7/0075; G06T 7/0077; G06T 2207/10012; G06T 2207/10021; G06T 7/0022; H04N 13/0239; H04N 2013/0081; H04N 2013/0074; H04N 13/0055; H04N 19/00769

USPC ....... 382/154, 117, 172; 348/43, E13, 6, 761, 348/42
See application file for complete search history.

(56) References Cited

U.S. PATENT DOCUMENTS

| 7,079,710 | B2 * | 7/2006 | Nagashima et al. | 382/300 |
|---|---|---|---|---|
| 7,605,776 | B2 * | 10/2009 | Satoh et al. | 345/9 |
| 7,773,799 | B2 * | 8/2010 | Oldroyd | 382/154 |
| 8,373,745 | B2 * | 2/2013 | Masuda et al. | 348/46 |
| 2012/0307023 | A1 * | 12/2012 | Freiburg et al. | 348/51 |

FOREIGN PATENT DOCUMENTS

| JP | 08-030806 | 2/1996 |
|---|---|---|
| JP | 2005-151534 | 6/2005 |

* cited by examiner

*Primary Examiner* — Sheela Chawan
(74) *Attorney, Agent, or Firm* — Sherr & Jiang, PLLC

(57) ABSTRACT

Provided is an image processing apparatus including an image input unit configured to receive at least one of a first left eye image and a first right eye image photographed from different viewpoints and applicable to stereoscopic vision, and a stereoscopic image generation processing unit configured to receive one of the first left eye image and the first right eye image and generate a second left eye image and a second right eye image applicable to the stereoscopic vision through an image conversion process. Among the first left eye image and the first right eye image input to the image input unit and the second left eye image and the second right eye image generated by the stereoscopic image generation processing unit, two images are output as images to be applied to the stereoscopic vision.

11 Claims, 32 Drawing Sheets

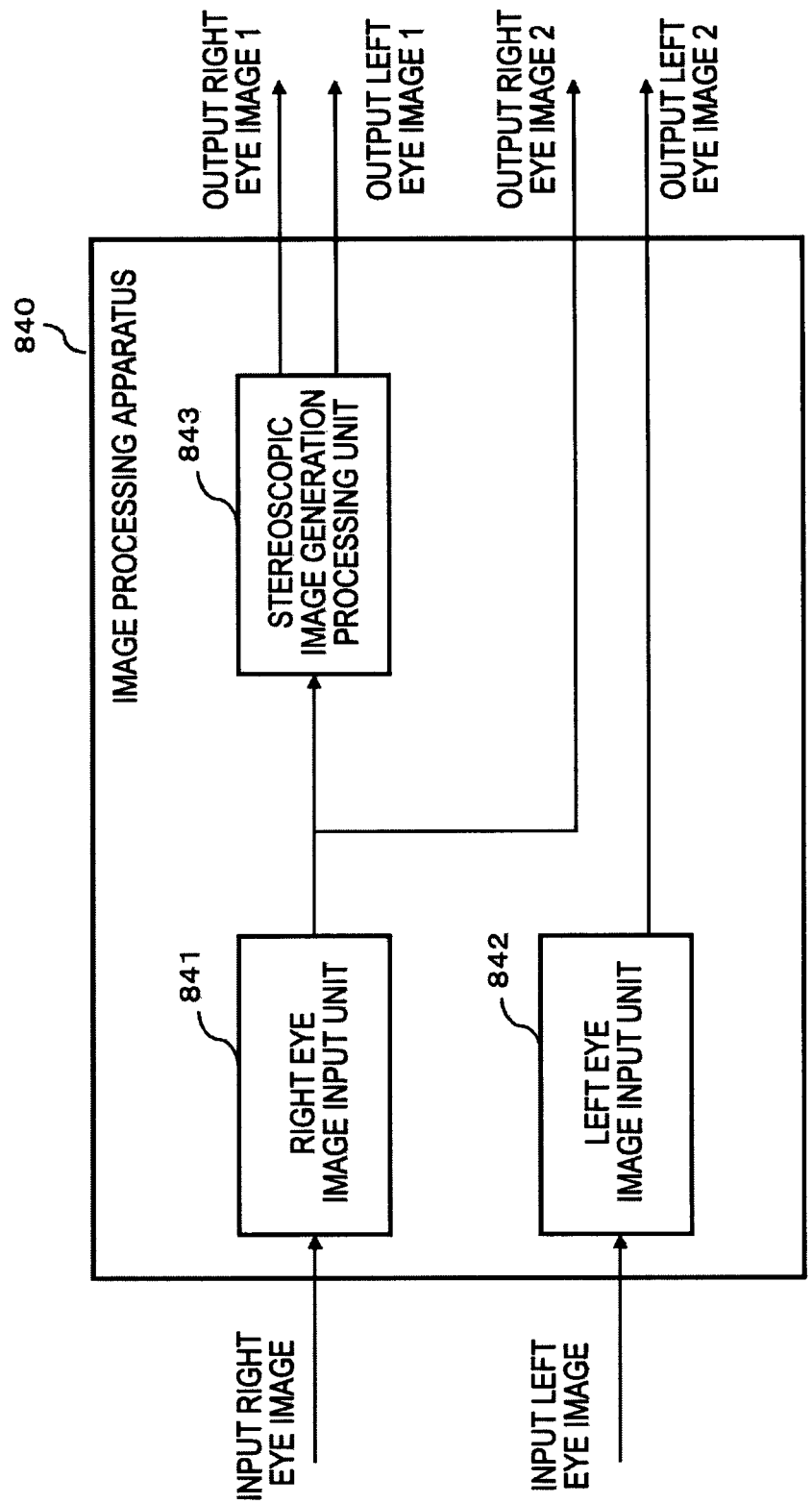

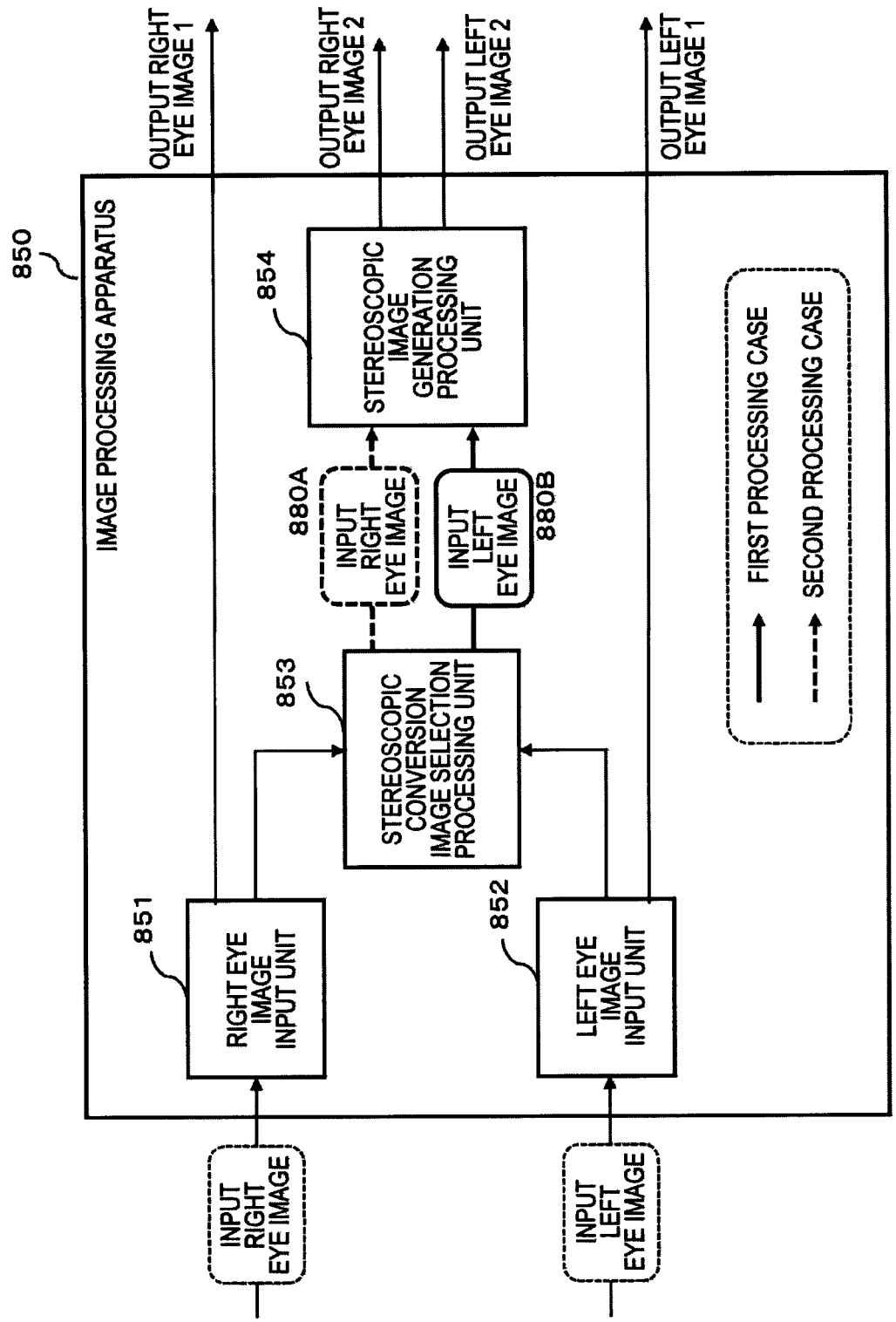

IMAGE PROCESSING APPARATUS, IMAGE PROCESSING METHOD, AND PROGRAM

BACKGROUND

The present disclosure relates to an image processing apparatus, an image processing method, and a program, and more particularly, to an image processing apparatus, an image processing method, and a program, by which it is possible to generate a three-dimensional image (a 3D image) which can be stereoscopically viewed.

An image corresponding to stereoscopic vision visible as a stereoscopic image having a depth includes a combination of two images, that is, a left eye image and a right eye image, which are images from different viewpoints. In order to obtain these images from two viewpoints, that is, a binocular parallax image, for example, two imaging apparatuses are separated from each other from side to side to perform imaging.

A pair of captured stereoscopic images include pair images, that is, a left eye image captured by a left imaging apparatus and observed by the left eye and a right eye image captured by a right imaging apparatus and observed by the right eye.

The stereoscopic image pair including the pair of the left eye image and the right eye image is displayed on a display apparatus capable of providing the left eye image and the right eye image to the left eye and the right eye of an observer by separating the left eye image from the right eye image, so that it is possible for the observer to view the image as a stereoscopic image.

Meanwhile, in the related art, there have been proposed various configurations for generating a binocular parallax image including a left eye image and a right eye image corresponding to stereoscopic vision using a normal two-dimensional image photographed from one viewpoint.

For example, Japanese Unexamined Patent Application Publication No. 8-30806 has disclosed an apparatus which shifts a left eye image and a right eye image in a horizontal direction by a predetermined amount with respect to a still image or an image with small motion, thereby allowing the image to be recognized as standing out.

Furthermore, Japanese Unexamined Patent Application Publication No. 2005-151534 has disclosed a method of calculating feature amounts of an upper portion and a lower portion of an image and adjusting a combination rate of a plurality of scene structures indicating depth information prepared in advance, thereby expressing an image by a combination of simple structures.

When a stereoscopic image is captured using a binocular imaging system, a base line length and a convergence angle are important factors for determining a binocular parallax value. The base line length denotes a distance between two imaging apparatuses and the convergence angle denotes directions of the two imaging apparatuses.

FIG. 1 illustrates stereoscopic imaging systems having different convergence angles based on the same base line length.

In three binocular imaging systems (a), (b), and (c) illustrated in FIG. 1, the base line lengths are all L and the convergence angles are parallel view, 15°, and 30°.

As the base line length is increased, a binocular parallax value of the right and left images is increased. The convergence angle corresponds to a point at which the binocular parallax value of the right and left images is 0 with respect to an object positioned at an intersection point of convergence, and a binocular parallax of both eyes is increased the farther an object is from the intersection point of convergence.

Therefore, when an object is far from the imaging system (a camera) as illustrated in FIG. 1(a), imaging is properly performed in the state in which the base line length is long and the convergence angle is small (approximate to parallel view).

Meanwhile, when an object is near the imaging system as illustrated in FIG. 1(c), it is commonly considered that imaging is properly performed in the state in which the base line length is short and the convergence angle is large.

However, adjusting the base line length and the convergence angle for each object to be captured is problematic because much time and effort are necessary. Although this is possible for professional imaging in which time may be spent for the adjustment, in general imaging use, fixed base line length and convergence angle are generally used. In addition, in order to make the binocular imaging apparatuses suitable for imaging an object in a wider range, there are many binocular imaging apparatuses configured to have conditions in which the base line length has a predetermined value or more and the convergence angle is as small as possible. These imaging apparatuses are not suitable for imaging an object at a near distance and various problems occur at the time of the imaging as described above.

FIG. 2 illustrates an example of stereoscopic imaging performed by a binocular imaging system A (10) and a binocular imaging system B (20) which have different distances from an object.

The binocular imaging system A (10) is far the object and the binocular imaging system B (20) is near from the object. In both of the imaging systems, a base line length and a convergence angle are equal to each other.

FIG. 3 illustrates images as imaging results by the binocular imaging system A (10) and the binocular imaging system B (20) illustrated in FIG. 2.

FIG. 3(a) illustrates images captured by the binocular imaging system A (10) and FIG. 3(b) illustrates images captured by the binocular imaging system B (20).

FIG. 3(b), which illustrates the images captured by the binocular imaging system B (20) near the object, shows a large parallax value between the right and left images, as compared with FIG. 3(a) which illustrates the images captured by the binocular imaging system A (10) far from an object. This is apparent if areas at which the objects are positioned in the images are compared with each other from side to side.

The images illustrated in FIG. 3(b) are in a state in which a retinal image difference is very large, and cause discomfort and fatigue when the images are observed.

Moreover, in the images illustrated in FIG. 3(b), areas not reflected on one of the left eye image and the right eye image are reflected on the other one, that is, many occlusion areas are generated, as compared with the two images illustrated in FIG. 3(a).

For example, in the image pair illustrated in FIG. 3(b), the lights of a car or the windows of a building shown in the left eye image are not shown in the right image. Furthermore, the trunk of a tree shown in the right eye image is not shown in the left image, and many such occlusion areas are generated.

As illustrated in FIG. 3(b), when an image in which the difference between the right and left retinal images has a predetermined value or more, or an image in which occlusion areas are generated is observed by an observer through stereoscopic vision, the observer may feel discomfort or fatigue of eyes in many cases. On the other hand, when such a phenomenon is minimal as illustrated in FIG. 3(a), comfortable stereoscopic vision can be obtained.

The processes described with reference to FIG. 1 to FIG. 3 correspond to processing examples when photographed images from two different viewpoints are used as stereoscopic vision images.

Meanwhile, as simply described above, there is a configuration in which two images having pseudo-parallax are generated by image processing based on one image, and are used as stereoscopic vision images. That is, it denotes a process in which a 2D/3D conversion process is performed on one 2D image photographed by a general camera to generate a left eye image and a right eye image.

Since the 2D/3D conversion processes generate right and left parallax images from information on one image, there is a general problem that a retinal image difference is small and a stereoscopic effect recognized by an observer is reduced. However, there is a low probability of discomfort or fatigue of eyes due to a large retinal image difference or an occlusion area.

FIG. 4 is a diagram illustrating a process for performing a 2D/3D conversion process on one left eye image photographed by the binocular imaging system B (20) illustrated in FIG. 2 to generate a left eye image and a right eye image as stereoscopic images, and the processing result.

FIG. 4(b) at an upper portion of FIG. 4 is the same as FIG. 3(b) and illustrates two images captured by the binocular imaging system B (20) illustrated in FIG. 2. Meanwhile, FIG. 4(c) at a lower portion of FIG. 4 illustrates the left eye image and the right eye image generated by performing the 2D/3D conversion process on the left eye image which is one image of FIG. 4(b).

The left eye image and the right eye image of FIG. 4(c) generated through the 2D/3D conversion process have no large retinal image difference or occlusion area, as compared with the left eye image and the right eye image of FIG. 4(b) photographed by the binocular imaging system B (20).

An observer observing the image illustrated in FIG. 4(c) can feel comfortable stereoscopic vision without feeling fatigue or discomfort.

As described above, when an imaging apparatus is near an object, if an image photographed by the imaging apparatus is used as a stereoscopic image without any image conversion process, an observer may feel discomfort or fatigue. Meanwhile, when an image generated through the 2D/3D conversion process (stereoscopic conversion) for converting a two-dimensional image to a binocular parallax image is used, it is possible to adjust parallax and to generate an image not causing the above-mentioned discomfort or fatigue.

However, an image generated from one image through the 2D/3D conversion process is an image having pseudo-parallax. For example, when an imaging apparatus is positioned at a predetermined distance or more from an object, display is performed using a stereoscopic image photographed using a binocular imaging system, thereby obtaining an image correctly reflecting an actual distance and achieving comfortable stereoscopic vision.

As described above, depending on the situation, either of display, without any image conversion process, using a left eye image and a right eye image photographed by a binocular imaging system and display using a 2D/3D conversion image generated from one image may be preferable.

SUMMARY

In light of the foregoing, it is desirable to provide an image processing apparatus, an image processing method, and a program, by which it is possible to provide a binocular parallax image corresponding to comfortable stereoscopic vision whether an image apparatus is near or far from an object.

According to a first embodiment of the present disclosure, there is provided an image processing apparatus including an image input unit configured to receive at least one of a first left eye image and a first right eye image photographed from different viewpoints and applicable to stereoscopic vision, and a stereoscopic image generation processing unit configured to receive one of the first left eye image and the first right eye image and generate a second left eye image and a second right eye image applicable to the stereoscopic vision through an image conversion process. Among the first left eye image and the first right eye image input to the image input unit and the second left eye image and the second right eye image generated by the stereoscopic image generation processing unit, two images may be output as images to be applied to the stereoscopic vision.

Further, according to the first embodiment, the image processing apparatus may include an output image selection processing unit configured to select two images to be applied to the stereoscopic vision as output images from the first left eye image and the first right eye image input to the image input unit and the second left eye image and the second right eye image generated by the stereoscopic image generation processing unit.

Further, according to the first embodiment, the image processing apparatus may include a depth map generation processing unit configured to receive the first left eye image and the first right eye image, calculate object distances photographed in the images based on analysis of the two input images, generate a depth map having distance information corresponding to a pixel area, and output the depth map to the output image selection processing unit.

Further, according to the first embodiment, the output image selection processing unit may select the first left eye image and the first right eye image input to the image input unit as the output images when it is determined that the object distance is relatively longer based on the depth map, and the second left eye image and the second right eye image generated by the stereoscopic image generation processing unit as the output images when it is determined that the object distance is relatively shorter based on the depth map.

Further, according to the first embodiment, the output image selection processing unit may select the first left eye image and the first right eye image input to the image input unit as the output images when it is determined that the object distance is relatively longer based on the depth map, the second left eye image and the second right eye image generated by the stereoscopic image generation processing unit as the output images when it is determined that the object distance is relatively shorter based on the depth map, and one of the first left eye image and the first right eye image input to the image input unit and one of the second left eye image and the second right eye image generated by the stereoscopic image generation processing unit as the output images when it is determined that the object distance is approximately intermediate based on the depth map.

Further, according to the first embodiment, the output image selection processing unit may be configured to select the output images based on at least one of imaging information from an imaging apparatus and user selection information.

Further, according to the first embodiment, the image processing apparatus may include an input image selection processing unit configured to control images, which are to be input from an exterior, according to output images from the image processing apparatus. When the output images from the image processing apparatus are the second left eye image and the second right eye image generated by the stereoscopic image generation processing unit, the input image selection processing unit may perform control of receiving only one of the first left eye image and the first right eye image photographed from different viewpoints and applicable to the stereoscopic vision.

Further, according to the first embodiment, when the output images from the image processing apparatus are the second left eye image and the second right eye image generated by the stereoscopic image generation processing unit, the input image selection processing unit may output a control signal for allowing only one of the first left eye image and the first right eye image photographed from different viewpoints and applicable to the stereoscopic vision to be photographed by an imaging apparatus.

Further, according to the first embodiment, the stereoscopic image generation processing unit may generate the second left eye image and the second right eye image applicable to the stereoscopic vision by performing an image conversion process on one of the first left eye image and the first right eye image, which is selected based on a result of an image evaluation process.

According to the second embodiment of the present disclosure, there is provided an image processing method performed in an image processing apparatus, the image processing method including receiving at least one of a first left eye image and a first right eye image photographed from different viewpoints and applicable to stereoscopic vision, receiving one of the first left eye image and the first right eye image and generating a second left eye image and a second right eye image applicable to the stereoscopic vision through an image conversion process, and outputting two images as images to be applied to the stereoscopic vision from the first left eye image and the first right eye image input in the image input step and the second left eye image and the second right eye image generated by a stereoscopic image generation processing unit.

According to the third embodiment of the present disclosure, there is provided a program for causing an image processing apparatus to perform image processing including receiving at least one of a first left eye image and a first right eye image photographed from different viewpoints and applicable to stereoscopic vision, receiving one of the first left eye image and the first right eye image and generating a second left eye image and a second right eye image applicable to the stereoscopic vision through an image conversion process, and outputting two images as images to be applied to the stereoscopic vision from the first left eye image and the first right eye image input in the image input step and the second left eye image and the second right eye image generated by a stereoscopic image generation processing unit.

In addition, for example, the program of the present disclosure is a program which is provided to an information processing apparatus or a computer system, which can execute various program codes, through, for example, a recording medium. This program is executed by a program execution unit on the information processing apparatus or the computer system, so that processing corresponding to the program is performed.

It should be noted that other purposes, features or advantages of the present disclosure are apparent from more detailed description based on embodiments of the present disclosure, which will be described later, or the accompanying drawings. In addition, a system in the present specification corresponds to a logical aggregation configuration of a plurality of apparatuses and the apparatus of each configuration may not be in the same housing.

According to the configuration of an embodiment of the present disclosure, a configuration for selecting and outputting images suitable for stereoscopic vision is realized.

In detail, the configuration includes an image input unit configured to receive at least one of a first left eye image and a first right eye image photographed from different viewpoints and applicable to stereoscopic vision, and a stereoscopic image generation processing unit configured to receive one of the first left eye image and the first right eye image and generate a second left eye image and a second right eye image applicable to the stereoscopic vision through an image conversion process, wherein when it is determined that an object distance is relatively longer based on a depth map having distance information corresponding to a pixel area, the first left eye image and the first right eye image input to the image input unit are selected and output as output images. Furthermore, when it is determined that the object distance is relatively shorter, the second left eye image and the second right eye image generated by the stereoscopic image generation processing unit are selected and output as the output images.

With such a configuration, it is possible to reduce fatigue due to a very large parallax when the stereoscopic vision is obtained, or discomfort due to occlusion, and thus comfortable stereoscopic vision can be realized.

BRIEF DESCRIPTION OF THE DRAWINGS

FIG. 31 is a diagram for explaining a configuration example in which an image input to a stereoscopic image generation processing unit is set as a right eye image, and a 2D/3D conversion process is performed based on the right eye image to generate a stereoscopic image; and FIG. 32 is a diagram for explaining a configuration example in which a stereoscopic conversion image selection processing unit is set, and it is possible to select whether an image input to a stereoscopic image generation processing unit is set as a right eye image or a left eye image.

DETAILED DESCRIPTION OF THE EMBODIMENT(S)

Figure 1:
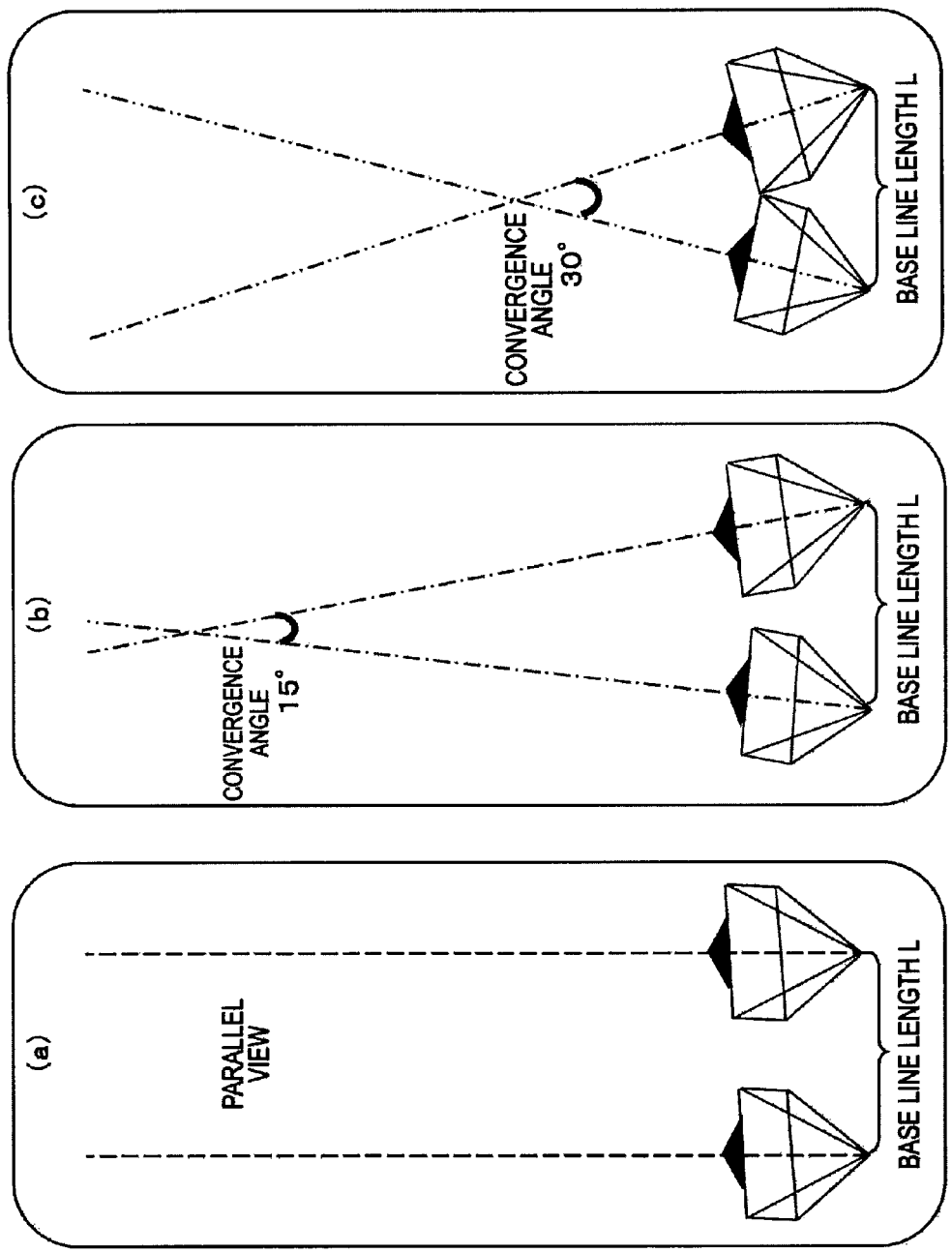
FIG. 1 is a diagram for explaining stereoscopic imaging systems having different convergence angles based on the same base line length.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, details of an image processing apparatus, an image processing method, and a program of the present disclosure will be described with reference to the accompanying drawings. In addition, the description will be given in the following order.

1. Configuration and Processing Example (First Embodiment) of Image Processing Apparatus of the Present Disclosure 1-1. Entire Configuration and Processing of Image Processing Apparatus
1-2. Details of Processing of Depth Map Generation Processing Unit
1-3. 2D/3D Conversion Process Performed by Stereoscopic Image Generation Processing Unit
1-4. Details of Selection Process of Output Stereoscopic Image Pair Performed by Output Image Selection Processing Unit 2. Other Embodiments 2-1. Configuration Example of Minimum Element
2-2. Configuration Example in which Output Image Selection Processing Unit is Omitted
2-3. Configuration Example in which Depth Map is not Applied in Output Image Selection Processing Unit
2-4. Configuration Example in which Output Image Selection is Performed based on Imaging Information
2-5. Configuration Example in which Output Image Selection is Performed based on User Selection Information
2-6. Configuration Example in which Depth Map Generation Processing Unit is Omitted 3. Embodiment having Configuration for Controlling Input Image to Image Processing Apparatus 3-1. Configuration Example in which Input Image Selection is Performed before Input Process
3-2. Configuration Example in which Input Image Selection is Performed before Imaging 4. Conclusion of Configuration of the Present Disclosure 1. Configuration and Processing Example First Embodiment of Image Processing Apparatus of the Present Disclosure The configuration and processing example (first embodiment) of the image processing apparatus of the present disclosure will be described with reference to FIG. 5.

In addition, the entire configuration and processing of the image processing apparatus will be first described and then details of processing of each element will be described.

(1-1. Entire Configuration and Processing of Image Processing Apparatus)

Figure 5:
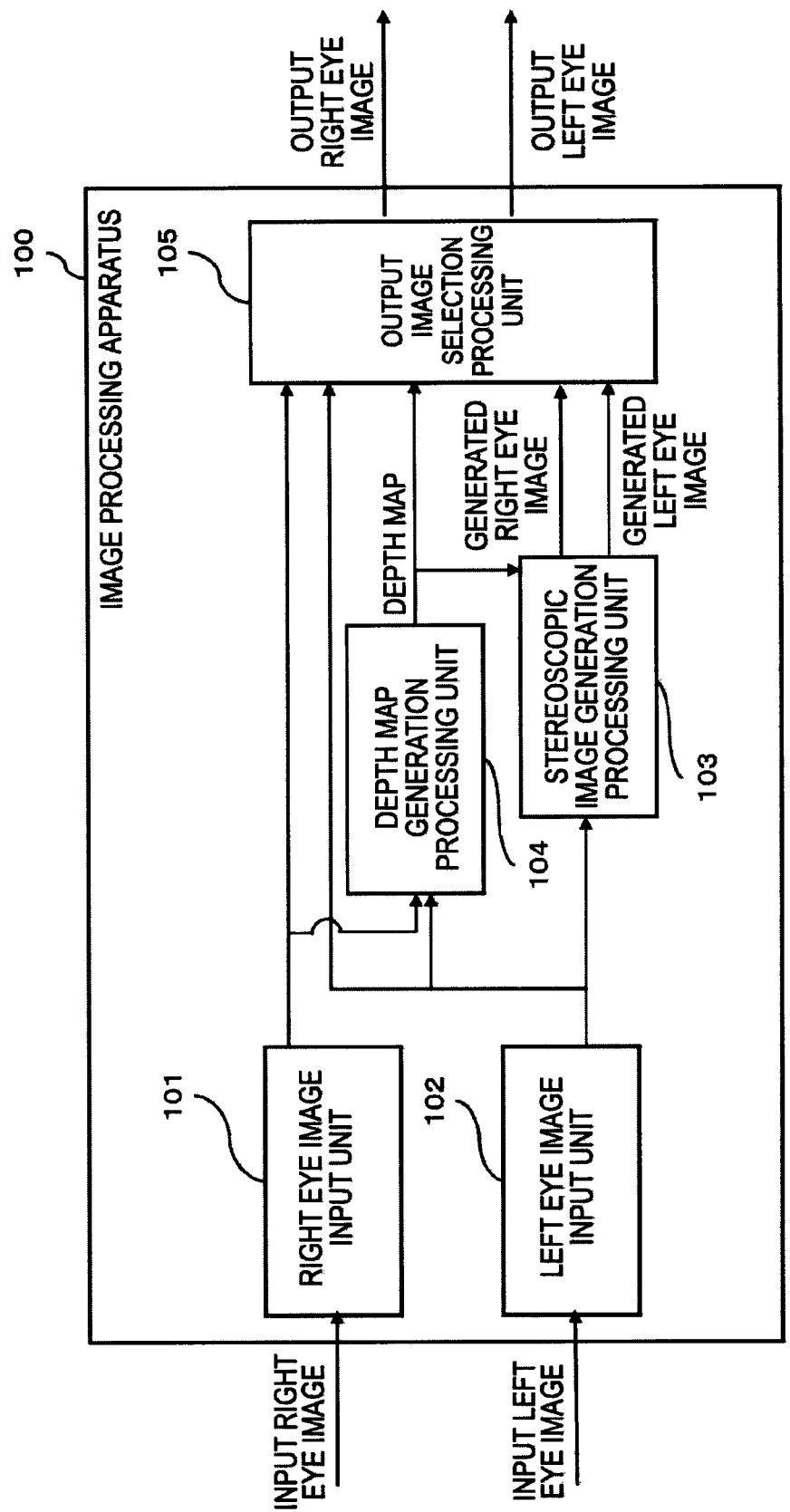
FIG. 5 is a diagram illustrating a configuration example of an imaging apparatus as an embodiment of an image processing apparatus of the present disclosure.

With reference to FIG. 5 and subsequent drawings, the configuration and the processing example (the first embodiment) of the image processing apparatus of the present disclosure will be described.

FIG. 5 is a diagram illustrating a configuration example of an imaging apparatus as an embodiment of the image processing apparatus of the present disclosure.

An image processing apparatus 100 includes a right eye image input unit 101, a left eye image input unit 102, a stereoscopic image generation processing unit 103, a depth map generation processing unit 104, and an output image selection processing unit 105.

The image processing apparatus 100 receives a binocular stereoscopic image signal. The input image signal includes right and left stereoscopic images captured by a right and left pair of imaging systems, that is, an input right eye image and an input left eye image. For example, the image processing apparatus 100 receives a pair of two images captured by the binocular imaging system A (10) and the binocular imaging system B (20) of FIG. 2 from two different viewpoints.

These input right eye image and input left eye image are input to the right eye image input unit 101 and the left eye image input unit 102, respectively.

The right and left stereoscopic images, which have been input to the right eye image input unit 101 and the left eye image input unit 102 of the image processing apparatus 100, are input to the depth map generation processing unit 104.

The depth map generation processing unit 104 performs a stereoscopic matching process on the two input images, and calculates the distance (depth) to an object from each pixel position based on a shift amount of each corresponding pixel position, that is, an object distance from a camera.

The depth map generation processing unit 104 generates and outputs a depth map in which distance information has been associated with pixels of the input images.

The depth map includes data indicating an object distance (a distance from a camera) of pixels constituting an image with respect to an object, and for example, includes an image, which includes luminance information set by converting information on a distance to an object from each pixel of an image, and the like.

In detail, for example, an image including pixels set as follows is used as a depth map:
 a pixel having an object with a short object distance (near a camera) is set as a high luminance pixel (a bright pixel); and
 a pixel having an object with a long object distance (far from the camera) is set as a low luminance pixel (a dark pixel).

As described above, the depth map includes data in which the object distance included in the image is held as data corresponding to pixels, and in detail, for example, is generated as image data obtained by converting the object distance into pixel values.

One of the right and left stereoscopic images input to the image processing apparatus 100, that is, the input left eye image, is input to the stereoscopic image generation processing unit 103. Furthermore, the depth map generated by the depth map generation processing unit 104 is also input to the stereoscopic image generation processing unit 103.

The stereoscopic image generation processing unit 103 generates a right eye image and a left eye image, which constitute a stereoscopic image, through a 2D/3D conversion process using the one input image (the input left eye image in the present example).

That is, the stereoscopic image generation processing unit 103 performs the 2D/3D conversion process for generating the right eye image and the left eye image, which have parallax corresponding to distance (depth) information, with respect to the 2D image, and generates and outputs the generated right eye image and the generated left eye image illustrated as the output of the stereoscopic image generation processing unit 103 of FIG. 5.

The stereoscopic image generation processing unit 103 generates the right eye image and the left eye image, which constitute the stereoscopic image, from the one input image through the 2D/3D conversion process using the depth map.

The stereoscopic image generation processing unit 103 generates and outputs the right eye image and the left eye image which have parallax corresponding to object distance information of a pixel area unit obtained from the depth map.

The generated right eye image and the generated left eye image, which have been generated by the stereoscopic image generation processing unit 103, are input to the output image selection processing unit 105.

The output image selection processing unit 105 also receives the right and left stereoscopic images input to the image processing apparatus 100, that is, the input right eye image and the input left eye image photographed by the binocular imaging systems.

Furthermore, the depth map, which is output from the depth map generation processing unit 104, is also input to the output image selection processing unit 105.

The output image selection processing unit 105 selects stereoscopic images which are to be the output image of the image processing apparatus 100, that is, an output right eye image and an output left eye image. In detail, the output image selection processing unit 105 selects a stereoscopic image pair (a) or (b) to be output:
 (a) a stereoscopic image pair of the input right eye image and the input left eye image photographed by the binocular imaging system and input to the image processing apparatus 100; or
 (b) a stereoscopic image pair of the generated right eye image and the generated left eye image generated by the stereoscopic image generation processing unit 103 through the 2D/3D conversion process.

The selected stereoscopic image pair is the output right eye image and the output left eye image which are output from the image processing apparatus 100.

The depth map is used for an image pair selection process in the output image selection processing unit 105.

In detail, for example, when it is determined that an object distance included in the entire image is relatively long based on the depth map, (a) the output image selection processing unit 105 selects and outputs the stereoscopic image pair of the input right eye image and the input left eye image input to the image processing apparatus 100.

Furthermore, when it is determined that an object distance included in the entire image is relatively short based on the depth map, (b) the output image selection processing unit 105 selects and outputs the stereoscopic image pair of the generated right eye image and the generated left eye image generated by the stereoscopic image generation processing unit 103.

So far, the entire process of the image processing apparatus 100 illustrated in FIG. 5 has been described.

Hereinafter, details of the processing of each element of the image processing apparatus 100 illustrated in FIG. 5 will be described.

(1-2. Details of Processing of Depth Map Generation Processing Unit)

Next, details of processing of the depth map generation processing unit 104 will be described. As described above, the depth map generation processing unit 104 performs a stereoscopic matching process on the two input images photographed from different viewpoints, calculates a distance (depth) to an object from each pixel position based on a shift amount of each corresponding pixel position, that is, an object distance from a camera, and generates and outputs a depth map in which distance information has been associated with pixels of the input images.

In addition, the depth map generation process through the stereoscopic matching is well known in the related art. The correspondence between images obtained from a plurality of different viewpoints is achieved, so that it is possible to calculate the distance to an object in an image from a camera. Many techniques for obtaining the correspondence between images obtained from the plurality of different viewpoints with high accuracy at a high speed have been proposed.

For example, as a technique for obtaining the correspondence between images with high accuracy, Japanese Unexamined Patent Application Publication No. 2003-085566 has disclosed a technique of assigning optimal correspondence to a pixel array on a horizontal scanning line based on a Viterbi algorithm, which is a kind of dynamic programming.

Furthermore, as a technique for obtaining the correspondence between images at a high speed, Japanese Unexamined Patent Application Publication No. 07-103734 has disclosed a technique of reducing an image to form a layered structure, transmitting a correspondence detection result in a layer with a low resolution to a layer with a high resolution, and reducing a correspondence detection process in the layer with a high resolution.

The depth map generation processing unit 104 illustrated in FIG. 5, for example, calculates the object distance from the camera based on the two input images photographed from different viewpoints by employing the existing technique as described above, and generates and outputs a depth map in which distance information has been associated with pixels of the input images.

(1-3. 2D/3D Conversion Process Performed by Stereoscopic Image Generation Processing Unit)

Next, details of the process performed by the stereoscopic image generation processing unit 103 illustrated in FIG. 5 will be described.

As described above, the stereoscopic image generation processing unit 103 generates the right eye image and the left eye image, which constitute the stereoscopic image, from the one input image through the 2D/3D conversion process using the depth map.

The stereoscopic image generation processing unit 103 generates and outputs the right eye image and the left eye image which have parallax (a shift amount) corresponding to object distance information of a pixel area unit obtained from the depth map.

A detailed example of the 2D/3D conversion process performed by the stereoscopic image generation processing unit 103 will be described.

Figure 6:
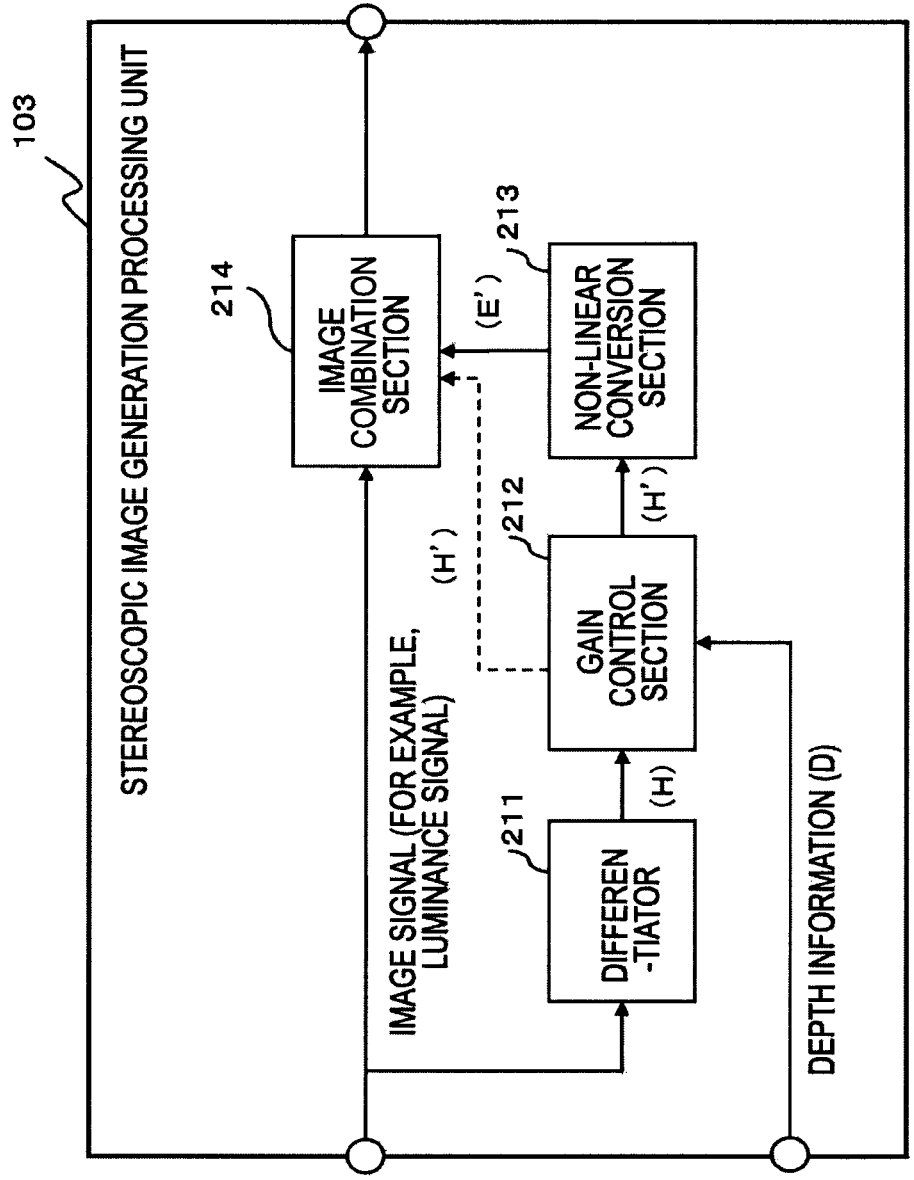
FIG. 6 is a block diagram illustrating a configuration of an embodiment of a stereoscopic image generation processing unit.

FIG. 6 is a block diagram illustrating the configuration of an embodiment of the stereoscopic image generation processing unit 103.

The stereoscopic image generation processing unit 103 performs a process of extracting a spatial feature amount of an input image signal, and performing a different emphasis process for the extracted feature amount, thereby generating a new viewpoint image. The stereoscopic image generation processing unit 103 includes a differentiator 211, a gain control section 212, a non-linear conversion section 213, and an image combination section 214.

The differentiator 211 extracts a luminance signal from video data input to the stereoscopic image generation processing unit 103, and generates a differential signal H for the luminance signal. In detail, for example, the differentiator 211 receives a luminance signal of an image in the horizontal direction, and generates a signal by primarily differentiating the input luminance signal. The primary differential process, for example, uses a 3-tap horizontal linear differential filter.

In addition, in the embodiment, an example in which the luminance signal is used as processing data has been described. Instead of the luminance signal, a color signal (RGB and the like) may also be used as data to be processed.

The gain control section 212 multiplies a coefficient (a gain coefficient) conforming to rules set in advance by the differential signal H output from the differentiator 211, thereby controlling an amplitude value of the differential signal and generating a corrected differential signal H' which is a correction signal of the differential signal.

The non-linear conversion section 213 non-linearly converts the corrected differential signal H' output from the gain control section 212, and outputs the converted signal to the image combination section 214 as a parallax emphasis signal E'.

The image combination section 214 performs a process of generating a new viewpoint image using each frame image constituting video data and a spatial feature amount generated from the frame image, that is, the corrected differential signal H' of the luminance signal or the parallax emphasis signal E' generated by non-linearly converting the corrected differential signal.

In addition, as indicated by the dotted line of FIG. 6, the conversion process of the non-linear conversion section 213 may be skipped, the corrected differential signal H' having passed through the correction process of the gain control section 212 may be directly input to the image combination section 214, and the image combination section 214 may also generate a new viewpoint image using the corrected differential signal.

Next, the process performed by the gain control section 212 will be described.

Figure 7:
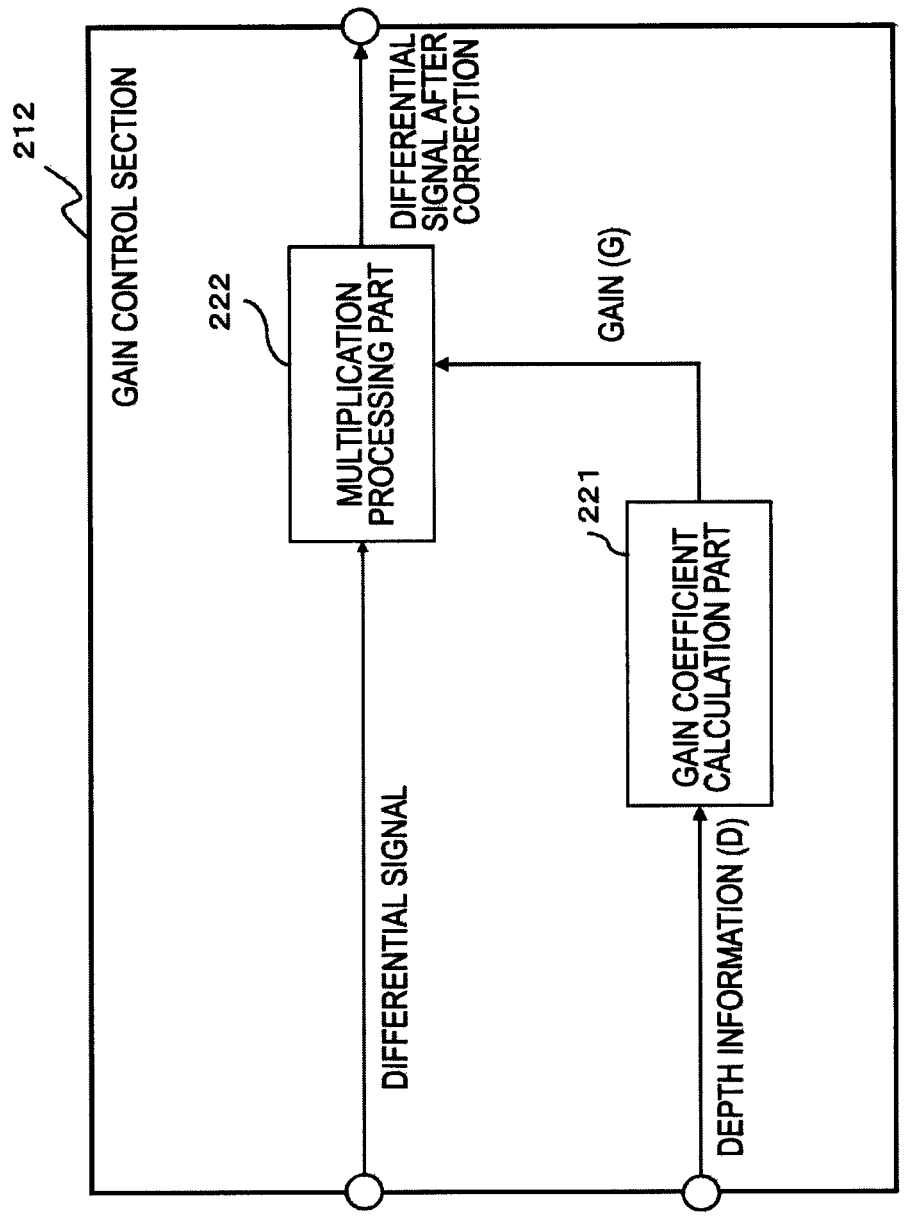
FIG. 7 is a block diagram illustrating a configuration of an embodiment of a gain control section.

FIG. 7 is a block diagram illustrating the configuration of an embodiment of the gain control section 212. The gain control section 212 controls the amplitude value of the input differential signal based on depth information input in the same manner. In addition, in the embodiment to be described hereinafter, it is assumed that the depth information is input in the form of so-called a depth map in which each pixel of the input differential signal has one depth value.

A gain coefficient calculation part 221 outputs a gain coefficient for a corresponding pixel using depth information for each input pixel.

A multiplication processing part 222 performs a multiplication process of multiplying the gain coefficient for each pixel output from the gain coefficient calculation part 221 by the amplitude value of the differential signal H with respect to each pixel of the input differential signal, thereby outputting the corrected differential signal H' having a gain-controlled amplitude value.

Figure 8:
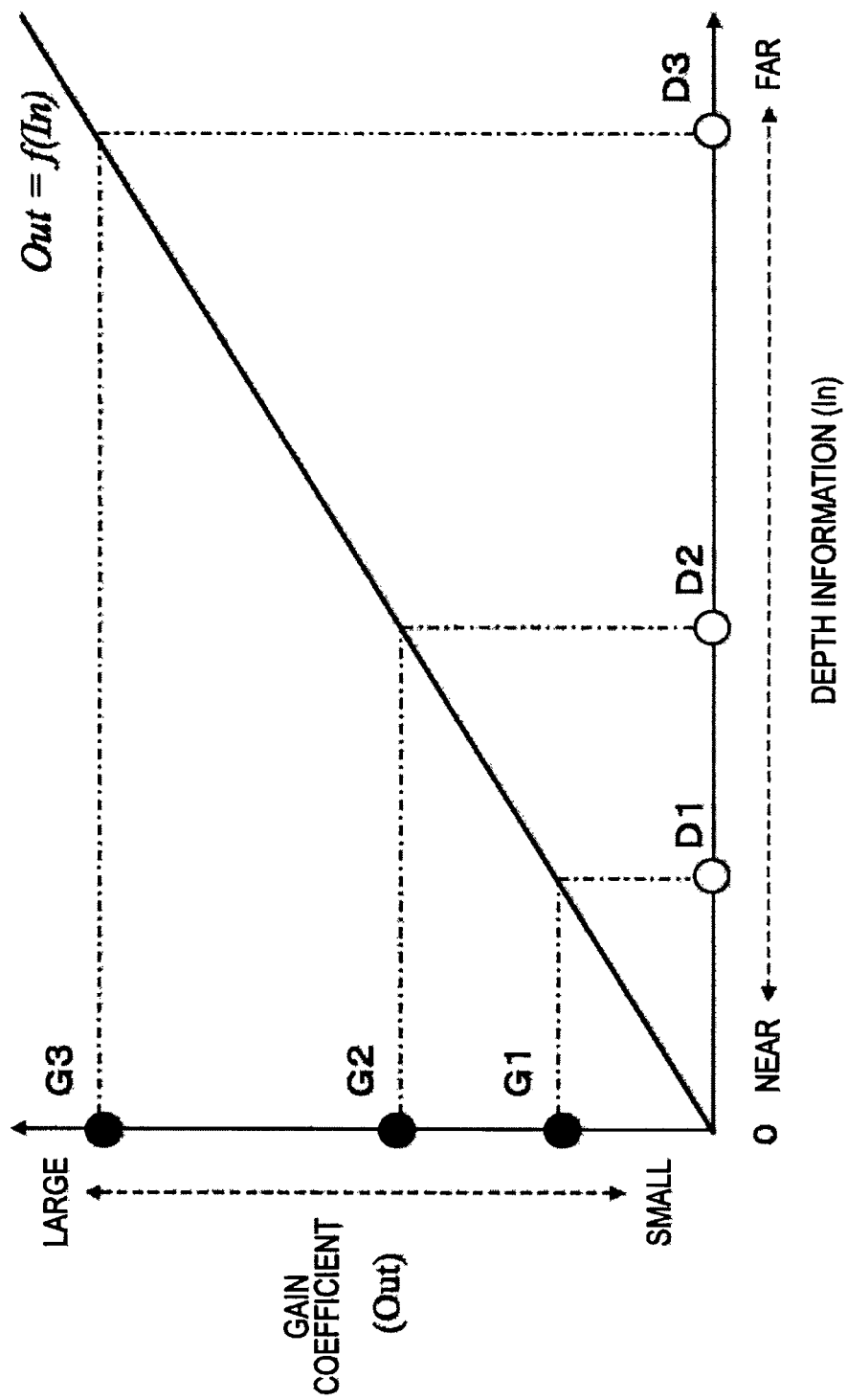
FIG. 8 is a diagram illustrating an example of a gain coefficient determination method performed by a gain coefficient calculation part.

FIG. 8 illustrates an example of a gain coefficient determination method performed by the gain coefficient calculation part 221. A horizontal axis denotes depth information serving as an input signal. A vertical axis denotes the output of the gain coefficient in the gain coefficient calculation part 221.

The gain coefficient calculation part 221 converts input depth information In using a function f(x) set in advance, and outputs a gain coefficient Out.

At this time, various types of setting are available in the function f(x).

As an example of the function f(x), for example, a linear function such as f(x)=A×x (A is a constant) is used. A is a constant set in advance and may be set to various values.

Furthermore, a conversion function in the gain coefficient calculation part 221 is not limited to the linear function, and non-linear conversion may be performed.

It is assumed that values corresponding to each pixel of the differential signal are input as the depth information, and gain coefficients corresponding to each pixel are output.

FIG. 8 is a diagram illustrating an example in which input values (depth information) and output values (gain coefficients) of the gain coefficient calculation part correspond to each other. FIG. 8 illustrates an example of three input values (depth information) and three output values (gain coefficients) corresponding to the three input values.

In an example, the input values (the depth information) are D1, D2, and D3 and indicate depth values corresponding to three pixels. In addition, the depth indicates a value corresponding to a distance to an object from an observer (a user) or a camera.

It is assumed that the depth (the object distance) is increased from the front to the back (far from the user or the camera) in the sequence of D1<D2<D3. Here, the position of depth information (In=0) corresponds to a point recognized on a display screen when a generated image is displayed on a three-dimensional display apparatus.

At this time, in an example, output values (gain coefficients) are G1, G2, and G3 obtained by putting the values of D1, D2, and D3 into the function f(x) of FIG. 8.

As with this example, the gain coefficient calculation part 221 outputs gain coefficients corresponding to each pixel of the differential signal.

Figure 9:
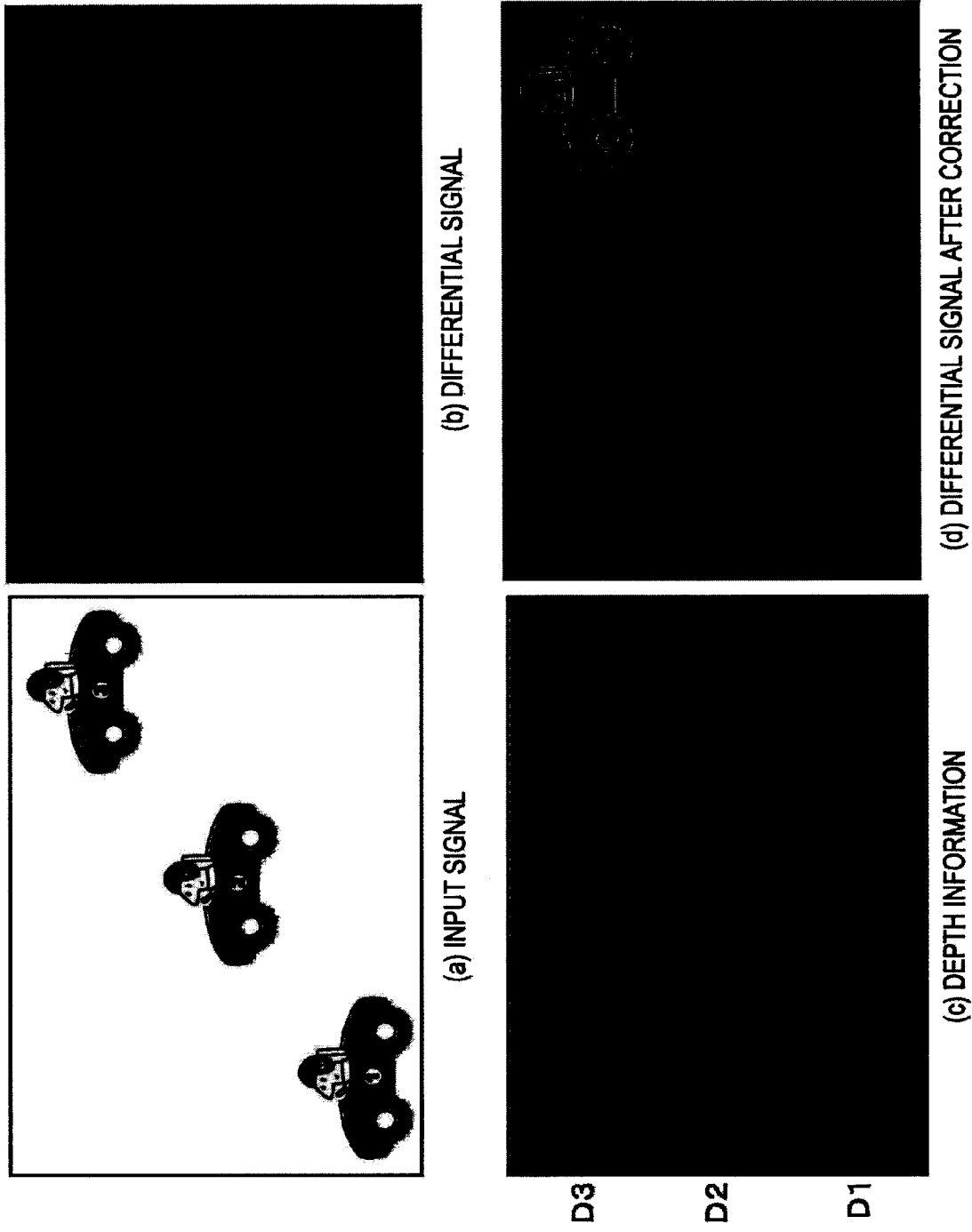
FIG. 9 is a diagram for explaining an example of a process in which a gain control section controls an amplitude value of a differential signal.

FIG. 9 illustrates an example of a process in which the gain control section 212 controls the amplitude value of a differential signal.

FIG. 9 illustrates an example of (a) an input signal, (b) a differential signal, (c) depth information, and (d) a differential signal after correction.

FIG. 9(*a*) illustrates an example of an input image signal.

FIG. 9(*b*) illustrates an image obtained by performing a differential process for the input image signal of FIG. 9(*a*).

FIG. 9(*c*) illustrates depth information corresponding to the input image signal of FIG. 9(*a*), and illustrates a simple case in which depth values are added to three division areas of the image.

Here, it is assumed that the values of the depth information D3, D2, and D1 (D1<D2<D3) defined in FIG. 8 are sequentially added to image signals indicating the depth information of FIG. 9(*c*) from the top.

At this time, according to the relation of the depths and the gain values described in FIG. 8, gain values multiplied by each pixel of the differential signal of FIG. 9(*b*) are sequentially G3, G2, and G1 (G1<G2<G3) from the top of the image.

The differential signal after correction of FIG. 9(*d*) corresponds to an example of a processing result obtained by multiplying gain values based on the depth information of FIG. 9(*c*) by each pixel of the differential signal of FIG. 9(*b*).

In the differential signal after correction of FIG. 9(*d*), a high gain value is multiplied toward the upper portion of a screen (to a far area) and a low gain value is multiplied toward the lower portion of the screen (to a near area).

As a consequence, the amplitude value of the differential signal is increased toward the upper portion of the screen (to the far area), and is reduced toward the lower portion of the screen (to the near area).

A 2D/3D conversion unit generates and outputs a new viewpoint image using differential signals having amplitudes different from one another according to a distance as described above. As a consequence, the 2D/3D conversion unit generates and outputs images having different parallax from one another according to the distance.

Next, the process performed by the non-linear conversion section 213 will be described. The non-linear conversion section 213 generates the parallax emphasis signal E' obtained by non-linearly converting the corrected differential signal H' output from the gain control section 212 and having a gain controlled according to a distance, and outputs the parallax emphasis signal E' to the image combination section 214.

Figure 10:
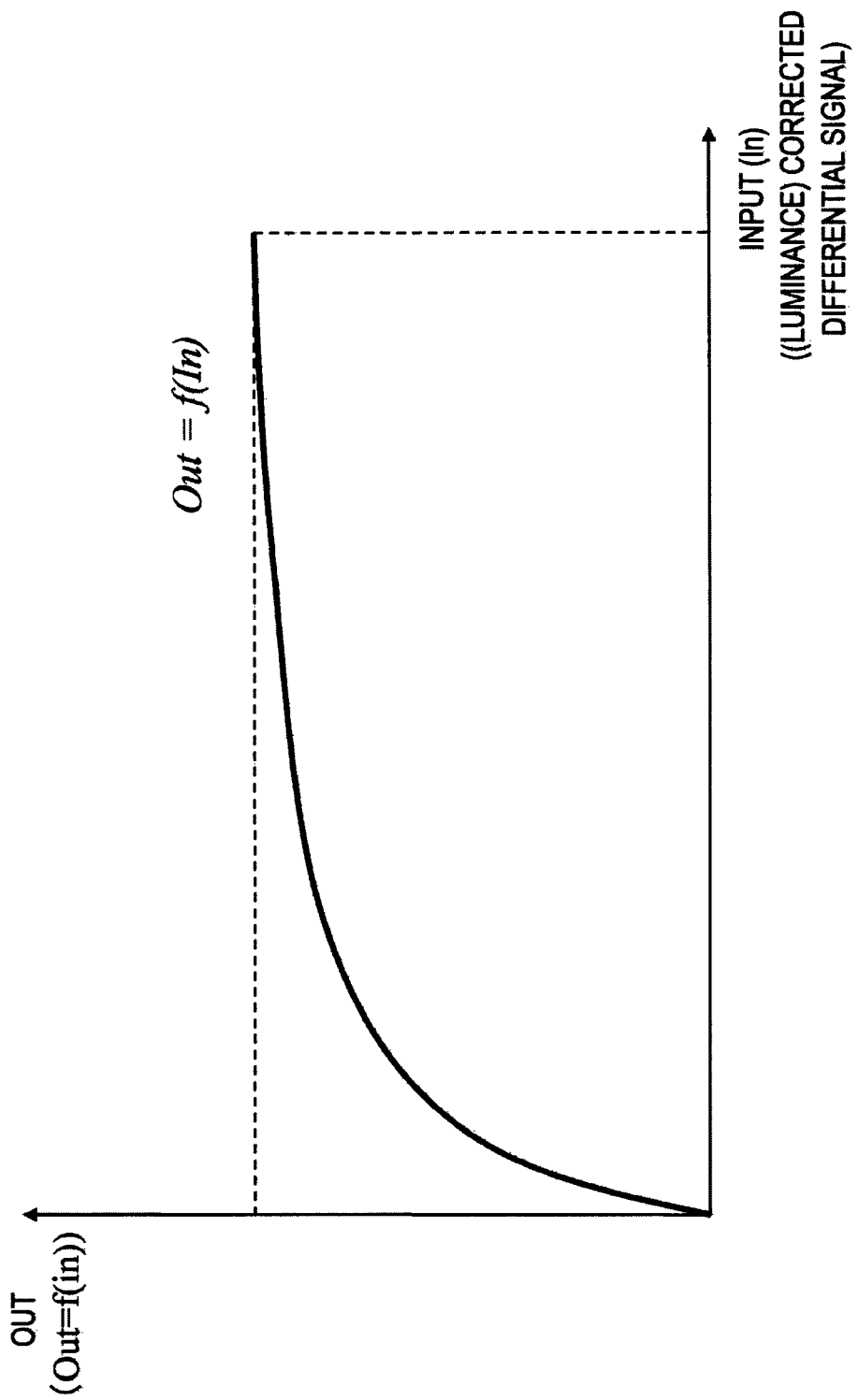
FIG. 10 is a diagram for explaining an example of a non-linear conversion process performed by a non-linear conversion section.

FIG. 10 illustrates an example of the non-linear conversion process performed by the non-linear conversion section 213. A horizontal axis denotes the (luminance) corrected differential signal which is the differential signal output from the gain control section 212 and having a gain controlled (corrected) according to a distance. A vertical axis illustrates the output after the non-linear conversion process in the non-linear conversion section 213. The non-linear conversion section 213 converts an input corrected differential signal In using a function f(x) defined in advance, and outputs a parallax emphasis signal Out. That is, Out=f(In). At this time, various types of setting are available in the function f(x). As an example of the function f(x), for example, an exponential function such as f(x)=$x^\gamma$ is used. γ is a coefficient set in advance and may be set to various values.

Furthermore, a conversion function in the non-linear conversion section 213 is not limited to the exponential function, and linear conversion may also be performed.

The image combination section 214 performs a process of receiving the parallax emphasis signal output from the non-linear conversion section 213 and the video data input to the stereoscopic image generation processing unit 103, and synthesizing each frame image constituting the video data with the parallax emphasis signal, thereby generating a new viewpoint image.

In addition, as the dotted line of FIG. 6, the conversion process of the non-linear conversion section 213 may be skipped, and the corrected differential signal H', which has been obtained after the gain control section 212 performs the gain control corresponding to the distance for the differential signal generated by the differentiator 211, may be directly input to the image combination section 214. In this case, the image combination section 214 performs a process of generating a new viewpoint image using the corrected differential signal H' having passed through the gain control according to the depth (the object distance).

Next, the process performed by the image combination section 214 will be described.

The image combination section 214 performs a process of generating a new viewpoint image using each frame image constituting the video data and the spatial feature amount generated from the frame image, that is, the differential signal of the luminance signal or the parallax emphasis signal generated by non-linearly converting the differential signal.

Figure 11:
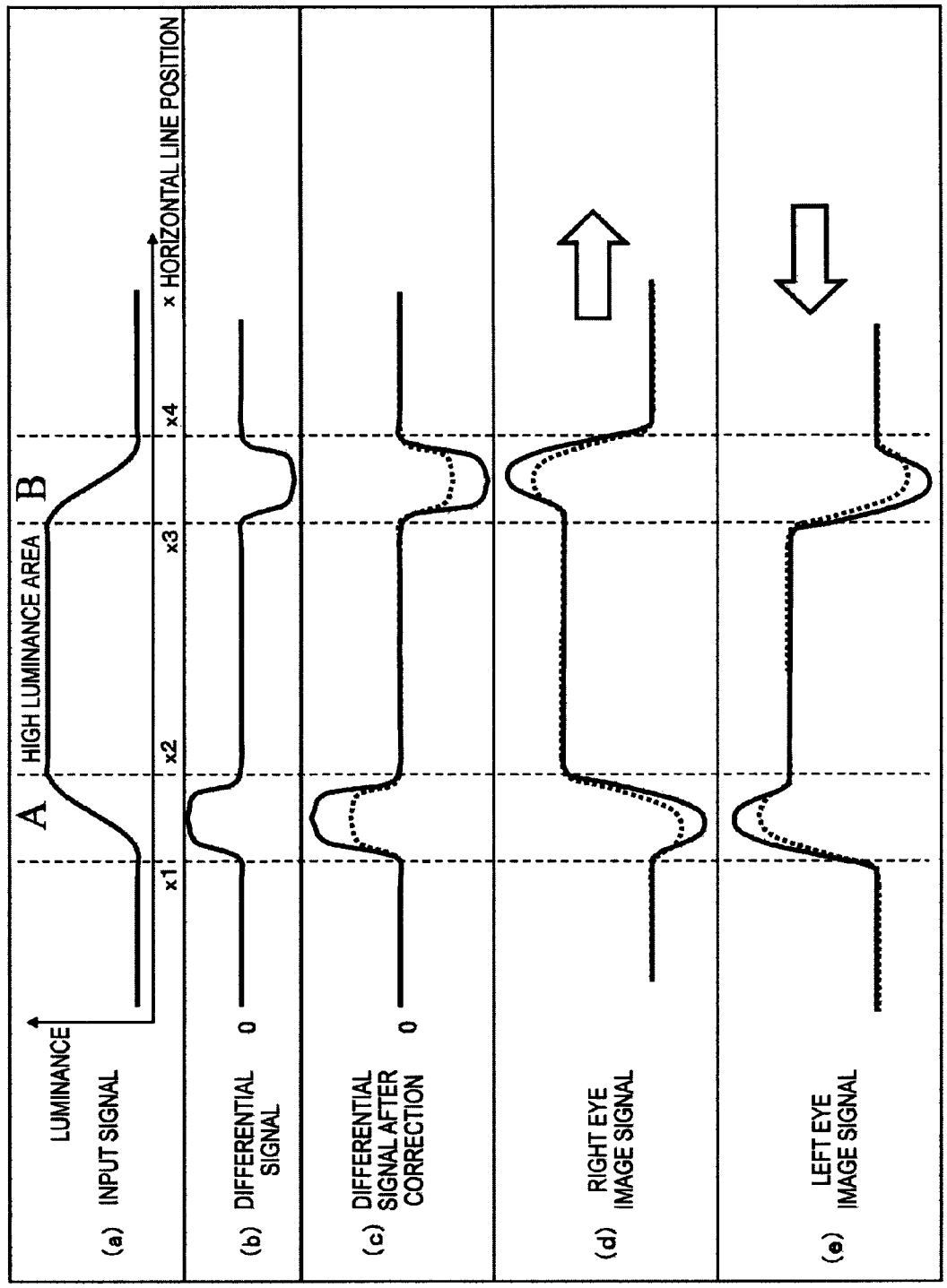
FIG. 11 is a diagram for explaining an image combination process performed by an image combination section.
Figure 12:
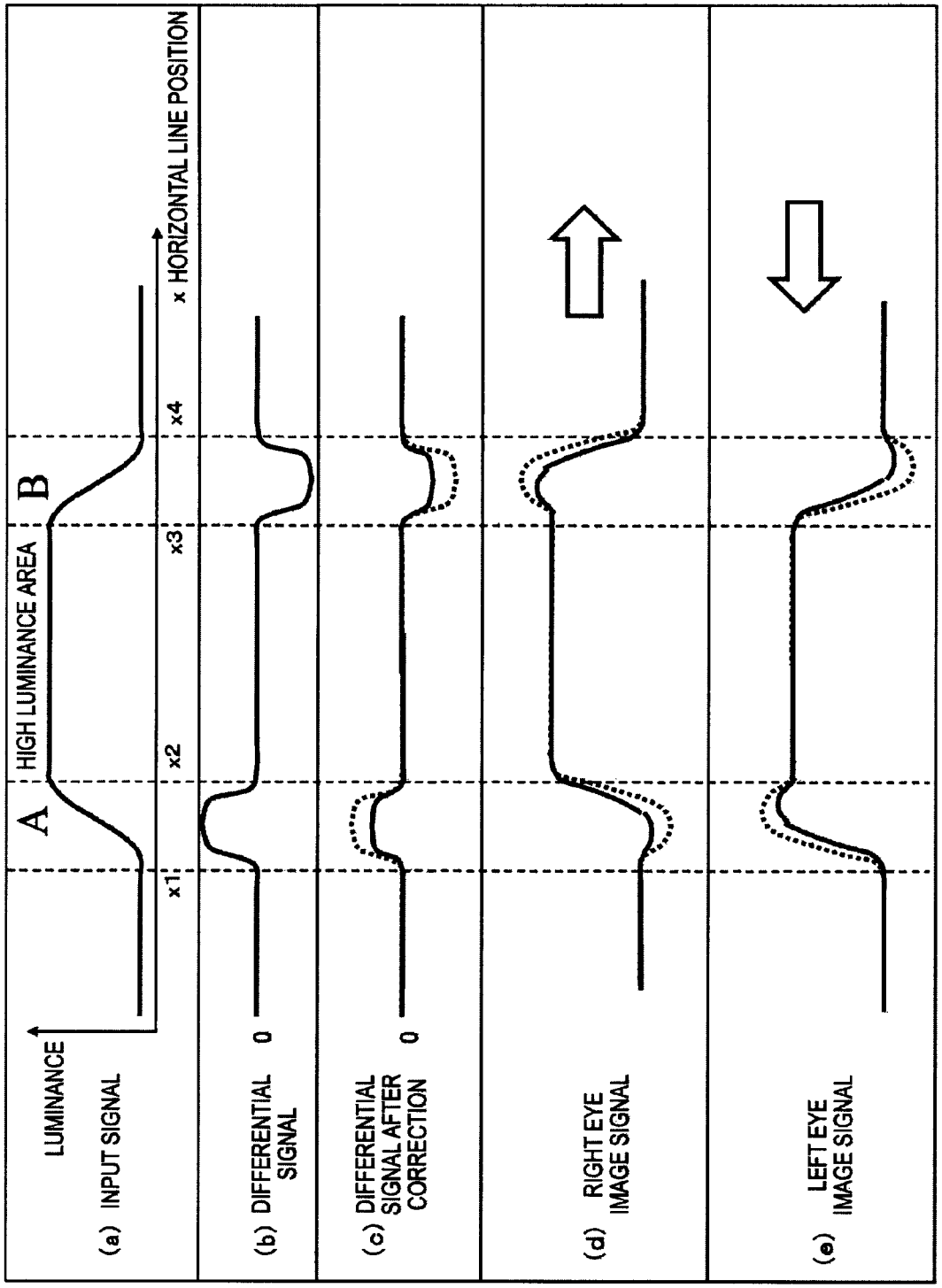
FIG. 12 is a diagram for explaining an image combination process performed by an image combination section.

FIG. 11 and FIG. 12 illustrate the concept of the image combination process performed by the image combination section 214.

FIG. 11 and FIG. 12 sequentially illustrate (a) an input signal S, (b) a differential signal H, (c) a corrected differential signal H' after correction (gain control), (d) a right shift image signal, and (e) a left shift image signal from the top with respect to an image area with a long distance (an image area with a large depth) and an image area with a short distance (an image area with a small depth).

When a description is provided in correspondence with the depth information of FIG. 9(c), for example, FIG. 11 illustrates a processing example corresponding to the image area with the long distance D3 (the image area with a large depth) of the upper portion of the image of FIG. 9(c). Meanwhile, FIG. 12 illustrates a processing example corresponding to the image area with a short distance D1 (the image area with a small depth) of the lower portion of the image of FIG. 9(c).

First, the processing example in the image area with a long distance (the image area with a large depth) illustrated in FIG. 11 will be described.

The (a) input signal S indicates a change in the luminance of one arbitrary horizontal line of an arbitrary frame of the video data, and shows one line provided at a center part thereof with a high luminance area. The (a) input signal S shows that luminance is gradually increased in an area A from a line position x1 to a line position x2, there is a high luminance part with high level luminance in the line positions x2 to x3, and then luminance is gradually reduced in an area B from a line position x3 to a line position x4.

The (b) differential signal H indicates a differential result of the (a) input signal S. The differential signal corresponds to the signal generated by the differentiator 211 of the stereoscopic image generation processing unit 103 illustrated in FIG. 6.

The differential signal H generated by the differentiator 211 has a positive value in the area A where the change in the luminance of the (a) input signal S is positive, and a negative value in the area B where the change in the luminance of the (a) input signal S is negative as illustrated in FIG. 11.

The (c) corrected differential signal H' after correction (gain control) corresponds to the signal generated by the gain control part 212 of the stereoscopic image generation processing unit 103 illustrated in FIG. 6, and is obtained by performing correction (gain control) for the (b) differential signal of FIG. 11 based on the depth information. In addition, the example illustrated in FIG. 11 corresponds to the processing example in the image area with a long distance (for example, D3 of FIG. 8(c) and FIG. 9(c)) (the image area with a large depth), and a correction process is performed with the high gain G3 as described with reference to FIG. 8 and FIG. 9, so that the amplitude of the differential signal is corrected to be large.

A dotted line illustrated in FIG. 11(c) indicates a signal before the correction (=(b) the differential signal H), and a solid line illustrated in FIG. 11(c) indicates a corrected differential signal H' after the correction corresponding to the distance. As described above, the corrected differential signal H' is corrected to have a large amplitude through the gain control corresponding to the distance.

The (d) right shift image signal and the (e) left shift image signal correspond to signals generated by the image combination section 214 illustrated in FIG. 6 and included in the stereoscopic image generation processing unit 103 illustrated in FIG. 5.

For example, when an input left image is used as the input image illustrated in FIG. 11(a), the stereoscopic image generation processing unit 103 illustrated in FIG. 5 and FIG. 6 shifts the input image rightward to generate the (d) right shift image signal.

Furthermore, the stereoscopic image generation processing unit 103 shifts the input image leftward to generate the (e) left shift image signal.

In detail, the (a) input signal S is synthesized with the parallax emphasis signal E', which is a result (the output of the non-linear conversion section 213) obtained by non-linearly converting the (c) corrected differential signal H' after the correction (gain control) in the non-linear conversion section 213, thereby generating the (d) right shift image signal or the (e) left shift image signal.

As illustrated in FIG. 11(d), when the corrected differential signal H' corrected with the high gain G3 is synthesized, an image signal with a large right shift amount is generated, as compared with the case in which the differential signal H before the correction is synthesized. In the same manner, in FIG. 11(d), an image signal with a large left shift amount is generated.

Next, the processing example in the image area with a short distance (the image area with a small depth) illustrated in FIG. 12 will be described. FIG. 12 illustrates a processing example in the image area with the short distance D1 (the image area with a small depth) of the lower portion of the image of FIG. 9(c).

The (a) input signal S and the (b) differential signal H are the same as the (a) input signal S and the (b) differential signal H illustrated in FIG. 11. The (b) differential signal H indicates a differential result of the (a) input signal S. The differential signal corresponds to the signal generated by the differentiator 211 illustrated in FIG. 6. The differential signal generated by the differentiator 211 has a positive value in an area A in which the change in the luminance of the (a) input signal is positive, and a negative value in an area B in which the change in the luminance of the (a) input signal is negative as illustrated in FIG. 12.

The (c) corrected differential signal H' after the correction (gain control) corresponds to the signal generated by the gain control part 212 illustrated in FIG. 6, and is obtained by performing the correction (gain control) for the (b) differential signal of FIG. 12 based on the depth information.

The example illustrated in FIG. 12 corresponds to the processing example in the image area with a short distance (for example, D1 of FIG. 8 and FIG. 9(c)) (the image area with a small depth), and the amplitude of the differential signal is corrected to be small with the gain G1 as described in FIG. 8 and FIG. 9.

A dotted line illustrated in FIG. 12(c) indicates a signal before the correction (=(b) the differential signal H), and a solid line illustrated in FIG. 12(c) indicates a corrected differential signal H' after the correction corresponding to the distance. As described above, the corrected differential signal H' is corrected to have a small amplitude through the gain control corresponding to the distance.

The (d) right shift image signal and the (e) left shift image signal correspond to signals generated by the image combination section 214 illustrated in FIG. 6. The image combination section 214 synthesizes the (a) input signal S with the parallax emphasis signal E', which is a result (the output of the non-linear conversion section 213) obtained by non-linearly converting the (c) corrected differential signal H' after the correction (gain control) in the non-linear conversion section 213, thereby generating the (d) right shift image signal or the (e) left shift image signal.

For example, when an input left image is used as the input image illustrated in FIG. 12(a), the stereoscopic image generation processing unit 103 illustrated in FIG. 5 and FIG. 6 shifts the input image rightward to generate the (d) right shift image signal.

Furthermore, the stereoscopic image generation processing unit 103 shifts the input image leftward to generate the (e) left shift image signal.

As illustrated in FIG. 12(d), when the corrected differential signal H' corrected with the low gain G1 is synthesized, an image signal with a small right shift amount is generated, as compared with the case in which the differential signal H before the correction is synthesized. In the same manner, in FIG. 12(d), an image signal with a small left shift amount is generated.

As described above, in the case of generating an image to be recognized in the direction deeper than a display screen, the image processing apparatus generates a corrected differential signal with a large amplitude when a distance is long and a corrected differential signal with a small amplitude when a distance is short, and synthesizes these corrected differential signals (or the parallax emphasis signal, which is a non-linear conversion result thereof) with the (a) input signal S, thereby generating the (d) right shift image signal or the (e) left shift image signal, which corresponds to an observation image from a viewpoint different from that of the input image, wherein the corrected differential signals are illustrated in FIG. 11(c) and FIG. 12(c).

The generation process of the (d) right shift image signal or the (e) left shift image signal will be described using equations.

The luminance level of video data corresponding to the (a) input signal S of FIG. 11 and FIG. 12 is set as S and the signal level of the differential signal illustrated in FIG. 11(b) and FIG. 12(b) is set as H.

Furthermore, the signal level of the corrected differential signal as the result of the correction of the differential signal, which is performed by the gain control section 212, is set as H'.

In addition, when the corrected differential signal H' is generated, a gain G by which the (b) differential signal H is multiplied is determined from a function set in advance and the like together with the depth information D.

A gain value when the distance is long as illustrated in FIG. 11 is set as G3 and a gain value when the distance is short as illustrated in FIG. 12 is set as G1.

In the examples illustrated in FIG. 11 and FIG. 12, it is assumed that G3>1>G1.

If the signal level of the (c) differential signals after the correction of FIG. 11(c) and FIG. 12(c) is expressed as H', H' may be expressed by the following equation as a signal corrected using the gain values G3 and G1.

The differential signal H' after the correction when the distance is long as illustrated in FIG. 11 is expressed by the equation H'=G3×H, and the corrected differential signal H' when the distance is short as illustrated in FIG. 12 is expressed by the equation H'=G1×H.

The signals calculated by these equations have the signal levels H' of the (c) differential signals after the correction of FIG. 11(c) and FIG. 12(c).

When the distance is long as illustrated in FIG. 11(c), if the differential signal H' after the correction indicated by the solid line is compared with the differential signal (=b) before the correction indicated by the dotted line, the differential signal H' after the correction indicated by the solid line has an amplitude larger than that of the differential signal (=b) before the correction indicated by the dotted line.

Meanwhile, when the distance is short as illustrated in FIG. 12(c), if the differential signal H' after the correction indicated by the solid line is compared with the differential signal (=b) before the correction indicated by the dotted line, the differential signal H' after the correction indicated by the solid line has an amplitude smaller than that of the differential signal (=b) before the correction indicated by the dotted line.

This is because the differential signals H' after the correction as illustrated in FIG. 11(c) and FIG. 12(c) are generated by multiplying different gain values.

That is, for the pixel with large depth information (the distance from the camera is long) in the depth map output from the depth map generation processing unit 104, correction is performed by multiplying a large gain value by the (b) differential signal to generate the differential signal after the correction as illustrated in FIG. 11(c).

Meanwhile, for the pixel with small depth information (the distance from the camera is short) in the depth map output from the depth map generation processing unit 104, correction is performed by multiplying a small gain value by the (b) differential signal to generate the differential signal after the correction as illustrated in FIG. 12(c).

The differential signals after the correction as illustrated in FIG. 11(c) and FIG. 12(c), for example, are subject to the non-linear conversion process in the non-linear conversion section 213 described with reference to FIG. 10, resulting in the generation of the parallax emphasis signal E'.

The image combination section 214 receives video data S corresponding to the (a) input signal and the parallax emphasis signal E' obtained by non-linearly converting the (c) differential signals after the correction, and for example, generates a right shift image signal Right or a left shift image signal Left through the following equations.

$$Right = S - E'$$

$$Left = S + E'$$

Signals obtained through the equations above correspond to the right shift image signal indicated by the solid line in FIG. 11(d) and FIG. 12(d), and the left shift image signal illustrated in FIG. 11(e) and FIG. 12(e), respectively.

Meanwhile, the signals indicated by the dotted line in FIG. 11(d), FIG. 11(e), FIG. 12(d) and FIG. 12(e) are not the (c) differential signals after the correction and correspond to the differential signals before the correction, that is, the right shift image signal and the left shift image signal generated using the parallax emphasis signal E obtained through the non-linear conversion by employing the (b) differential signal H. That is, Right=S−E' and Left=S+E'.

If the solid line and the dotted line indicating the right shift image signals of FIG. 11(d) and FIG. 12(d) and the left shift image signal of FIG. 11(e) and FIG. 12(e) are compared with each other, when the distance is long as illustrated in FIG. 11, an edge portion (a change portion of a signal) of the solid line (the differential signal after the correction) is steeper than that of the dotted line (the differential signal before the correction) and the shift of a signal is increased as compared with the (a) input signal in both the (d) right shift image signal and the (d) left shift image signal.

Meanwhile, when the distance is short as illustrated in FIG. 12, the edge portion of the solid line (the differential signal after the correction) is smoother than that of the dotted line (the differential signal before the correction) and the shift of a signal is reduced as compared with the (a) input signal in both the (d) right shift image signal and the (e) left shift image signal.

That is to say, when the distance is long, the difference between the (d) right shift image signal and the (e) left shift image signal is increased. When the distance is short, the difference between the (d) right shift image signal and the (e) left shift image signal is reduced.

When the (d) right shift image signal and the (e) left shift image signal as described above are displayed, if the distance is long, since the retinal disparity of the (d) right shift image signal and the (e) left shift image signal is increased, the images are recognized as if they are at a long distance. If the distance is short, since the retinal disparity of the (d) right shift image signal and the (e) left shift image signal is reduced, the images are recognized as if they are at a short distance.

The present embodiment has been described with reference to the method of generating parallax in the back relative to the display screen. However, in the case of generating parallax in the front relative to the display screen, the image combination section 214 generates the right shift image signal Right or the left shift image signal Left through the following equations.

$$Right = S + E'$$

$$Left = S - E'$$

In this way, the right shift image signal and the left shift image signal are shifted in opposite directions, that is, the right shift image signal is shifted leftward as compared with the input image, and the left shift image signal is shifted rightward as compared with the input image. As a consequence, the generated right shift image signal and left shift image signal are recognized to be in the front relative to the display screen.

(1-4. Details of Selection Process of Output Stereoscopic Image Pair Performed by Output Image Selection Processing Unit)

Next, a description will be provided for the process performed by the output image selection processing unit 105 illustrated in FIG. 5, that is, the method for selecting the stereoscopic image pair serving as the output of the image processing apparatus 100. Here, a method using the depth map will be described.

Figure 13:
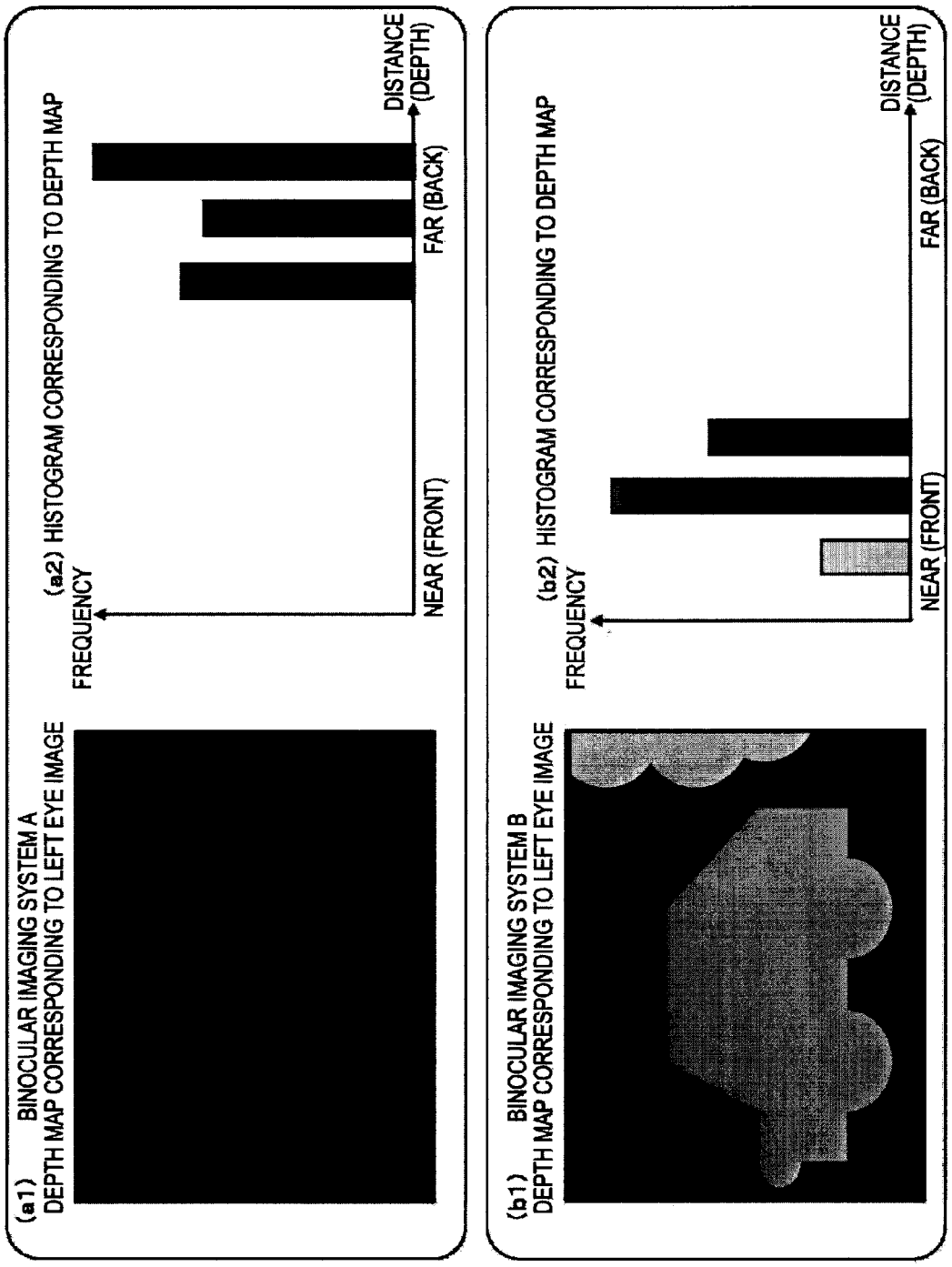
FIG. 13 is a diagram for explaining an example of a depth map and a histogram thereof.

FIG. 13 illustrates an example of a depth map and a histogram thereof.

The upper drawing a1 of FIG. 13 illustrates the depth map corresponding to the left eye image captured by the binocular imaging system A (10) described with reference to FIG. 2 and FIG. 3, which has been generated by the depth map generation processing unit 104.

Similarly, the lower drawing b1 of FIG. 13 illustrates the depth map corresponding to the left eye image captured by the binocular imaging system B (20) described with reference to FIG. 2 and FIG. 3.

In the depth maps, the depth is expressed by luminance and has depth values according to the luminance as follows:

As the luminance of a pixel increases, the pixel is toward the front (the distance from the camera is short); and As the luminance of a pixel decreases, the pixel is toward the back (the distance from the camera is long).

Moreover, the upper drawing a2 of FIG. 13 illustrates a histogram for the depth map of the upper drawing a1 of FIG. 13, wherein a horizontal axis denotes depth and a vertical axis denotes frequency. Here, the frequency indicates the number of pixels in the depth map having a corresponding depth value.

Similarly, the lower drawing b2 of FIG. 13 illustrates a histogram for the depth map of the lower drawing b1 of FIG. 13.

When paying attention to the histograms a2 and b2 of the upper drawing and the lower drawing of FIG. 13, features of the two histograms are as follows.

In the upper drawing a2, a frequency distribution is concentrated on a back (long distance) area. In the lower drawing b2, frequency is mainly distributed in a front (short distance) area.

As described with reference to FIG. 1 to FIG. 4, when the distance from the object to the imaging apparatus is short, if the photographed image of the imaging apparatus is used as the stereoscopic image as is, since parallax is very large and occlusion also occurs, an observer may feel discomfort or fatigue. Meanwhile, using the image generated through the 2D/3D conversion (stereoscopic conversion) for converting the two-dimensional image to the binocular parallax image, it is possible to adjust parallax and to generate an image not causing the above-mentioned discomfort or fatigue.

As illustrated in the upper drawing a2 of FIG. 13, when the frequency is mainly distributed in the back, even when the stereoscopic image pair generated by the binocular imaging system, that is, the stereoscopic image pair of the input right eye image and the input left eye image input to the image processing apparatus 100, is output, since very large parallax or occlusion does not occur, it is possible to obtain comfortable stereoscopic vision without causing discomfort or fatigue to an observer.

Meanwhile, as illustrated in the lower drawing b2 of FIG. 13, in the case in which the frequency is mainly distributed in the front, when the stereoscopic image pair of the input right eye image and the input left eye image input to the image processing apparatus 100 is output for observation, since very large parallax or occlusion occurs, it is highly probable that an observer will feel discomfort or fatigue. In this case, the stereoscopic image pair generated from one left eye image, that is, the stereoscopic image pair of the generated right eye image and the generated left eye image generated by the stereoscopic image generation processing unit 103, is output for observation, so that it is possible to obtain comfortable stereoscopic vision without the very large parallax or occlusion.

The output image selection processing unit 105 performs the above-mentioned output image selection. That is, the output image selection processing unit 105 performs determination of a selection image based on the image-distance distribution histogram as illustrated in FIGS. 13 (a2) and (b2). This technique is not particularly limited. For example, there are methods of determining an output stereoscopic image pair by identifying whether a depth value with a high frequency is higher or lower than a threshold value th, or of determining an output stereoscopic image pair by calculating the value of the center of a histogram and identifying whether the value is higher or lower than the threshold value th.

A detailed configuration example of the output image selection processing unit 105 will be described with reference to FIG. 14 and subsequent drawings.

Figure 14:
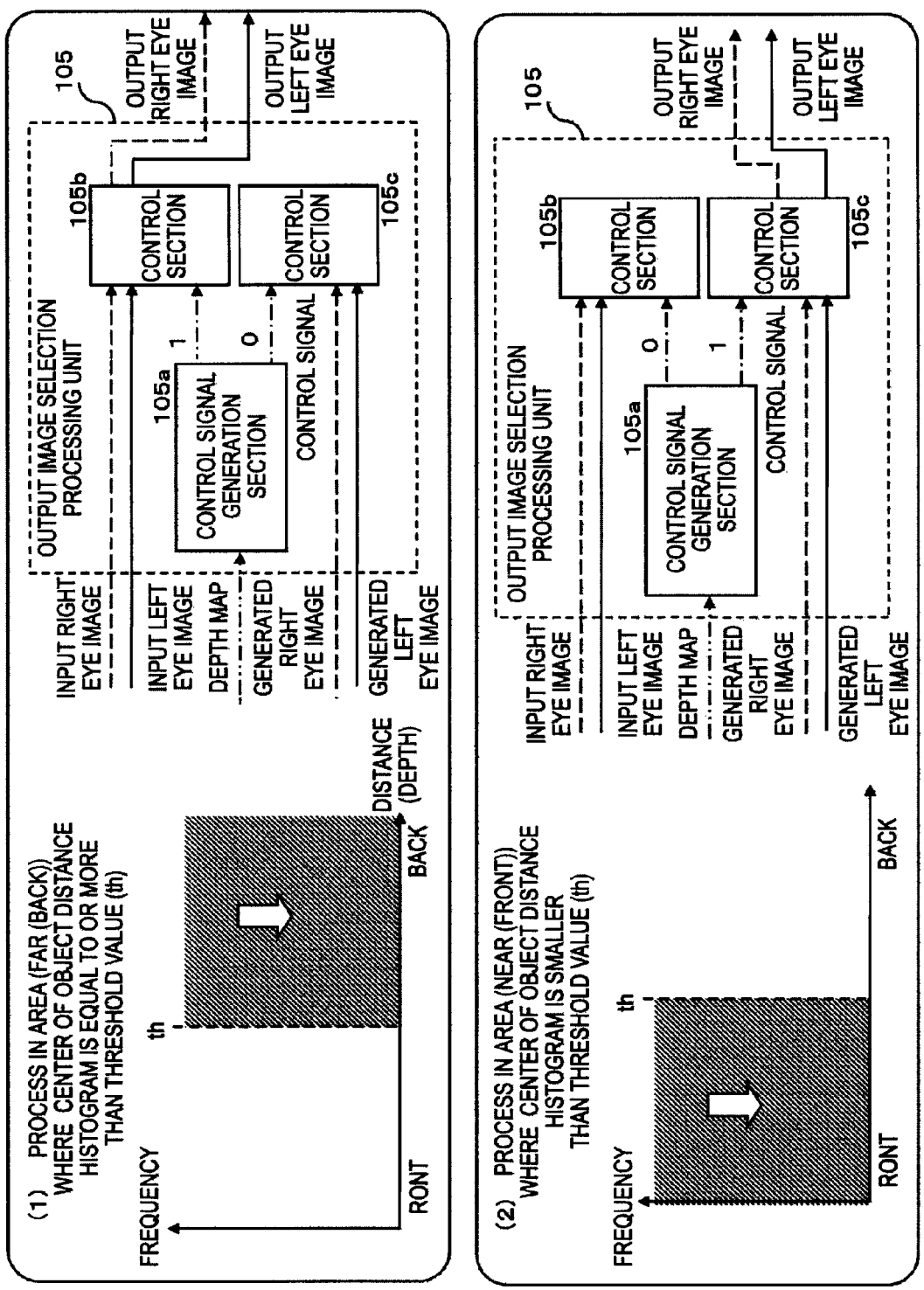
FIG. 14 is a diagram for explaining an example of a configuration of an output image selection processing unit

FIG. 14 illustrates an example of the configuration of the output image selection processing unit 105.

In the configuration illustrated in FIG. 14, the output image selection processing unit 105 performs a process of selecting the stereoscopic image pair, which is output from the image processing apparatus 100, based on the distance histogram generated from the depth map of the image described with reference to FIG. 13.

As illustrated in FIG. 14, the output image selection processing unit 105 includes a control signal generation section 105a and control sections 105b and 105c.

The control signal generation section 105a generates the distance histogram as illustrated in FIGS. 13 (a2) and (b2) based on the depth map input from the depth map generation processing unit 104.

Moreover, the control signal generation section 105*a* compares a threshold value th held in advance with the value of the center of the generated histogram, identifies whether the histogram center is equal to or more than the threshold value th or smaller than the threshold value th, and outputs a control signal (1, 0) corresponding to the identification result to the control sections 105*b* and 105*c*.

The control section 105*b* receives the "input right eye image" and the "input left eye image," which are photographed by the binocular imaging system and input to the image processing apparatus 100, and controls the output of these images. If the control signal [1] is input from the control signal generation section 105*a*, the control section 105*b* is configured to output these images.

Meanwhile, the control section 105*c* receives the "generated right eye image" and the "generated left eye image" generated by the stereoscopic image generation processing unit 103 through the 2D/3D conversion, and controls the output of these images. If the control signal [1] is input from the control signal generation section 105*a*, the control section 105*c* is configured to output these images.

As described above, the output image selection processing unit 105 illustrated in FIG. 14 includes the control signal generation section 105*a* and the two control sections 105*b* and 105*c*.

FIG. 14 (1) illustrates processing when the center of the distance histogram generated based on the depth map input from the depth map generation processing unit 104 is equal to or more than the threshold value th. That is, FIG. 14 (1) illustrates processing when the object distance of the entire image is relatively in the back (far from the camera).

In this case, the control signal generation section 105*a* outputs the control signal [1] indicating output permission to the control section 105*b* which controls the output of the "input right eye image" and the "input left eye image" photographed by the binocular imaging system, and outputs the control signal [0] indicating output prohibition to the control section 105*c* which controls the output of the "generated right eye image" and the "generated left eye image" generated by the stereoscopic image generation processing unit 103 through the 2D/3D conversion.

As a consequence, the images output from the output image selection processing unit 105, that is, the images output from the image processing apparatus 100, are the "input right eye image" and the "input left eye image" photographed by the binocular imaging system.

FIG. 14 (2) illustrates processing when the center of the distance histograms generated based on the depth map input from the depth map generation processing unit 104 is smaller than the threshold value th. That is, FIG. 14 (2) illustrates processing when the object distance of the entire image is relatively in the front (near the camera).

In this case, the control signal generation section 105*a* outputs the control signal [0] indicating output prohibition to the control section 105*b* which controls the output of the "input right eye image" and the "input left eye image" photographed by the binocular imaging system, and outputs the control signal [1] indicating output permission to the control section 105*c* which controls the output of the "generated right eye image" and the "generated left eye image" generated by the stereoscopic image generation processing unit 103 through the 2D/3D conversion.

As a consequence, the images output from the output image selection processing unit 105, that is, the images output from the image processing apparatus 100 are the "generated right eye image" and the "generated left eye image" generated by the stereoscopic image generation processing unit 103 through the 2D/3D conversion.

In the processing example illustrated in FIG. 14, the stereoscopic image pair output from the output image selection processing unit 105 is one of (1) the "input right eye image" and the "input left eye image" photographed by the binocular imaging system and input to the image processing apparatus 100 and (2) the "generated right eye image" and the "generated left eye image" generated by the stereoscopic image generation processing unit 103 through the 2D/3D conversion. That is, the stereoscopic image pair is one of the input stereoscopic image pair and the generated stereoscopic image pair.

However, the pair of stereoscopic images output from the image processing apparatus 100 may have a configuration in which the input stereoscopic images and the generated stereoscopic images are mixed.

For example, it may be possible to have a configuration in which the "input right eye image" and the "input left eye image" photographed by the binocular imaging system and input to the image processing apparatus 100 and the "generated right eye image" and the "generated left eye image" generated by the stereoscopic image generation processing unit 103 through the 2D/3D conversion are set as a pair of stereoscopic images for output.

Through such combinations, it is possible to finely control a parallax amount between the right and left images of the output stereoscopic image pair.

Figure 15:
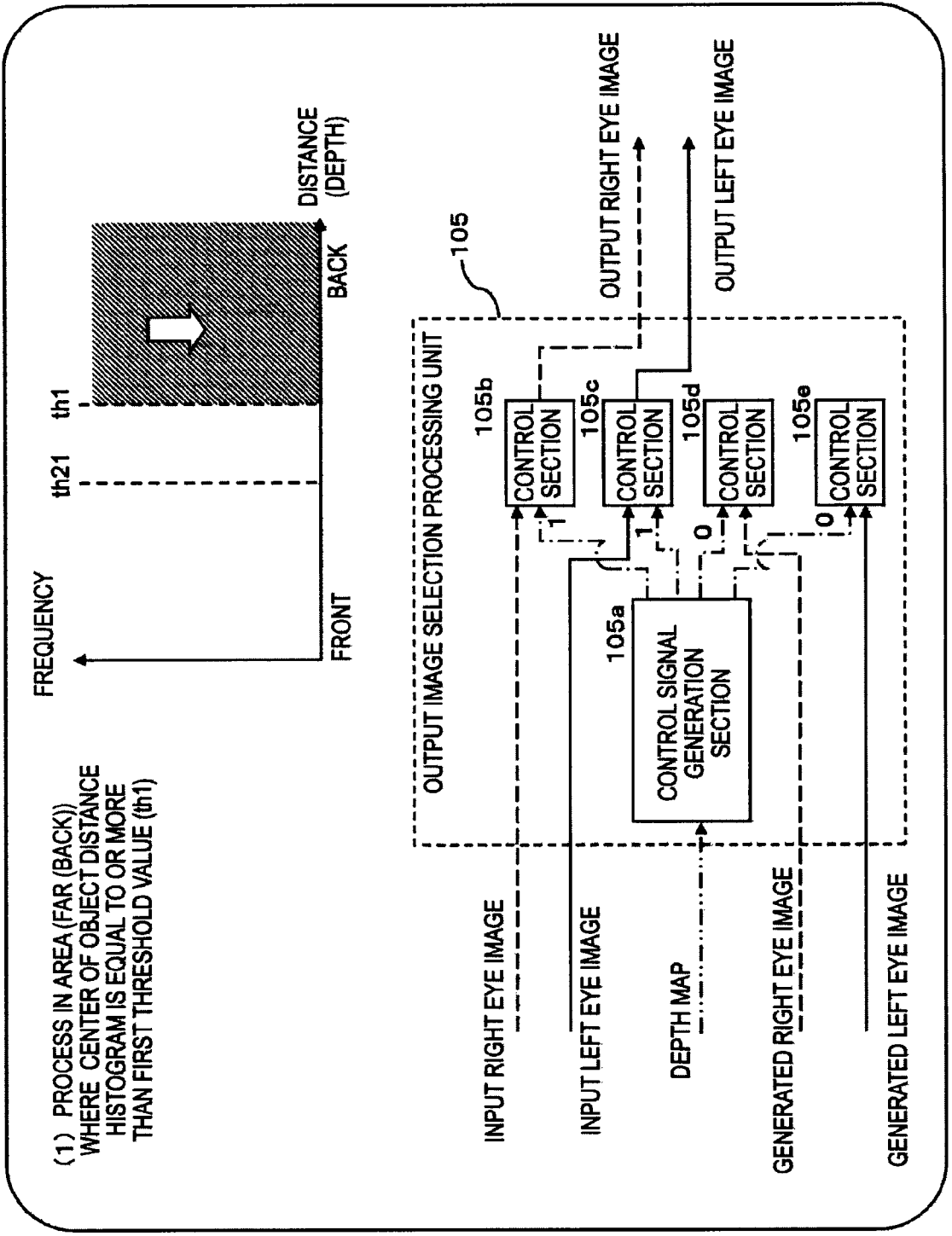
FIG. 15 is a diagram for explaining a configuration of an output image selection processing unit for performing image output control based on a combination of various images, and a processing example.
Figure 16:
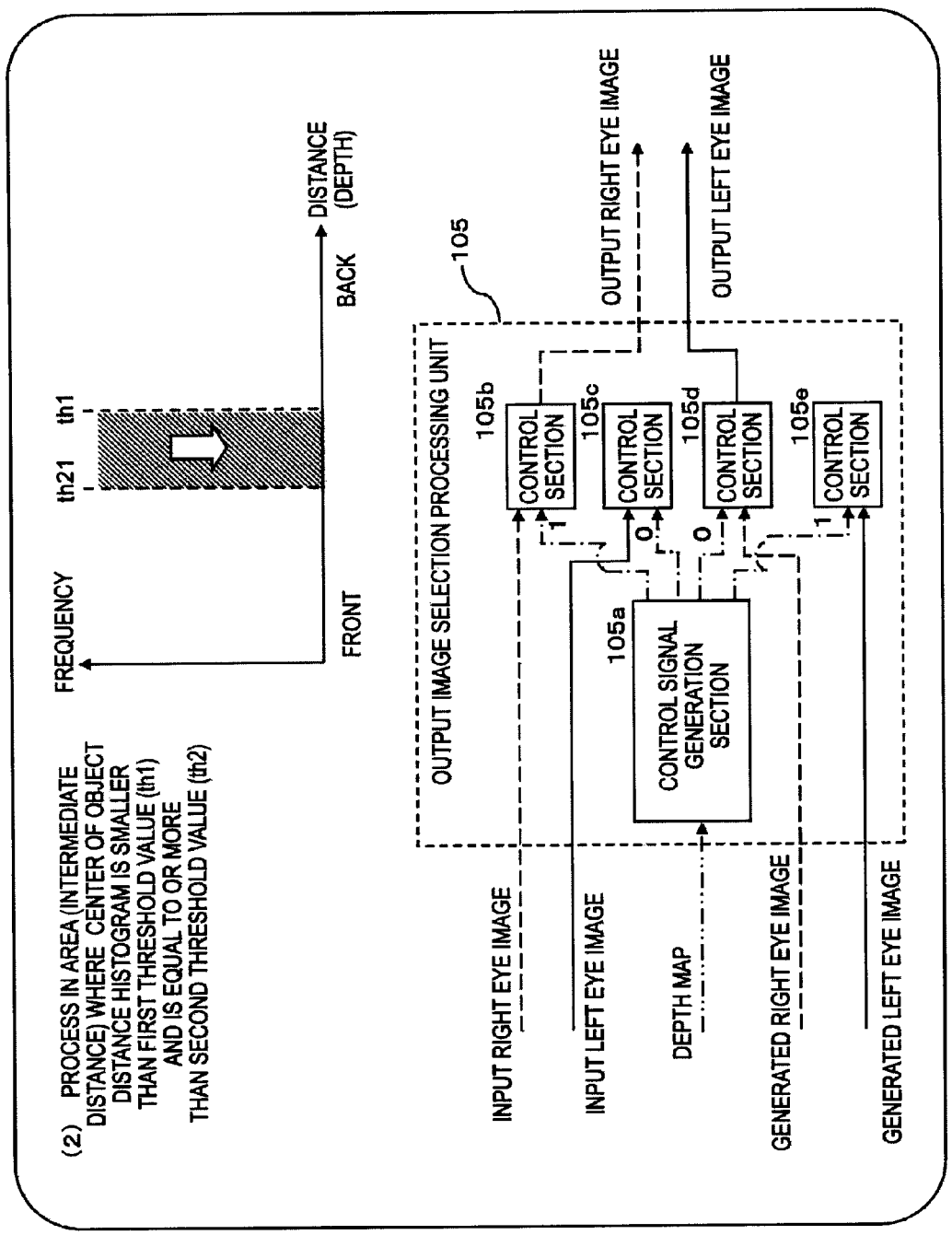
FIG. 16 is a diagram for explaining a configuration of an output image selection processing unit for performing image output control based on a combination of various images, and a processing example.
Figure 17:
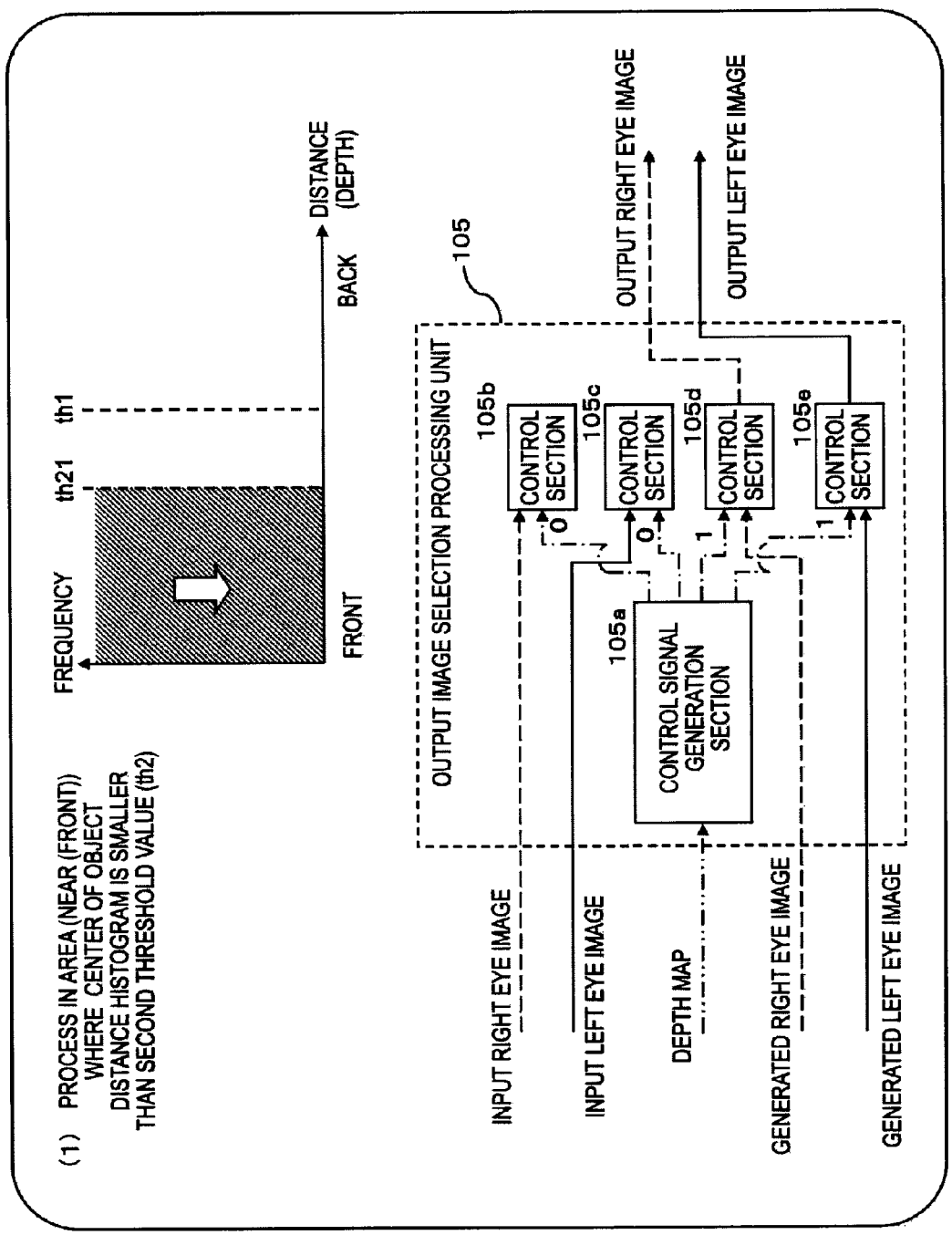
FIG. 17 is a diagram for explaining a configuration of an output image selection processing unit for performing image output control based on a combination of various images, and a processing example.

With reference to FIG. 15 to FIG. 17, a description will be provided for the configuration and the processing example of the output image selection processing unit 105 which performs image output control through various image combinations as described above.

The output image selection processing unit 105 illustrated in FIG. 15 to FIG. 17 includes a control signal generation section 105*a* and four control sections 105*b* to 105*e*.

The control signal generation section 105*a* generates the distance histograms as illustrated in FIGS. 13 (a2) and (b2) based on the depth map input from the depth map generation processing unit 104.

Moreover, the control signal generation section 105*a* compares threshold values th1 and th2 held in advance with the value of the center of the generated histogram, identifies whether the histogram center is equal to or more than the threshold values th1 and th2 or smaller than the threshold values th1 and th2, and outputs a control signal (1, 0) corresponding to the identification result to the control sections 105*b* to 105*e*.

In addition, the threshold values th1 and th2 satisfy the following relation, that is, the back (the distance from the camera is long)>th1>th2>the front (the distance from the camera is short).

As described above, the threshold value th1 is a threshold value set at a position at which the distance from the camera is long, as compared with the threshold value th2.

The control section 105*b* receives the "input right eye image," which is photographed by the binocular imaging system and input to the image processing apparatus 100, and controls the output of the "input right eye image." If the control signal [1] is input from the control signal generation section 105*a*, the control section 105*b* is configured to output the "input right eye image."

The control section 105*c* receives the "input left eye image," which is photographed by the binocular imaging system and input to the image processing apparatus 100, and controls the output of the "input left eye image." If the control signal [1] is input from the control signal generation section 105a, the control section 105c is configured to output the "input left eye image."

Meanwhile, the control section 105d receives the "generated right eye image" generated by the stereoscopic image generation processing unit 103 through the 2D/3D conversion, and controls the output of the "generated right eye image." If the control signal [1] is input from the control signal generation section 105a, the control section 105d is configured to output the "generated right eye image."

The control section 105e receives the "generated left eye image" generated by the stereoscopic image generation processing unit 103 through the 2D/3D conversion, and controls the output of the "generated left eye image." If the control signal [1] is input from the control signal generation section 105a, the control section 105e is configured to output the "generated left eye image."

The example illustrated in FIG. 15 shows processing when the center of the distance histogram generated based on the depth map input from the depth map generation processing unit 104 is equal to or more than the threshold value th1. That is, the example illustrated in FIG. 15 shows processing when the object distance of the entire image is relatively in the back (far from the camera).

In this case, the control signal generation section 105a outputs the control signal [1] indicating output permission to the control section 105b which controls the output of the "input right eye image" photographed by the binocular imaging system, and outputs the control signal [1] indicating output permission to the control section 105c which controls the output of the "input left eye image" photographed by the binocular imaging system.

Furthermore, the control signal generation section 105a outputs the control signal [0] indicating output prohibition to the control sections 105d and 105e which control the output of the "generated right eye image" and the "generated left eye image" generated by the stereoscopic image generation processing unit 103 through the 2D/3D conversion.

As a consequence, the images output from the output image selection processing unit 105, that is, the images output from the image processing apparatus 100, are the "input right eye image" and the "input left eye image" photographed by the binocular imaging system.

The example illustrated in FIG. 16 shows processing when the center of the distance histogram generated based on the depth map input from the depth map generation processing unit 104 is equal to or more than the threshold value th2 and smaller than the threshold value th1. That is, the example illustrated in FIG. 16 shows processing when the object distance of the entire image is a relatively intermediate distance.

In this case, the control signal generation section 105a outputs the control signal [1] indicating output permission to the control section 105b which controls the output of the "input right eye image" photographed by the binocular imaging system, and outputs the control signal [0] indicating output prohibition to the control section 105c which controls the output of the "input left eye image" photographed by the binocular imaging system.

Furthermore, the control signal generation section 105a outputs the control signal [1] indicating output permission to the control section 105d which controls the output of the "generated right eye image" generated by the stereoscopic image generation processing unit 103 through the 2D/3D conversion.

Moreover, the control signal generation section 105a outputs the control signal [0] indicating output prohibition to the control section 105e which controls the output of the "generated left eye image" generated by the stereoscopic image generation processing unit 103 through the 2D/3D conversion.

As a consequence, the images output from the output image selection processing unit 105, that is, the images output from the image processing apparatus 100, are the "input right eye image" photographed by the binocular imaging system and the "generated right eye image" generated by the stereoscopic image generation processing unit 103 through the 2D/3D conversion.

In this case, the "generated right eye image" generated by the stereoscopic image generation processing unit 103 through the 2D/3D conversion is output as a left eye image.

The "generated right eye image" generated by the stereoscopic image generation processing unit 103 through the 2D/3D conversion has been originally generated based on the "input left eye image," and an image from a right viewpoint as compared with the "input left eye image" while being an image from a left viewpoint as compared with the "input right eye image."

That is, the "generated right eye image" is an image pair having small parallax through a combination of the "input right eye image" and the "input left eye image" photographed by the binocular imaging system.

The example illustrated in FIG. 17 shows processing when the center of the distance histogram generated based on the depth map input from the depth map generation processing unit 104 is smaller than the threshold value th2. That is, the example illustrated in FIG. 17 shows processing when the object distance of the entire image is relatively in the front (near the camera).

In this case, the control signal generation section 105a outputs the control signal [0] indicating output prohibition to the control sections 105b and 105c which control the output of the "input right eye image" and the "input left eye image" photographed by the binocular imaging system.

Furthermore, the control signal generation section 105a outputs the control signal [1] indicating output permission to the control sections 105d and 105e which control the output of the "generated right eye image" and the "generated left eye image" generated by the stereoscopic image generation processing unit 103 through the 2D/3D conversion.

As a consequence, the images output from the output image selection processing unit 105, that is, the images output from the image processing apparatus 100, are the "generated right eye image" and the "generated left eye image" generated by the stereoscopic image generation processing unit 103 through the 2D/3D conversion.

As described above, according to the setting described with reference to FIG. 15 to FIG. 17, (a) when the object distance of an image to be processed is relatively long (back), a combination of the "input right eye image" and the "input left eye image" photographed by the binocular imaging system is output (FIG. 15), (b) when the object distance of the image to be processed is a relatively intermediate distance, a combination of the "input right eye image" photographed by the binocular imaging system and the "generated right eye image" generated by the stereoscopic image generation processing unit 103 through the 2D/3D conversion is output (FIG. 16), and (c) when the object distance of the image to be processed is relatively short (front), a combination of the "generated right eye image" and the "generated left eye image" generated by the stereoscopic image generation processing unit 103 through the 2D/3D conversion is output (FIG. 17).

The three modes mentioned above are selected according to images, resulting in a change in a combination of output images.

2. Other Embodiments

The configuration of the image processing apparatus described in the above-mentioned embodiment, that is, the image processing apparatus 100 illustrated in FIG. 5, is an example of the embodiment of the image processing apparatus of the present disclosure, and there are various embodiments.

Figure 18:
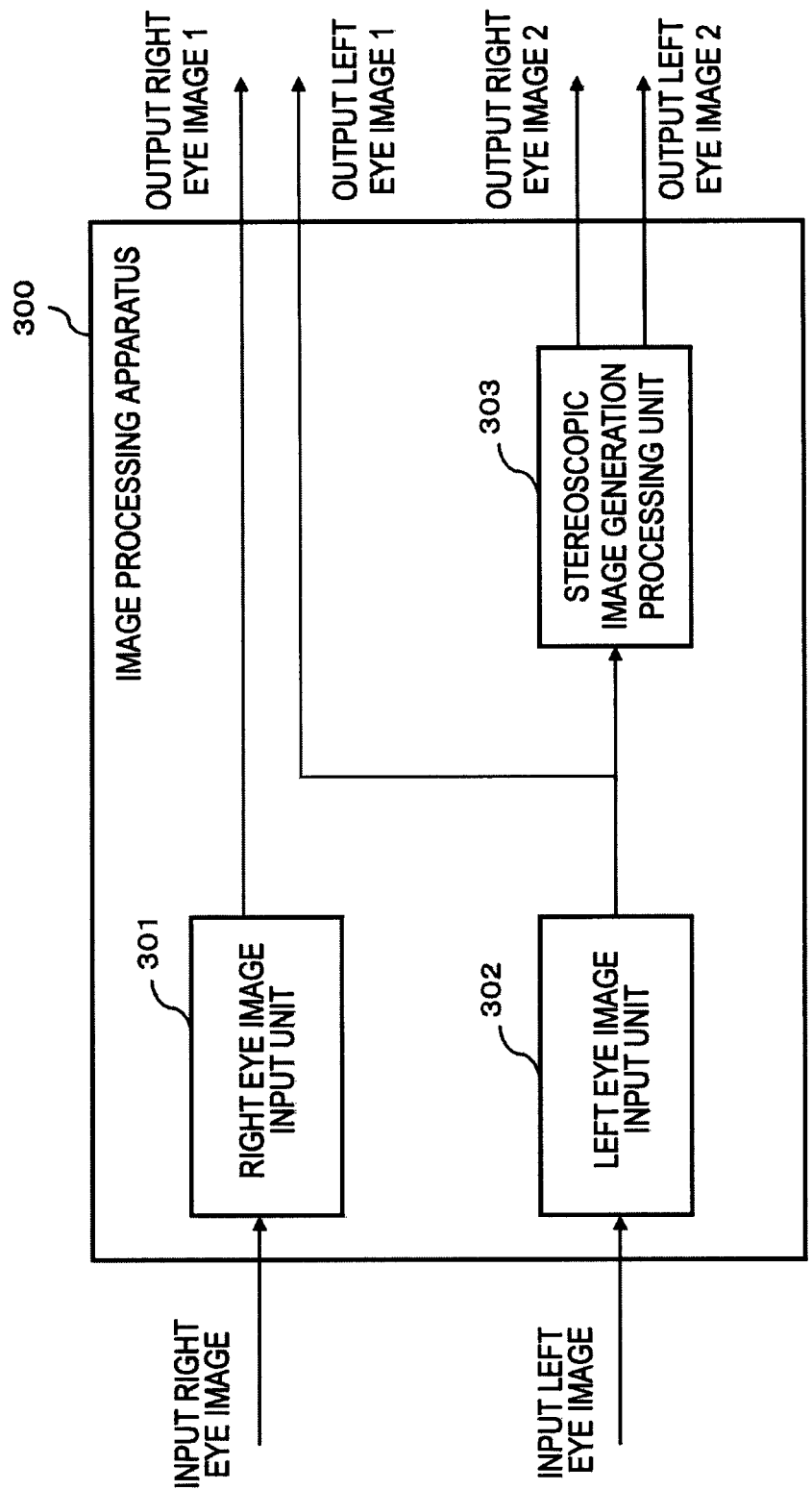
FIG. 18 is a diagram for explaining a configuration example including minimum elements in an image processing apparatus of the present disclosure.

With reference to FIG. 18 and subsequent drawings, a plurality of embodiments will be described.

(2-1. Configuration Example of Minimum Element)

FIG. 18 illustrates a configuration example including minimum elements in the image processing apparatus of the present disclosure.

An image processing apparatus 300 includes a right eye image input unit 301, a left eye image input unit 302, and a stereoscopic image generation processing unit 303.

The image processing apparatus 300 receives a binocular stereoscopic image signal. The input image signal includes right and left stereoscopic images captured by a right and left pair of imaging systems, that is, an input right eye image and an input left eye image. For example, the image processing apparatus 300 receives a pair of two images captured by the binocular imaging system A (10) and the binocular imaging system B (20) illustrated in FIG. 2 from two different viewpoints.

These input right eye image and input left eye image are input to the right eye image input unit 301 and the left eye image input unit 302, respectively.

The stereoscopic image generation processing unit 303 generates a right eye image and a left eye image, which constitute a stereoscopic image, through the 2D/3D conversion process using the one input image (the input left eye image in the present example).

However, in the present embodiment, the stereoscopic image generation processing unit 303 generates the right eye image and the left eye image, which constitute the stereoscopic image, through the 2D/3D conversion process without using the depth map.

The image processing apparatus 300 outputs both (a) the stereoscopic image pair of the input right eye image and the input left eye image photographed by the binocular imaging system and input to the image processing apparatus 300, and (b) the stereoscopic image pair of the generated right eye image and the generated left eye image generated by the stereoscopic image generation processing unit 303 through the 2D/3D conversion process.

That is, the image processing apparatus 300 does not perform an output image selection process.

In the present embodiment, the stereoscopic image generation processing unit 303 generates the right eye image and the left eye image, which constitute the stereoscopic image, through the 2D/3D conversion process without using the depth map.

In the embodiment described with reference to FIG. 5 and the subsequent drawings, the stereoscopic image generation processing unit 103 has generated the right eye image and the left eye image, which constitute the stereoscopic image, through the 2D/3D conversion process using the depth map based on a change in the shift amount according to the object distance (depth).

On the other hand, the stereoscopic image generation processing unit 303 of the image processing apparatus 300 illustrated in FIG. 18 generates the right eye image and the left eye image, which constitute the stereoscopic image, through the 2D/3D conversion process based on the setting of the shift amount independent of the object distance (depth), without using the depth map.

In addition, for the 2D/3D conversion process, for example, a configuration disclosed in the present applicant's Japanese Unexamined Patent Application Publication No. 2010-63083 may be employed.

(2-2. Configuration Example in which Output Image Selection Processing Unit is Omitted)

Next, the configuration example, in which the output image selection processing unit 105 is omitted from the image processing apparatus 100 illustrated in FIG. 5, will be described with reference to FIG. 19.

Figure 19:
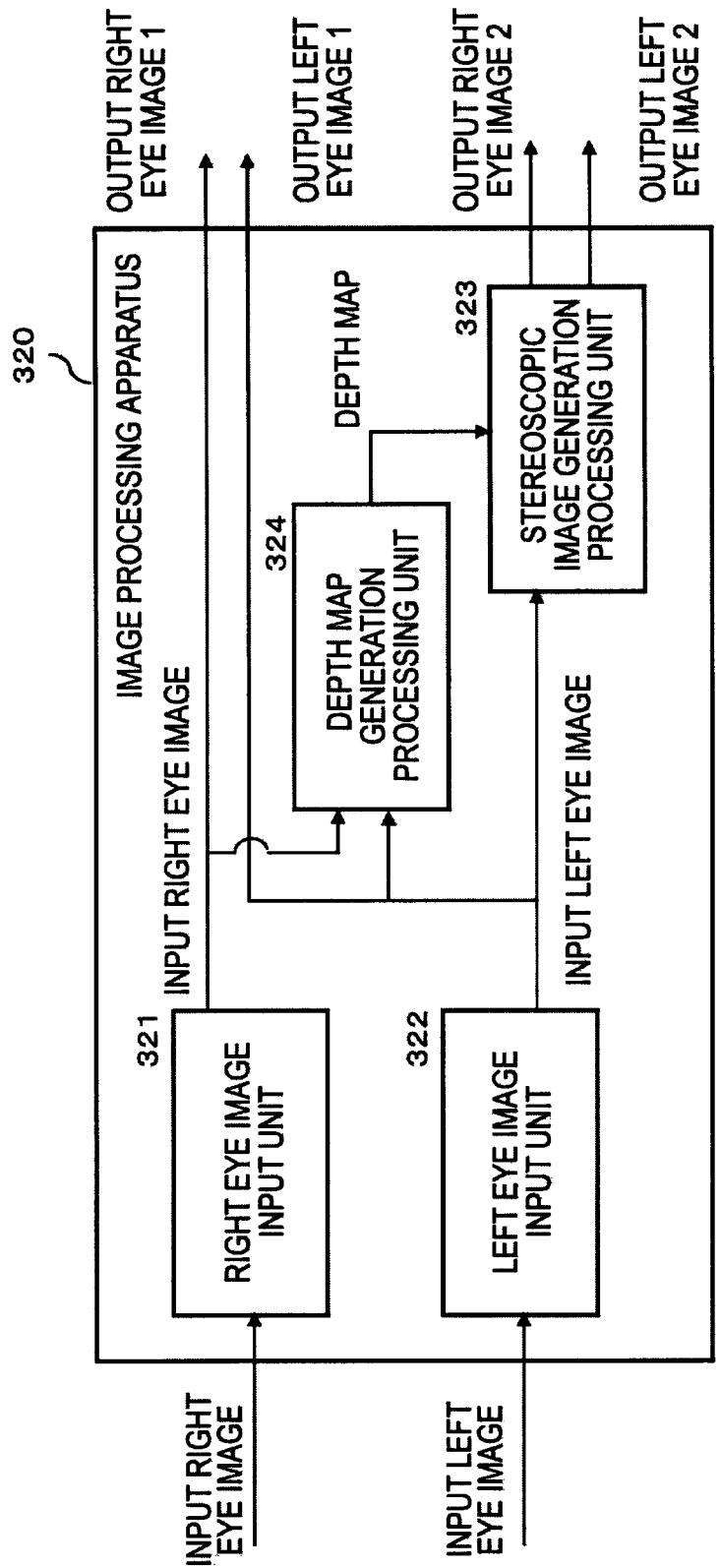
FIG. 19 is a diagram for explaining a configuration example having no output image selection processing unit.

An image processing apparatus 320 illustrated in FIG. 19 includes a right eye image input unit 321, a left eye image input unit 322, a stereoscopic image generation processing unit 323, and a depth map generation processing unit 324.

The image processing apparatus 320 receives a binocular stereoscopic image signal. The input image signal includes right and left stereoscopic images captured by a right and left pair of imaging systems, that is, an input left eye image and an input right eye image. For example, the image processing apparatus 320 receives a pair of two images captured by the binocular imaging system A (10) and the binocular imaging system B (20) illustrated in FIG. 2 from two different viewpoints.

These input right eye image and input left eye image are input to the right eye image input unit 321 and the left eye image input unit 322, respectively.

The stereoscopic image generation processing unit 323 generates a right eye image and a left eye image, which constitute a stereoscopic image, through a 2D/3D conversion process using a depth map, which has been generated by the depth map generation processing unit 324, based on the one input image (the input left eye image in the present example).

The depth map generation processing unit 324 generates and outputs a depth map in which distance information has been associated with pixels of the input images.

The depth map includes data indicating an object distance (a distance from a camera) of pixels constituting an image with respect to an object, and for example, includes an image, which includes luminance information obtained by converting information on a distance to an object from each pixel of an image, and the like.

The image processing apparatus 320 outputs both (a) the stereoscopic image pair of the input right eye image and the input left eye image photographed by the binocular imaging system and input to the image processing apparatus 320, and (b) the stereoscopic image pair of the generated right eye image and the generated left eye image generated by the stereoscopic image generation processing unit 323 through the 2D/3D conversion process.

That is, the image processing apparatus 320 does not perform an output image selection process.

The present embodiment has a configuration in which the output image selection processing unit 105 for selecting an output image is omitted from the embodiment described with reference to the drawings except for FIG. 5.

(2-3. Configuration Example in which Depth Map is not Applied in Output Image Selection Processing Unit)

Next, the configuration example, in which the depth map is not applied in the output image selection processing unit, will be described with reference to FIG. 20.

Figure 20:
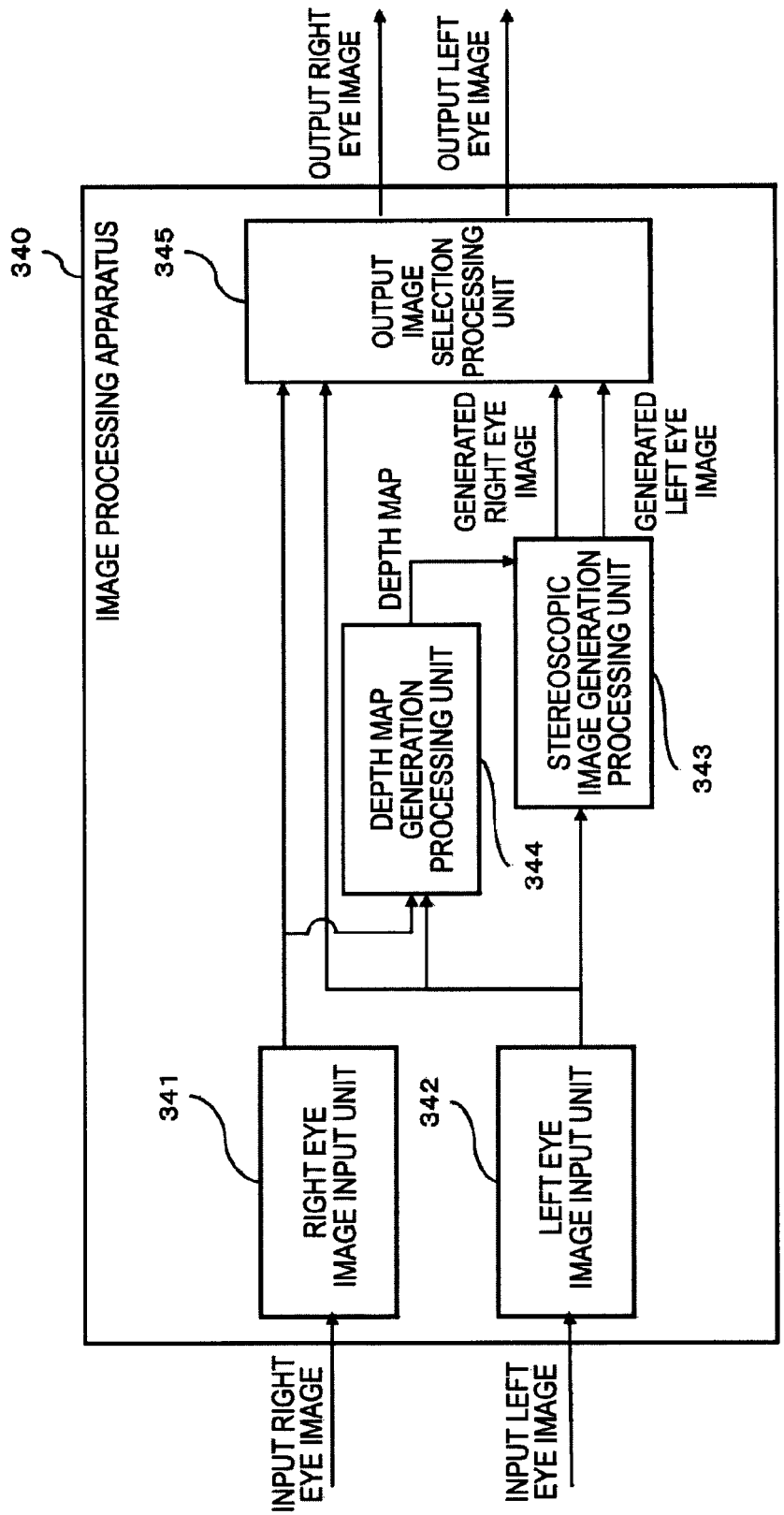
FIG. 20 is a diagram for explaining a configuration example in which a depth map is not applied in an output image selection processing unit.

An image processing apparatus 340 illustrated in FIG. 20 includes a right eye image input unit 341, a left eye image input unit 342, a stereoscopic image generation processing unit 343, a depth map generation processing unit 344, and an output image selection processing unit 345.

Elements are the same as those of the image processing apparatus 100 described with reference to in FIG. 5.

However, the output image selection processing unit 345 of the image processing apparatus 340 illustrated in FIG. 20 performs an output image selection process without using the depth map. This point is different from the embodiment described with reference to FIG. 5.

The image processing apparatus 340 receives a binocular stereoscopic image signal. The input image signal includes right and left stereoscopic images captured by a right and left pair of imaging systems, that is, an input left eye image and an input right eye image. For example, the image processing apparatus 340 receives a pair of two images captured by the binocular imaging system A (10) and the binocular imaging system B (20) illustrated in FIG. 2 from two different viewpoints.

These input right eye image and input left eye image are input to the right eye image input unit 341 and the left eye image input unit 342, respectively.

The stereoscopic image generation processing unit 343 generates a right eye image and a left eye image, which constitute a stereoscopic image, through a 2D/3D conversion process using the depth map, which has been generated by the depth map generation processing unit 344, based on the one input image (the input left eye image in the present example).

The depth map generation processing unit 344 generates and outputs the depth map in which distance information has been associated with pixels of the input images.

The depth map includes data indicating an object distance (a distance from a camera) of pixels constituting an image with respect to an object, and for example, includes an image, which includes luminance information obtained by converting information on a distance to an object from each pixel of an image, and the like.

The output image selection processing unit 345 performs a process of selecting images to be output from (a) the input right eye image and the input left eye image input to the image processing apparatus 100, and (b) the generated right eye image and the generated left eye image generated by the stereoscopic image generation processing unit 343.

However, in the present embodiment, the output image selection processing unit 345 performs an output image selection process without using the depth map. This point is different from the embodiment described with reference to FIG. 5.

A processing example performed by the output image selection processing unit 345 for performing the output image selection process based on input image information without using depth information will be described with reference to FIG. 21.

Figure 21:
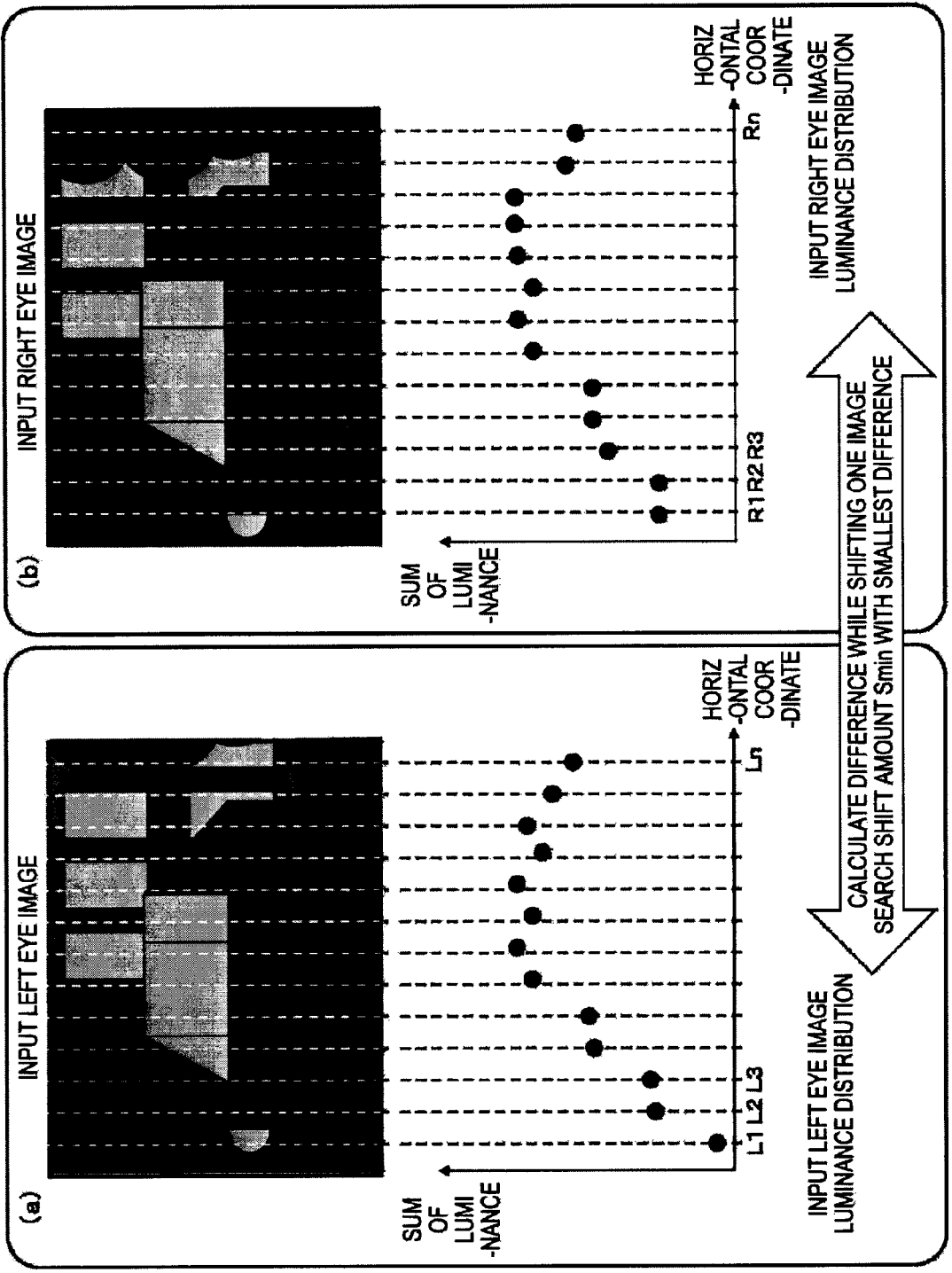
FIG. 21 is a diagram for explaining a processing example performed by an output image selection processing unit for performing an output image selection process based on input image information without using depth information.

FIG. 21 is a diagram for explaining an example of the output image selection process in the output image selection processing unit 345.

FIG. 21 illustrates (a) an input left eye image and an input left eye image luminance distribution (a luminance distribution in which an image is divided in the horizontal direction and the sum of luminance values of divided areas is shown), and (b) an input right eye image and an input right eye image luminance distribution (a luminance distribution in which an image is divided in the horizontal direction and the sum of luminance values of divided areas is shown).

Figure 2:
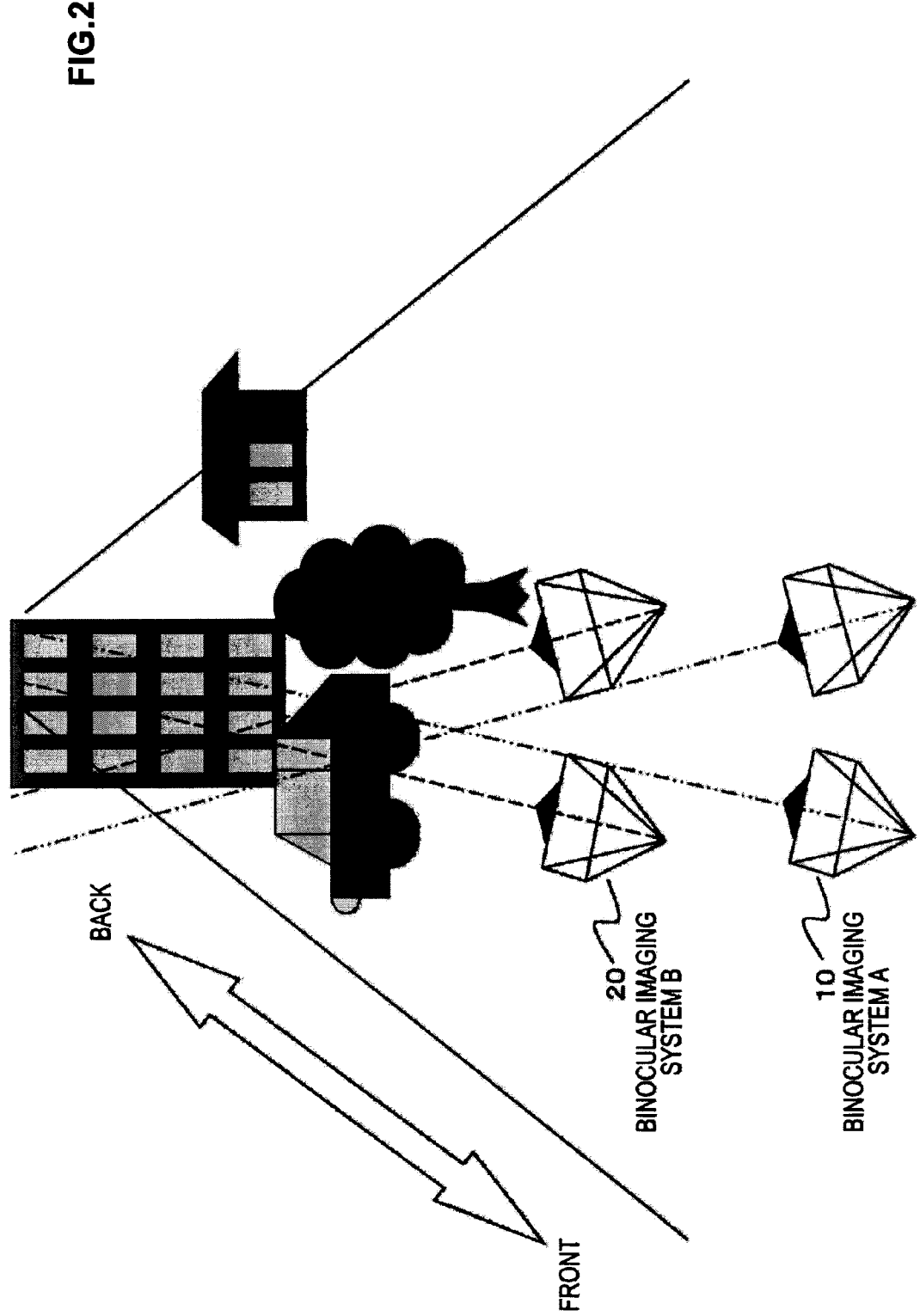
FIG. 2 is a diagram illustrating an example of stereoscopic imaging performed by two binocular imaging systems having different distances from an object.
Figure 3:
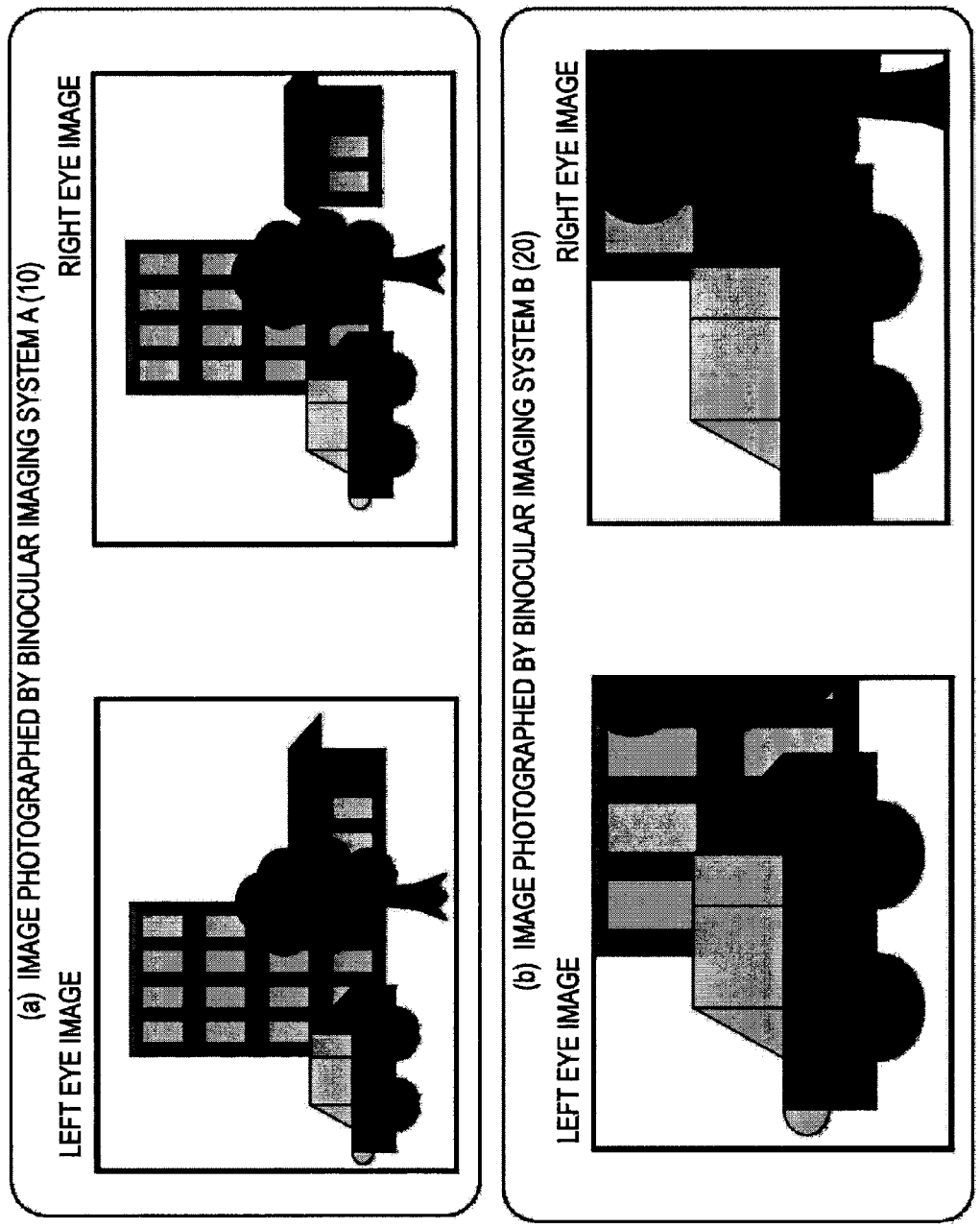
FIG. 3 is a diagram illustrating images as imaging results performed by two binocular imaging systems illustrated in FIG. 2.
Figure 4:
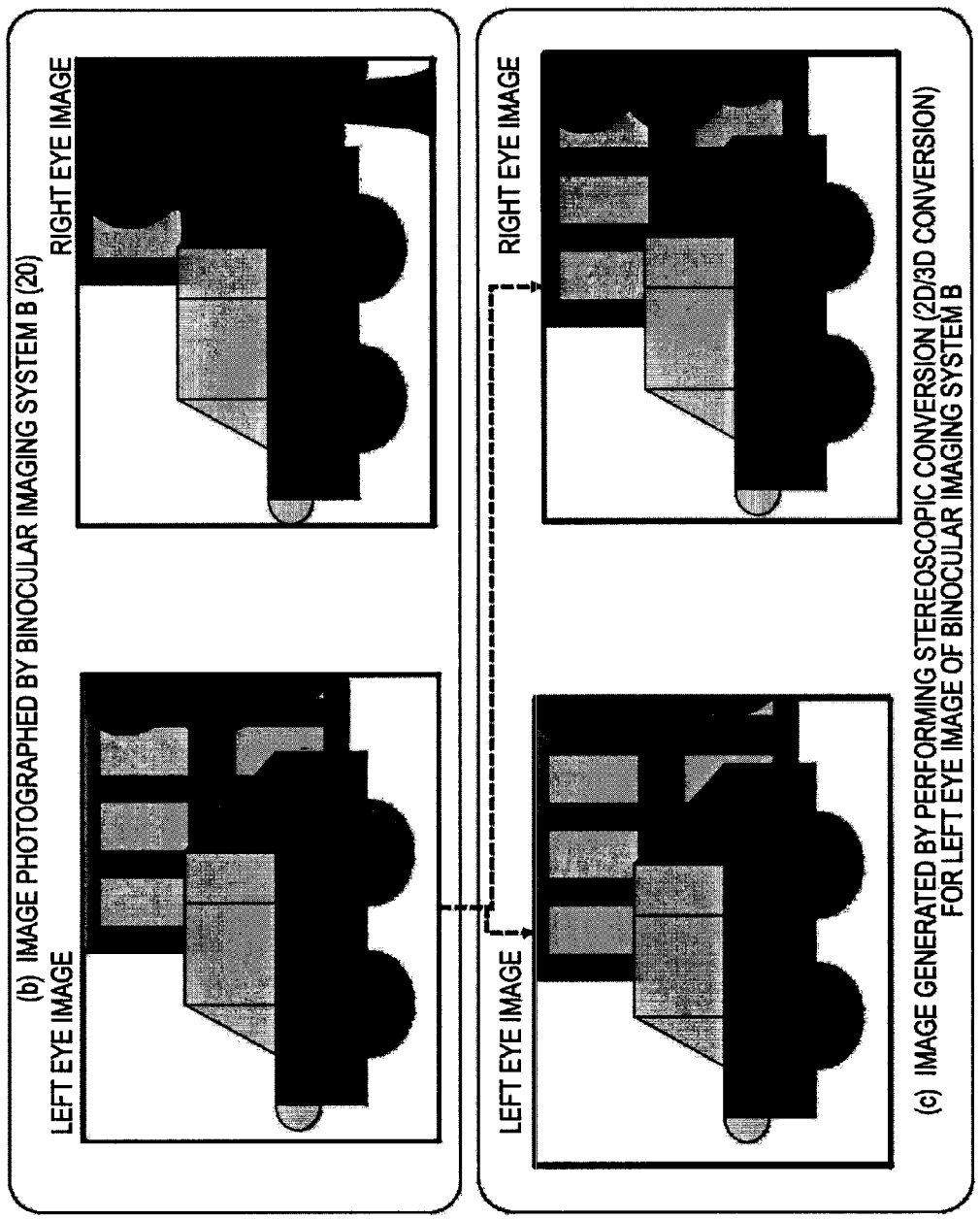
FIG. 4 is a diagram illustrating a process for performing a 2D/3D conversion process on one left eye image photographed by a binocular imaging system B (20) illustrated in FIG. 2 to generate a left eye image and a right eye image as stereoscopic images, and the processing result.

The input left eye image and the input right eye image, for example, correspond to a pair of two images captured by the binocular imaging system A (10) and the binocular imaging system B (20) illustrated in FIG. 2 from two different viewpoints, and are input to the output image selection processing unit 345 through the left eye image input unit 342 and the right eye image input unit 341 illustrated in FIG. 20.

The output image selection processing unit 345 analyzes the image luminance distribution illustrated at the lower portion of FIG. 21 based on these input images. The output image selection processing unit 345 divides each of the input left eye image and the input right eye image in the horizontal direction, and calculates a luminance distribution indicating the sum of luminance of each division area.

As illustrated in FIG. 21, the output image selection processing unit 345 divides each of the right and left images into n areas in the horizontal direction, and calculates the sum of luminance in the vertical direction of each division area.

Moreover, differences among luminance values are calculated in horizontal coordinates and the sum of the differences is obtained, so that the similarity of the right and left images is calculated. At this time, one image is uniformly shifted and an average of the sum of the differences is calculated, so that it is possible to calculate the similarity of the right and left images according to a shift amount. A value of a shift amount, at which the similarity is minimum, is an estimated value of parallax of the right and left images.

In detail, for example, the following process is performed. In the following equations, Lx denotes the sum value of luminance in L0 to Ln and Rx denotes the sum value of luminance in R0 to Rn.

Shift amount 0: average of sum of differences=$((L0-R0)+(L1-R1)+\ldots+(Ln-Rn))/n$ Shift amount 1: average of sum of differences=$((L0-R1)+(L1-R2)+\ldots+(Ln-1-Rn))/(n-1)$ Shift amount 2: average of sum of differences=$((L0-R2)+(L1-R3)+\ldots+(Ln-2-Rn))/(n-2)$ The average value of the sum of the differences calculated by the equations above indicates the similarity of two images according to the shift amount, and the value of the shift amount having the minimum average value of the sum of the differences is an estimated value of the parallax of the right and left images.

The output image selection processing unit 345 allows the estimated value of the right and left parallax to be equal to the center of the depth histogram described with reference to FIG. 13 to FIG. 17, and uses the estimated value when selecting output images.

That is to say, when the estimated value of the right and left parallax is equal to or more than a shift amount (an absolute value thereof) Smin with a predetermined size, the output image selection processing unit 345 outputs the generated stereoscopic image pair generated by the stereoscopic image generation processing unit. When the estimated value of the right and left parallax is smaller than Smin, the output image selection processing unit 345 outputs the input stereoscopic image pair, that is, performs the output image selection process.

Furthermore, in order to reduce a calculation amount, it is effective to use a method of limiting shift amounts to verify the sum of right and left differences to Smin, calculating the sum of differences from −Smin to Smin by sequentially changing the shift amounts, outputting the generated stereoscopic image pair when the sum of differences becomes less than a predetermined threshold value Ds, and outputting the input stereoscopic image pair when the sum of differences exceeds the predetermined threshold value Ds.

As described above, it is possible to simply perform the output image selection process using only the input images.

(2-4. Configuration Example in which Output Image Selection is Performed based on Imaging Information)

Next, the configuration example in which the output image selection is performed based on the imaging information will be described.

An image processing apparatus 500 illustrated in FIG. 22 has substantially the same configuration as that of the image processing apparatus 340 described with reference to FIG. 20, except that "imaging information 500A and 500B such as a photographing mode or a focus position" is input to an output image selection processing unit 505 from a binocular stereoscopic imaging apparatus 400.

Figure 22:
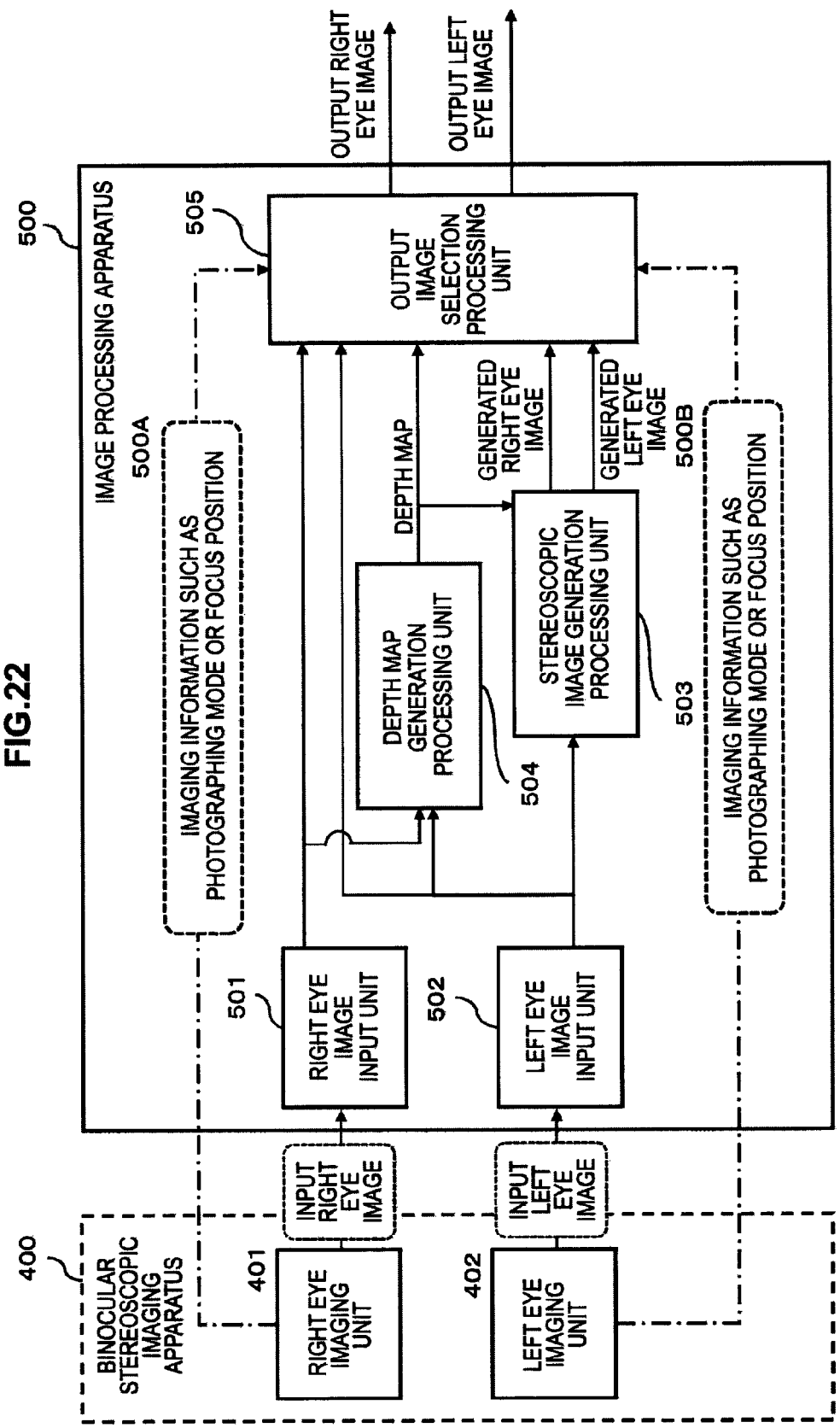
FIG. 22 is a diagram for explaining a configuration example in which output image selection is performed based on imaging information.

In the configuration illustrated in FIG. 22, the "imaging information 500A such as a photographing mode or a focus position" is input to the output image selection processing unit 505 from a right eye imaging unit 401 of the binocular stereoscopic imaging apparatus 400, and the "imaging information 500B such as a photographing mode or a focus position" is input to the output image selection processing unit 505 from a left eye imaging unit 402 of the binocular stereoscopic imaging apparatus 400.

In addition, the imaging information input to the output image selection processing unit 505 includes various types of content. For example, the imaging information includes metadata such as focus position information or photographing mode information.

The focus position information has a high correlation with a distance to an object. For example, when a focus position is near, it is highly probable that an object near a camera is being photographed. Thus, in order to obtain a stereoscopic image to be easily viewed, it is necessary to output the generated stereoscopic image pair generated by the stereoscopic image generation processing unit. Meanwhile, when the focus position is far, it is highly probable that an object far from the camera is being photographed. Thus, the input stereoscopic image pair is output as is. When such information is input to the output image selection processing unit 505, the output image selection processing unit 505 outputs the input stereoscopic image pair as is.

Moreover, in relation to functions of a digital camera, the photographing mode information automatically selected or selected by a user is also effective for estimating a distance to an object. For example, when a "macro mode" is selected, it is highly probable that an object near the camera is being photographed. Thus, in order to obtain a stereoscopic image to be easily viewed, it is necessary to output a generated stereoscopic image pair generated by a stereoscopic image generation processing unit 503 through the 2D/3D conversion process. When such information is input to the output image selection processing unit 505, the output image selection processing unit 505 selects and outputs the generated stereoscopic image pair generated by the stereoscopic image generation processing unit 503 through the 2D/3D conversion process.

Meanwhile, when a "scenery mode" is selected, it is highly probable that an object far from the camera is being photographed. Thus, the input stereoscopic image pair is output as is. When such information is input to the output image selection processing unit 505, the output image selection processing unit 505 outputs the input stereoscopic image pair as is.

So far, the example in which the two parameters are used as the imaging information has been described. However, it is possible to perform the output image selection process using imaging information having correlation with a distance to an object.

Furthermore, in the configuration example illustrated in FIG. 22, the imaging information in the right and left-eye imaging systems is set to be input. However, it may be possible to employ a configuration in which one of the right- and left-eye imaging systems is used.

Figure 23:
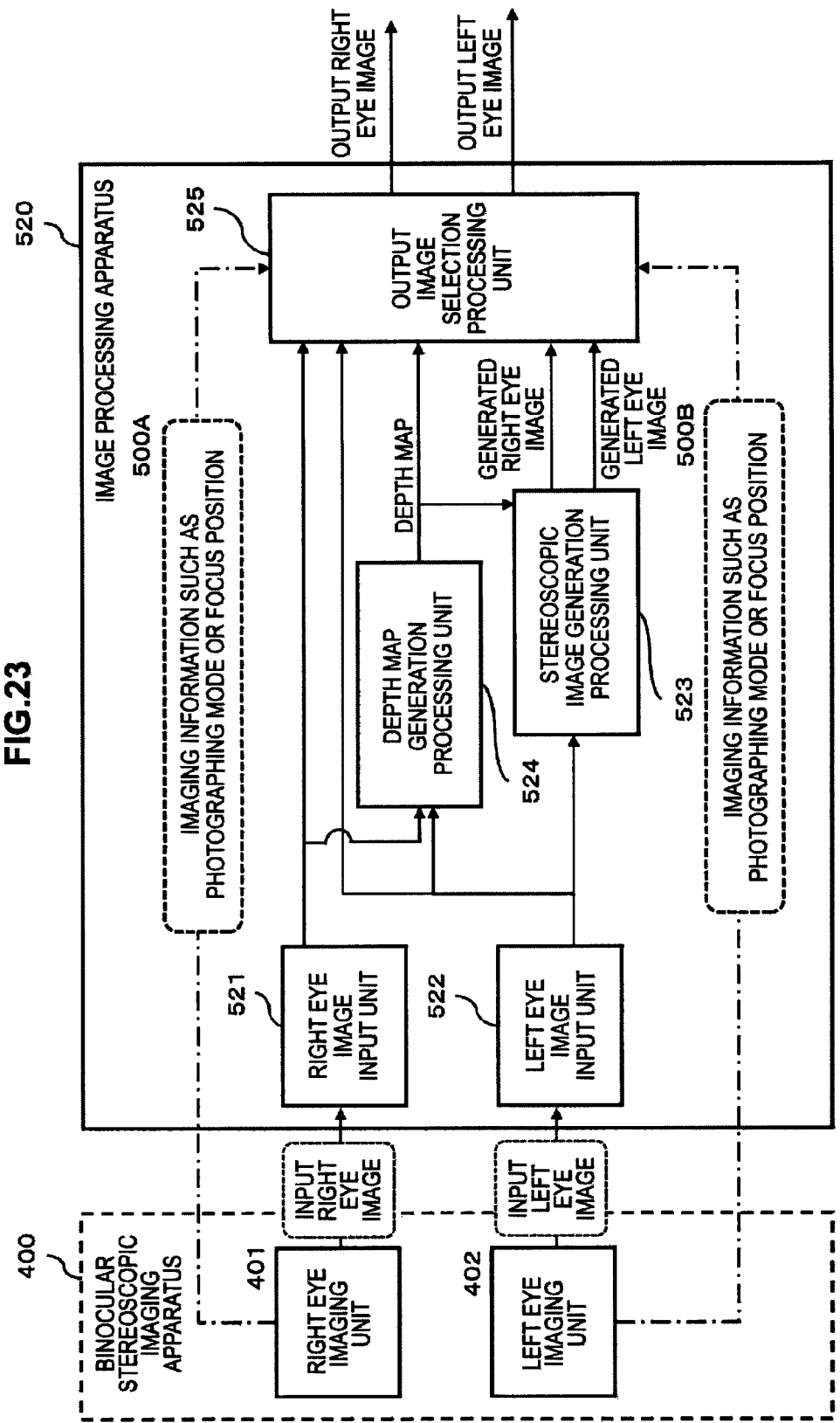
FIG. 23 is a diagram for explaining a configuration example in which a depth map is input to an output image selection processing unit together with imaging information from an imaging apparatus, and output images are selected.

In addition, in the configuration illustrated in FIG. 22, the output image selection processing unit 505 performs the output image selection process based on the imaging information input from the imaging apparatus 400. For example, as with an image processing apparatus 520 illustrated in FIG. 23, it may be possible to employ a configuration in which, in addition to the imaging information 500A and 500B from the imaging apparatus 400, a depth map generated by a depth map generation processing unit 524 is input to an output image selection processing unit 525, and output images are selected in consideration of a comparison result of the above-mentioned depth map and a threshold value, and the imaging information.

For example, it is possible to employ a method of weighting factors including a depth map, an input image pair, and imaging information, and finally selecting output images.

(2-5. Configuration Example in which Output Image Selection is Performed based on User Selection Information)

Next, the configuration example in which the output image selection is performed based on the selection information input by a user will be described.

An image processing apparatus 540 illustrated in FIG. 24 has substantially the same configuration as the image processing apparatus 340 described with reference to FIG. 20, except that "selection information 500C from a user" is input to the output image selection processing unit 505 through an input unit (not illustrated).

So far, the configurations in which the output image selection processing unit automatically selects the output stereoscopic image pair have been described. However, in the image processing apparatus 540 illustrated in FIG. 24, an output image selection processing unit 545 receives selection information input by a user and selects output images according to the input of the selection information.

Figure 24:
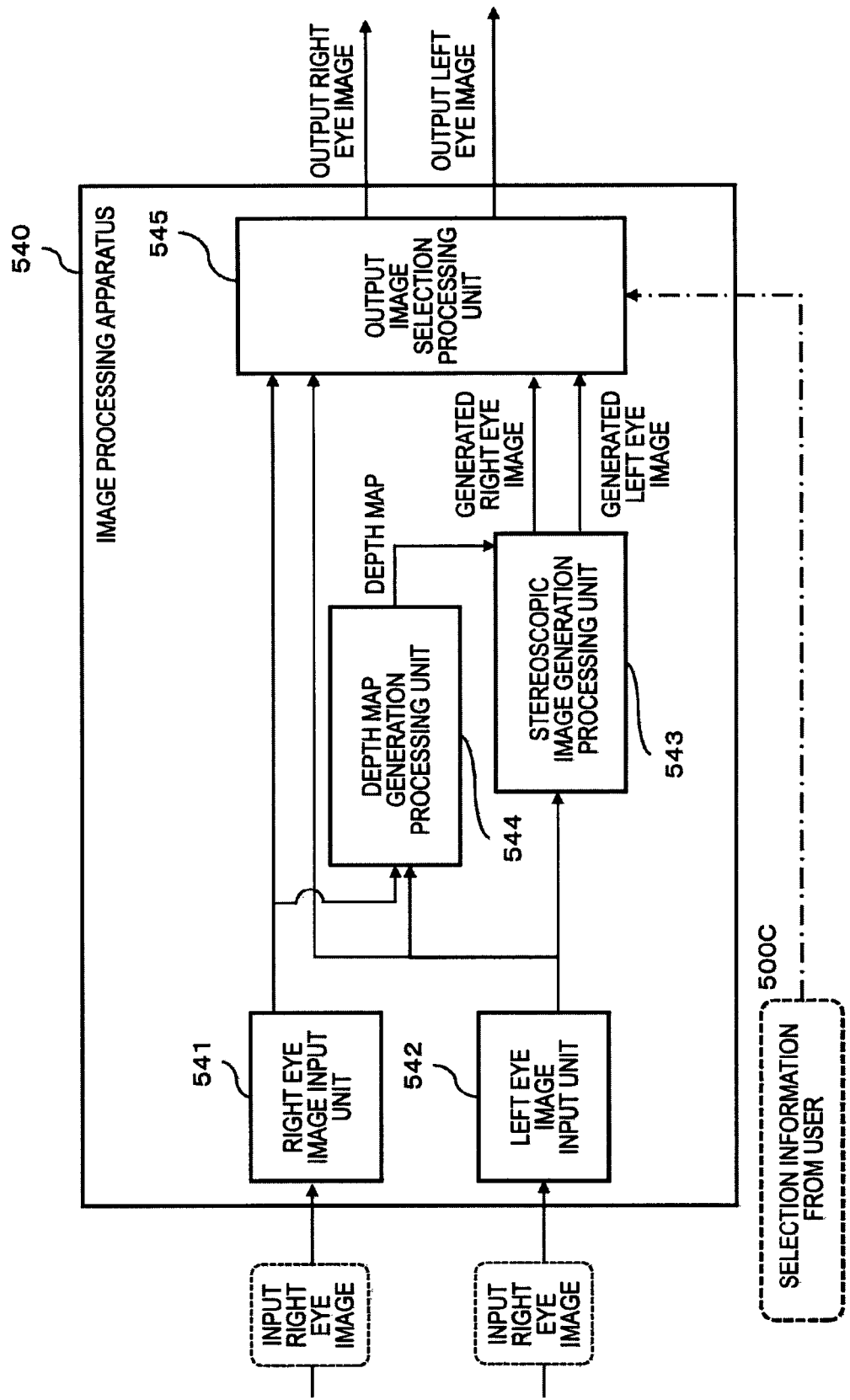
FIG. 24 is a diagram for explaining a configuration example in which output images are selected based on selection information input by a user.

In the image processing apparatus 540 illustrated in FIG. 24, it is assumed that a user manually selects an input stereoscopic image pair and a generated stereoscopic image pair. For example, an item such as "right and left camera modes" or "3D conversion mode" may be displayed on a preview screen and may be selected by the intention of the user.

In addition, as described above, it is possible for the output image selection processing unit to select output images using one of the depth map, the imaging information, and the user selection information, or a combination thereof.

Furthermore, when selecting the output images, in addition to a configuration in which the output image selection processing unit is set to select one of (a) the stereoscopic image pair of the input right eye image and the input left eye image photographed by the binocular imaging system and input to the image processing apparatus, and (b) the stereoscopic image pair of the generated right eye image and the generated left eye image generated by the stereoscopic image generation processing unit through the 2D/3D conversion process, it may be possible to employ a configuration in which the image pair including both (a) and (b) is selected as the output image as described with reference to FIG. 15 to FIG. 17.

(2-6. Configuration Example in which Depth Map Generation Processing Unit is Omitted)

Next, the configuration example in which the depth map generation processing unit has been removed will be described with reference to FIG. 25.

Figure 25:
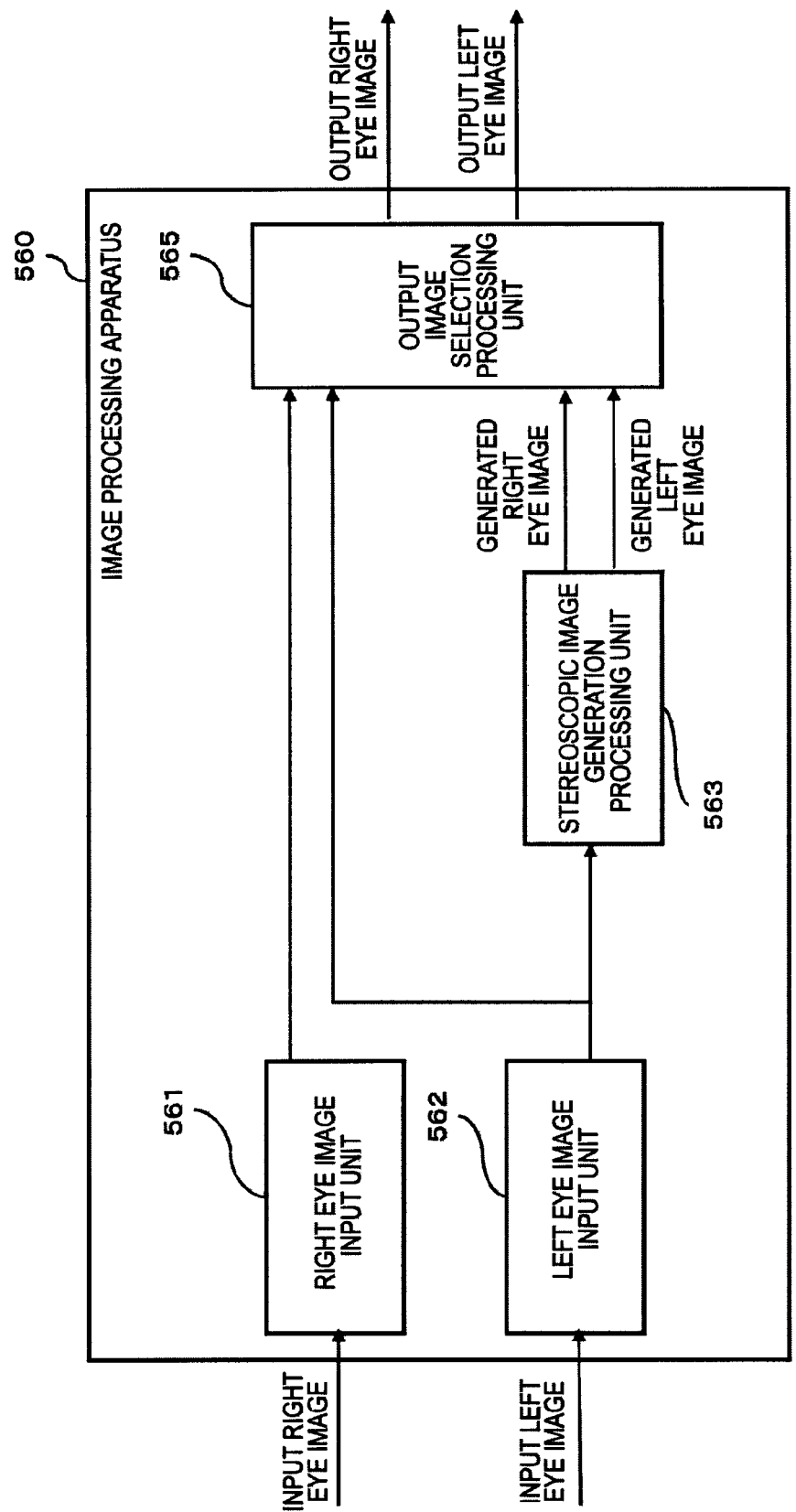
FIG. 25 is a diagram for explaining a configuration example having no depth map generation processing unit.

An image processing apparatus 560 illustrated in FIG. 25 has a configuration in which the depth map generation processing unit is omitted from the image processing apparatus 100 illustrated in FIG. 5.

That is, in this configuration, an output image selection processing unit 565 selects output images without using the depth map.

The output image selection processing unit 565, for example, performs image selection based on one of input image information, imaging information, and user selection information, or a combination thereof.

Furthermore, in addition to a configuration in which one of (a) the stereoscopic image pair of the input right eye image and the input left eye image photographed by the binocular imaging system and input to the image processing apparatus, and (b) the stereoscopic image pair of the generated right eye image and the generated left eye image generated by the stereoscopic image generation processing unit through the 2D/3D conversion process is selected as an image pair to be output, it may be possible to employ a configuration in which the image pair including both (a) and (b) is selected as the output image as described with reference to FIG. 15 to FIG. 17.

3. Embodiment having Configuration for Controlling Input Image for Image Processing Apparatus So far, all the above-mentioned image processing apparatuses receive the right and left eye image signals. However, before the right and left stereoscopic image pairs are input to the image processing apparatus, when it has been determined that a generated stereoscopic image pair having passed through a stereoscopic conversion process will be output, it is not necessary to input a right eye image not used in the stereoscopic conversion to the image processing apparatus.

Moreover, before imaging is performed by an imaging apparatus, when it has been determined that the generated stereoscopic image pair having passed through the stereoscopic conversion process will be output, the right eye image not used in the stereoscopic conversion does not need to be captured.

As described above, when the output images are set, it is possible to perform control to simplify an image input process or an image photographing process. Hereinafter, an example of an apparatus having such a control configuration will be described.

(3-1. Configuration Example in which Input Image Selection is Performed before Input Process)

First, the configuration example in which the input image selection is performed before the input process will be described. In detail, with reference to FIG. 26, a description will be provided for a configuration of an image processing apparatus in which, when 2D/3D conversion process images have been determined as output images, only one of the two images photographed by the binocular imaging system, for example, only the left eye image, is input to the apparatus.

An image processing apparatus 700 illustrated in FIG. 26 has a configuration in which an input image selection processing unit 701 has been added to the configuration of the image processing apparatus 300 described with reference to FIG. 18.

The image processing apparatus 700 performs a process of receiving an input right eye image and an input left eye image from a binocular stereoscopic imaging apparatus 600 having a right eye imaging unit 601 and a left eye imaging unit 602, and performing processes.

The input image selection processing unit 701 determines whether a stereoscopic image pair output from the image processing apparatus 700 is a stereoscopic image pair (hereinafter referred to as an imaging stereoscopic image pair) captured by the right eye imaging unit 601 and the left eye imaging unit 602 of the imaging apparatus 600, or a generated stereoscopic image pair obtained by performing 2D/3D conversion (stereoscopic conversion) in a stereoscopic image generation processing unit 704 for one image captured by the left eye imaging unit 602, inputs the right and left eye image signals to the image processing apparatus 700 in the former case, and inputs only the left eye image signal to the image processing apparatus 700 in the latter case.

Figure 26:
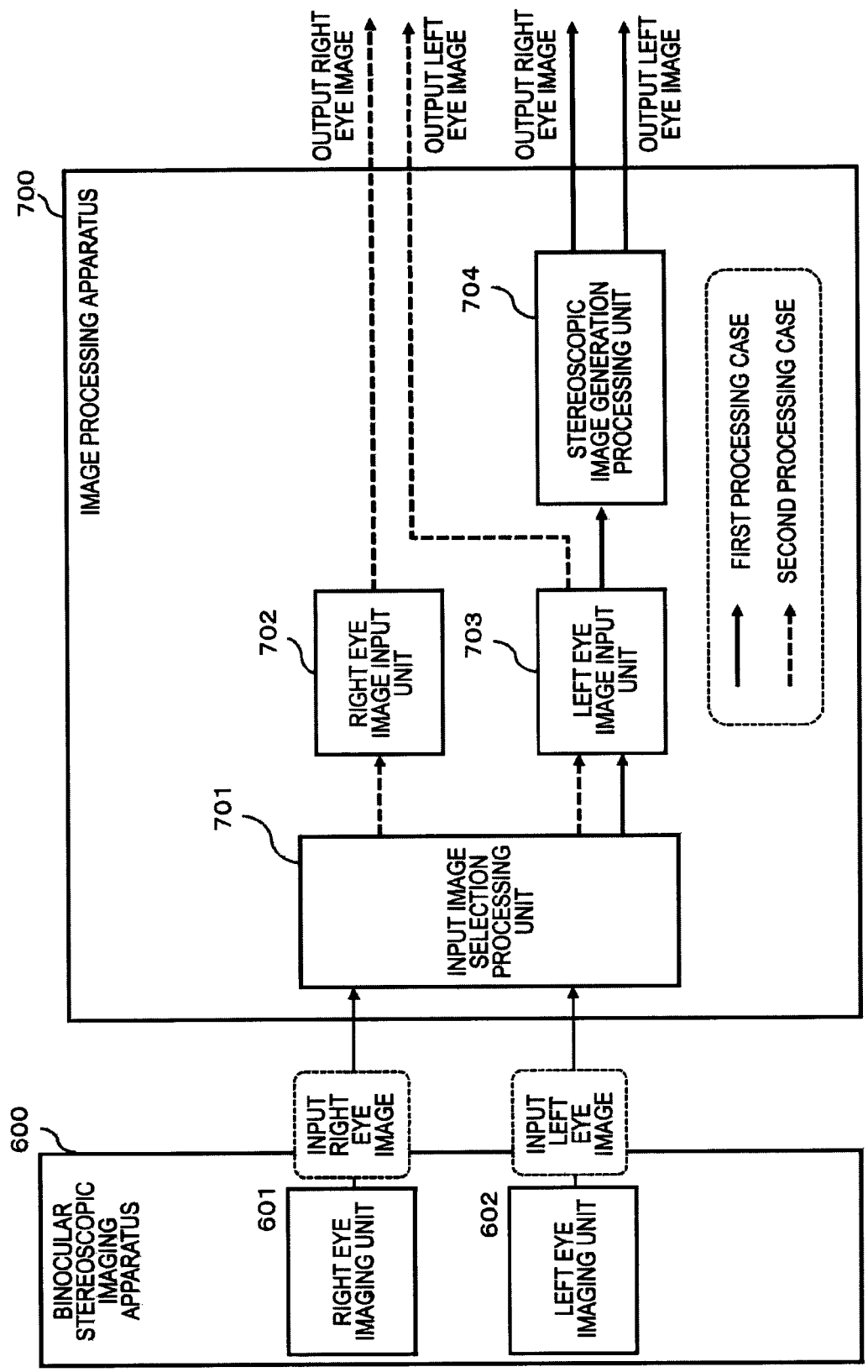
FIG. 26 is a diagram for explaining the configuration of an image processing apparatus for performing input image selection before an input process.

In the image processing apparatus 700 illustrated in FIG. 26, data flows in different processing cases are indicated by a solid line and a dotted line.

A data flow following an arrow indicated by the solid line in the image processing apparatus 700 corresponds to processing when the output of the image processing apparatus 700 is the generated stereoscopic image pair generated through the 2D/3D conversion (stereoscopic conversion) in the stereoscopic image generation processing unit 704, and shows a first processing case in which only the left eye image signal is input.

A data flow following an arrow indicated by the dotted line in the image processing apparatus 700 corresponds to processing when the output of the image processing apparatus 700 is the stereoscopic image pair captured by the right eye imaging unit 601 and the left eye imaging unit 602 of the imaging apparatus 600, and shows a second processing case in which the right and left eye image signals are input.

In addition, the input image selection processing unit 701 performs a process of determining the output images of the image processing apparatus 700 according to the selection of input images, and determining input images based on information on the determination.

For the process of determining the output image, the input image selection processing unit 701 performs image selection based on one of image selection based on input image information, image selection based on imaging information, and image selection based on user selection information, or a combination thereof, similarly to the above-mentioned embodiment.

Figure 27:
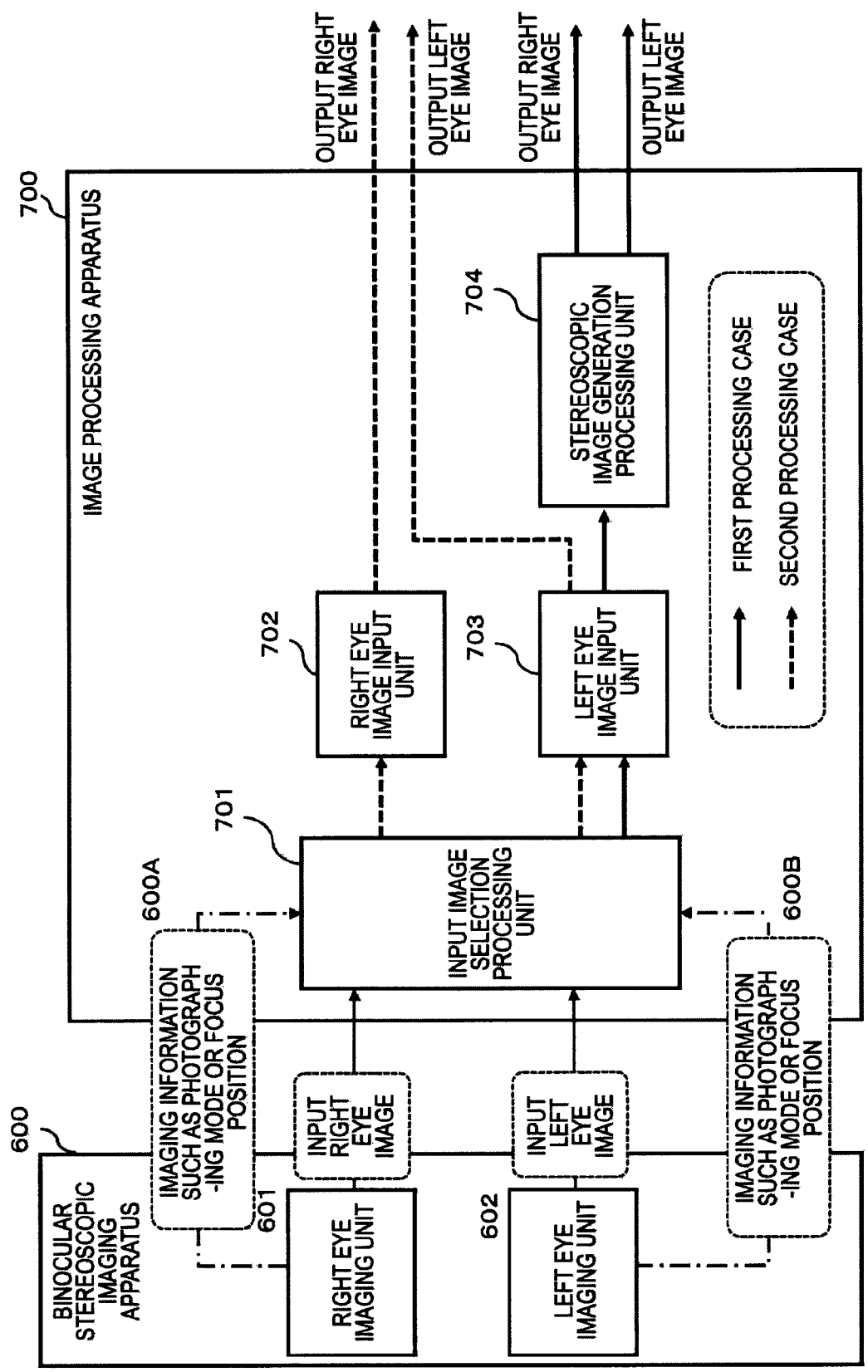
FIG. 27 is a diagram for explaining a configuration example in which output images are determined based on imaging information, and input images are selected based on the determination of the output images.

In the configuration of the image processing apparatus 700 illustrated in FIG. 26, a configuration example in which the input image selection processing unit 701 determines the output images based on the imaging information and selects input images based on the determination of the output images corresponds to a configuration illustrated in FIG. 27.

In the image processing apparatus 700 of FIG. 27, the input image selection processing unit 701 receives "imaging information 600A and 600B such as a photographing mode or a focus position" from the binocular stereoscopic imaging apparatus 600, and determines an image pair to be output from the image processing apparatus 700. Moreover, the input image selection processing unit 701 selects input images based on the determination of the output images.

In FIG. 27, a data flow following an arrow indicated by the solid line in the image processing apparatus 700 corresponds to processing when the output of the image processing apparatus 700 is the generated stereoscopic image pair generated through the 2D/3D conversion (stereoscopic conversion) in the stereoscopic image generation processing unit 704, and shows a first processing case in which only the left eye image signal is input.

A data flow following an arrow indicated by the dotted line in the image processing apparatus 700 corresponds to processing when the output of the image processing apparatus 700 is the stereoscopic image pair captured by the right eye imaging unit 601 and the left eye imaging unit 602 of the imaging apparatus 600, and shows a second processing case in which the right and left eye image signals are input.

(3-2. Configuration Example in which Input Image Selection is Performed before Imaging)

Next, the configuration example in which the input image selection is performed before imaging will be described. In detail, with reference to FIG. 28, a description will be provided for a control configuration in which, when 2D/3D conversion process images have been determined as output images, an image to be photographed by the binocular imaging system is set as only a left eye image, and photographing of a right eye image is stopped.

An image processing apparatus 720 illustrated in FIG. 28 has a configuration in which an input image selection processing unit 721 has been added to the configuration of the image processing apparatus 300 described with reference to FIG. 18.

The image processing apparatus 720 performs a process of receiving an input right eye image and an input left eye image from the binocular stereoscopic imaging apparatus 600 having the right eye imaging unit 601 and the left eye imaging unit 602, and performing processes.

The input image selection processing unit 721 determines whether a stereoscopic image pair output from the image processing apparatus 720 is a stereoscopic image pair (hereinafter referred to as an imaging stereoscopic image pair) captured by the right eye imaging unit 601 and the left eye imaging unit 602 of the imaging apparatus 600, or a generated stereoscopic image pair obtained by performing 2D/3D conversion (stereoscopic conversion) in a stereoscopic image generation processing unit 724 for one image captured by the left eye imaging unit 602, inputs the right and left eye image signals to the image processing apparatus 720 in the former case, and inputs only the left eye image signal to the image processing apparatus 720 in the latter case. Moreover, the input image selection processing unit 721 outputs a control signal to the imaging apparatus 600 to perform control of stopping the photographing of the right eye image in the right eye imaging unit 601.

Figure 28:
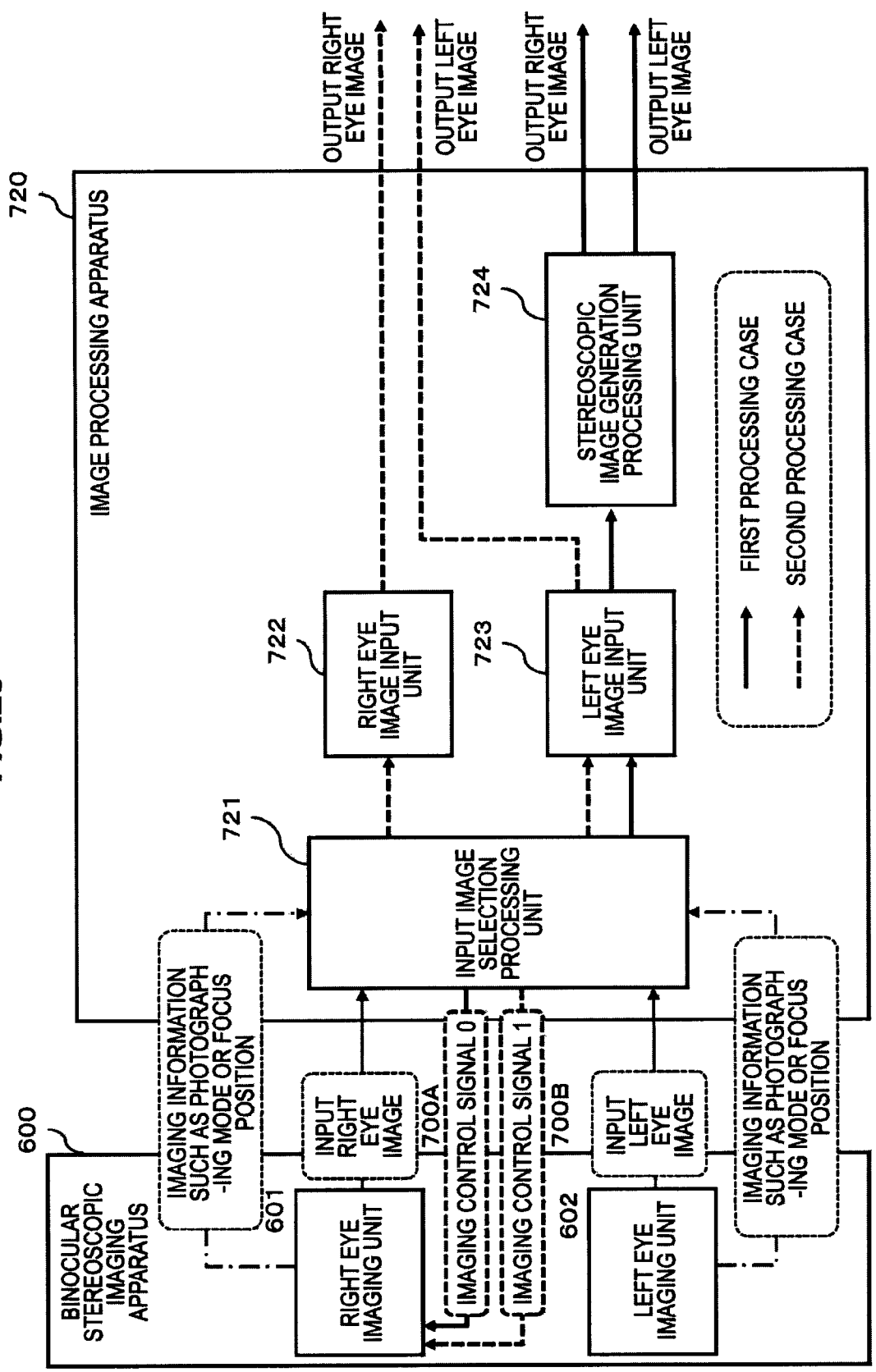
FIG. 28 is a diagram for explaining a configuration performing a control in which, when 2D/3D conversion process images are determined as output images, an image photographed by a binocular imaging system is set as only a left eye image, and photographing of a right eye image is stopped.

In FIG. 28, a "control signal 0 (700A)" is a control signal for stopping the photographing of the right eye imaging unit 601, and a "control signal 1 (700B)" is a control signal for performing the photographing of the right eye imaging unit 601.

In this configuration, imaging control is performed to determine whether a stereoscopic image pair to be output is an imaging stereoscopic image pair or a generated stereoscopic image pair before the imaging of the imaging apparatus is performed, and to prevent the right eye image not used in the stereoscopic conversion from being captured if it is determined that the generated stereoscopic image pair will be output.

In addition, in relation to an input image selection process in this case, it may be possible to employ a method of selecting an input image pair based on metadata to be subject to imaging, such as focus position information or imaging mode information, a configuration in which input images are selected by a user, and the like.

FIG. 28 illustrates a configuration example in which the input image selection processing unit 721 receives the imaging information from the imaging apparatus 600 to determine output images, and performs an imaging control process based on the determined output images.

Figure 29:
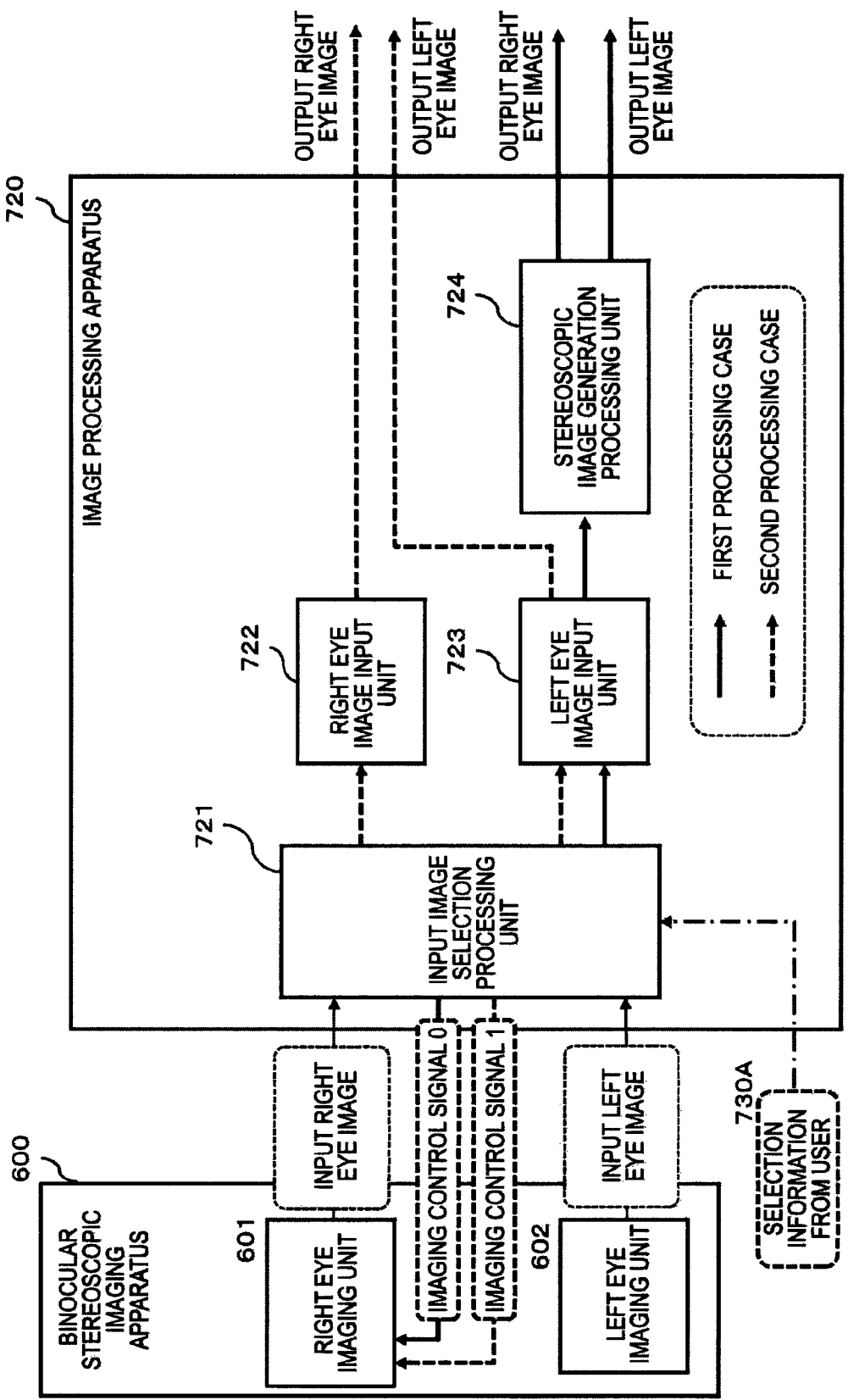
FIG. 29 is a diagram for explaining a configuration in which an input image selection processing unit receives user selection information through an input unit (not shown) to determine output images, and performs an imaging control process based on the determined output images.

FIG. 29 illustrates a configuration example in which the input image selection processing unit 721 receives user selection information through an input unit (not illustrated) to determine output images, and performs an imaging control process based on the determined output images.

In either of FIG. 28 and FIG. 29, a data flow following an arrow indicated by the solid line in the image processing apparatus 720 corresponds to processing when the output of the image processing apparatus 720 is the generated stereoscopic image pair generated through the 2D/3D conversion (stereoscopic conversion) in the stereoscopic image generation processing unit 724, and shows a first processing case in which only the left eye image signal is input.

A data flow following an arrow indicated by the dotted line in the image processing apparatus 720 corresponds to processing when the output of the image processing apparatus 720 is the stereoscopic image pair captured by the right eye imaging unit 601 and the left eye imaging unit 602 of the imaging apparatus 600, and shows a second processing case in which the right and left eye image signals are input.

4. Configuration in which Depth Map is Input from External Apparatus

For example, the image processing apparatus 100 described with reference to FIG. 5 has a configuration in which the depth map generation processing unit is provided in the image processing apparatus and the depth map is generated in the image processing apparatus.

However, it may be possible to employ a configuration in which the depth map is input from a separate apparatus outside the image processing apparatus.

Figure 30:
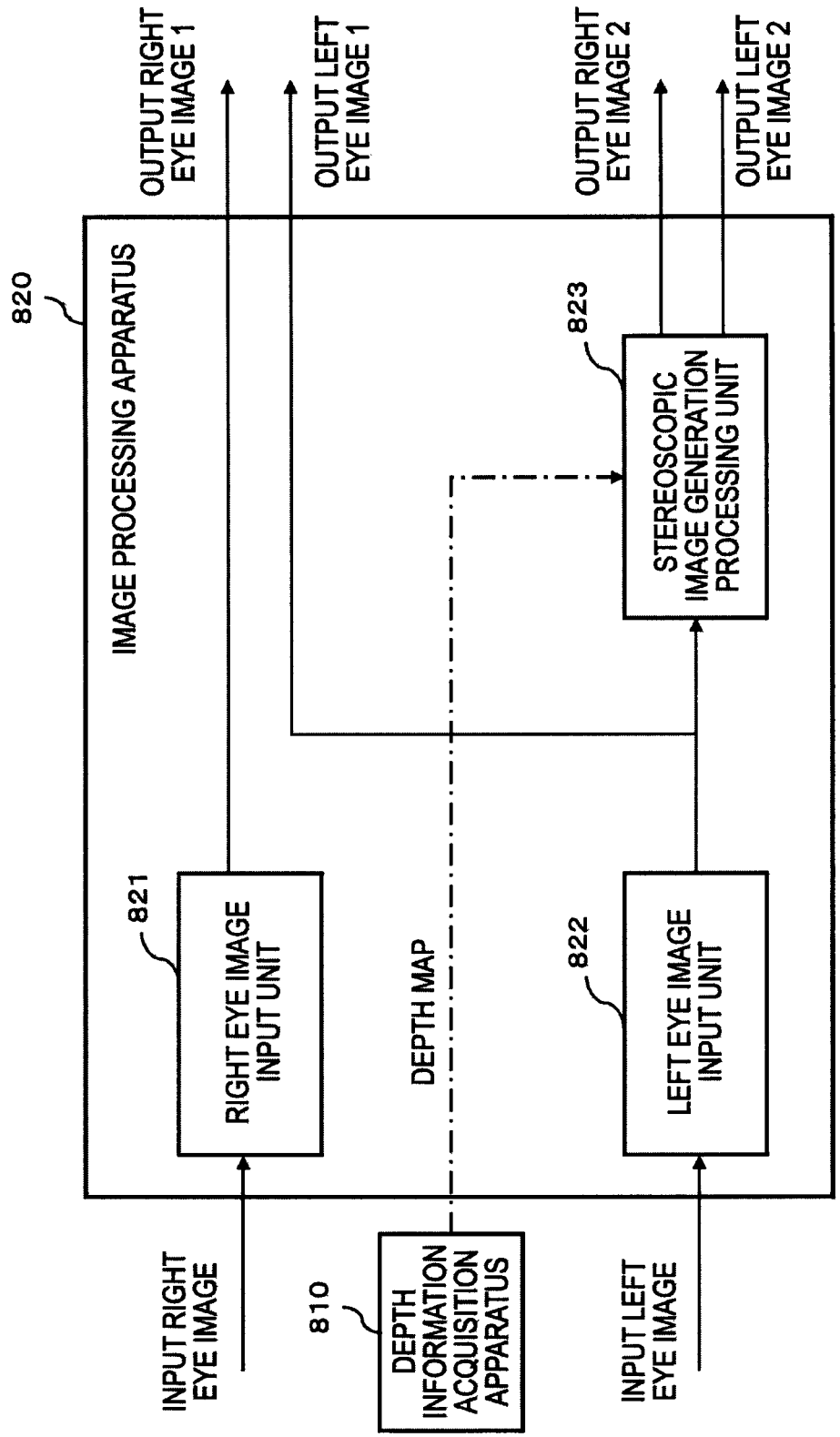
FIG. 30 is a diagram for explaining a configuration in which a depth map generation processing unit is not provided, and a depth map generated by an external depth information acquisition apparatus is input and used in a stereoscopic image generation processing unit.

For example, this configuration is illustrated in FIG. 30.

In a configuration illustrated in FIG. 30, an image processing apparatus 820 has no depth map generation processing unit, receives a depth map generated by an external depth information acquisition apparatus 810, and uses the depth map in a stereoscopic image generation processing unit 823.

It is assumed that the depth information acquisition apparatus 810, for example, uses a range sensor and the like.

In the image processing apparatus 820 illustrated in FIG. 30, an input stereoscopic image pair is input to the stereoscopic image generation processing unit 823 through image input units 821 and 822, and the stereoscopic image generation processing unit 823 acquires the depth map from the depth information acquisition apparatus 810 as an external apparatus.

Then, processing in the stereoscopic image generation processing unit 823 is the same as the processing in the embodiments described above.

5. Configuration in which Image to be Subject to 2D/3D Conversion Process is Selectable as Right Eye Image The above-mentioned embodiments have described the processing example in which an image input to the stereoscopic image generation processing unit is set as the left eye image, and an image to be subject to the 2D/3D conversion process is set as the left eye image. However, it may be possible to employ a configuration in which the 2D/3D conversion process is performed on the right eye image.

In a configuration example illustrated in FIG. 31, an image processing apparatus 840 sets an image to be input to a stereoscopic image generation processing unit 843 as the right eye image, and performs the 2D/3D conversion process based on the right eye image to generate a stereoscopic image.

Furthermore, as with an image processing apparatus 850 illustrated in FIG. 32, it may be possible to employ a configuration in which a stereoscopic conversion image selection processing unit 853 is provided and it is possible to select an image to be input to a stereoscopic image generation processing unit 854 as the right eye image or the left eye image.

Various selection criteria are available. For example, it is possible to determine and select one of the right and left images that is easily viewable by the human eye. In detail, it is possible to select a comprehensively excellent image, that is, to select an image in which a main object is in the center of composition, or an image having a good focus position.

In addition, as technology for automatically evaluating a comprehensively excellent image from photographed images, for example, it is possible to employ an evaluation process disclosed in Japanese Unexamined Patent Application Publication No. 2010-119097.

Using the technology, it is sufficient if a comprehensively excellent image is selected from the right and left images as the input of the stereoscopic image generation processing unit.

In addition, in FIG. 32, the setting of the stereoscopic image generation processing unit from the stereoscopic conversion image selection processing unit 853 is indicated by a solid line and a dotted line as follows:

A case in which a left image is determined as an image to be subject to a stereoscopic conversion process is indicated by the solid line; and A case in which a right image is determined as an image to be subject to a stereoscopic conversion process is indicated by the dotted line.

Right and left input stereoscopic image pairs are input to the stereoscopic conversion image selection processing unit 853, and an image to be subject to the stereoscopic conversion process is selected.

In addition, even in this embodiment, it may be possible to employ a configuration in which an image not used in the stereoscopic conversion is prevented from being captured.

4. Conclusion of Configuration of the Present Disclosure

So far, the configurations of the present disclosure have been described in detail with reference to specific embodiments. However, it should be noted that various modifications and alternative embodiments will become apparent to those skilled in the art without departing the scope of the present disclosure. That is, it should be noted that the present disclosure is disclosed through embodiments and is not construed in a manner limited by these embodiments. In order to determine the scope of the present disclosure, it is necessary to consider the scope of the claims.

Additionally, the present technology may also be configured as below.

(1) An image processing apparatus including:
  an image input unit configured to receive at least one of a first left eye image and a first right eye image photographed from different viewpoints and applicable to stereoscopic vision; and
  a stereoscopic image generation processing unit configured to receive one of the first left eye image and the first right eye image and generate a second left eye image and a second right eye image applicable to the stereoscopic vision through an image conversion process,
  wherein, among the first left eye image and the first right eye image input to the image input unit and the second left eye image and the second right eye image generated by the stereoscopic image generation processing unit, two images are output as images to be applied to the stereoscopic vision.

(2) The image processing apparatus according to (1), including:
  an output image selection processing unit configured to select two images to be applied to the stereoscopic vision as output images from the first left eye image and the first right eye image input to the image input unit and the second left eye image and the second right eye image generated by the stereoscopic image generation processing unit.

(3) The image processing apparatus according to (1) or (2), including:
  a depth map generation processing unit configured to receive the first left eye image and the first right eye image, calculate object distances photographed in the images based on analysis of the two input images, generate a depth map having distance information corresponding to a pixel area, and output the depth map to the output image selection processing unit.

(4) The image processing apparatus according to any one of (1) to (3), wherein the output image selection processing unit selects
  the first left eye image and the first right eye image input to the image input unit as the output images when it is determined that the object distance is relatively longer based on the depth map, and
  the second left eye image and the second right eye image generated by the stereoscopic image generation processing unit as the output images when it is determined that the object distance is relatively shorter based on the depth map.

(5) The image processing apparatus according to any one of (1) to (4), wherein the output image selection processing unit selects
  the first left eye image and the first right eye image input to the image input unit as the output images when it is determined that the object distance is relatively longer based on the depth map,
  the second left eye image and the second right eye image generated by the stereoscopic image generation processing unit as the output images when it is determined that the object distance is relatively shorter based on the depth map, and
  one of the first left eye image and the first right eye image input to the image input unit and one of the second left eye image and the second right eye image generated by the stereoscopic image generation processing unit as the output images when it is determined that the object distance is approximately intermediate based on the depth map.

(6) The image processing apparatus according to any one of (1) to (5), wherein the output image selection processing unit is configured to select the output images based on at least one of imaging information from an imaging apparatus and user selection information.

(7) The image processing apparatus according to any one of (1) to (6), including:
  an input image selection processing unit configured to control images, which are to be input from an exterior, according to output images from the image processing apparatus,
  wherein, when the output images from the image processing apparatus are the second left eye image and the second right eye image generated by the stereoscopic image generation processing unit, the input image selection processing unit performs control of receiving only one of the first left eye image and the first right eye image photographed from different viewpoints and applicable to the stereoscopic vision.

(8) The image processing apparatus according to any one of (1) to (7), wherein,
when the output images from the image processing apparatus are the second left eye image and the second right eye image generated by the stereoscopic image generation processing unit, the input image selection processing unit outputs a control signal for allowing only one of the first left eye image and the first right eye image photographed from different viewpoints and applicable to the stereoscopic vision to be photographed by an imaging apparatus.

(9) The image processing apparatus according to any one of (1) to (8), wherein the stereoscopic image generation processing unit generates the second left eye image and the second right eye image applicable to the stereoscopic vision by performing an image conversion process on one of the first left eye image and the first right eye image, which is selected based on a result of an image evaluation process.

Moreover, a processing method performed in the above-mentioned apparatus and the like or a program for executing processes is included in the configuration of the present disclosure.

Furthermore, a series of processes described in the specification can be performed by hardware, software, or a composite configuration thereof. When the processes are performed by software, a program recording a process sequence can be performed after being installed in a computer memory embedded in dedicated hardware, or the program can be performed after being installed in a general purpose computer capable of performing various processes. For example, the program can be recorded on a recording medium in advance. In addition to the installation from a recording medium to a computer, the program can be received through a network such as a local area network (LAN) or the Internet, and can be installed on a recording medium such as an embedded hard disk.

In addition, various processes described in the specification may not only be performed in time series according to a description, but may also be performed in a parallel or individual manner according to processing capability of an apparatus for performing processes or necessity. Furthermore, the system in the present specification corresponds to a logical aggregate configuration of a plurality of apparatuses and the apparatus of each configuration need not be in the same housing.

So far, as described above, according to an embodiment of the present disclosure, a configuration for selecting and outputting an image suitable for stereoscopic vision is achieved.

In detail, the configuration includes an image input unit configured to receive at least one of a first left eye image and a first right eye image photographed from different viewpoints and applicable to stereoscopic vision, and a stereoscopic image generation processing unit configured to receive one of the first left eye image and the first right eye image and generate a second left eye image and a second right eye image applicable to the stereoscopic vision through an image conversion process, wherein, when it is determined that an object distance is relatively long based on a depth map having distance information corresponding to an image area, the first left eye image and the first right eye image input to the image input unit are selected and output as output images. Furthermore, when it is determined that the object distance is relatively short, the second left eye image and the second right eye image generated by the stereoscopic image generation processing unit are selected and output as the output images.

With such a configuration, it is possible to reduce fatigue due to very large parallax when the stereoscopic vision is obtained, or discomfort due to occlusion, such that comfortable stereoscopic vision can be obtained.

It should be understood by those skilled in the art that various modifications, combinations, sub-combinations and alterations may occur depending on design requirements and other factors insofar as they are within the scope of the appended claims or the equivalents thereof.

The present technology contains subject matter related to that disclosed in Japanese Priority Patent Application JP 2011-134929 filed in the Japan Patent Office on Jun. 17, 2011, the entire content of which is hereby incorporated by reference.

What is claimed is:

1. An image processing apparatus comprising:
an image input unit configured to receive at least one of a first left eye image and a first right eye image photographed from different viewpoints and applicable to stereoscopic vision;
a stereoscopic image generation processing unit configured to receive one of the first left eye image and the first right eye image and generate a second left eye image and a second right eye image applicable to the stereoscopic vision through an image conversion process,
wherein, among the first left eye image and the first right eye image input to the image input unit and the second left eye image and the second right eye image generated by the stereoscopic image generation processing unit, two images are output as images to be applied to the stereoscopic vision; and
an output image selection processing unit configured to select two images to be applied to the stereoscopic vision as output images from the first left eye image and the first right eye image input to the image input unit and the second left eye image and the second right eye image generated by the stereoscopic image generation processing unit, wherein the output image selection processing unit selects using a depth map:
the first left eye image and the first right eye image input to the image input unit as the output images when it is determined that the object distance is greater than a first predetermined threshold based on the depth map, and
the second left eye image and the second right eye image generated by the stereoscopic image generation processing unit as the output images when it is determined that the object distance is less than a second predetermined threshold on the depth map.

2. The image processing apparatus according to claim 1, comprising:
a depth map generation processing unit configured to receive the first left eye image and the first right eye image, calculate object distances photographed in the images based on analysis of the two input images, generate the depth map having distance information corresponding to a pixel area, and output the depth map to the output image selection processing unit.

3. The image processing apparatus according to claim 1, wherein the output image selection processing unit selects:
one of the first left eye image and the first right eye image input to the image input unit and one of the second left eye image and the second right eye image generated by the stereoscopic image generation processing unit as the output images when it is determined that the object distance is between the first predetermined threshold and the second predetermined threshold based on the depth map.

4. The image processing apparatus according to claim 1, wherein the output image selection processing unit is configured to select the output images based on at least one of imaging information from an imaging apparatus and user selection information.

5. The image processing apparatus according to claim 1, comprising:
an input image selection processing unit configured to control images, which are to be input from an exterior, according to output images from the image processing apparatus, wherein, when the output images from the image processing apparatus are the second left eye image and the second right eye image generated by the stereoscopic image generation processing unit, the input image selection processing unit performs control of receiving only one of the first left eye image and the first right eye image photographed from different viewpoints and applicable to the stereoscopic vision.

6. The image processing apparatus according to claim 5, wherein,
when the output images from the image processing apparatus are the second left eye image and the second right eye image generated by the stereoscopic image generation processing unit, the input image selection processing unit outputs a control signal for allowing only one of the first left eye image and the first right eye image photographed from different viewpoints and applicable to the stereoscopic vision to be photographed by an imaging apparatus.

7. The image processing apparatus according to claim 1, wherein the stereoscopic image generation processing unit generates the second left eye image and the second right eye image applicable to the stereoscopic vision by performing an image conversion process on one of the first left eye image and the first right eye image, which is selected based on a result of an image evaluation process.

8. The image processing apparatus according to claim 1, wherein the first predetermined threshold and the second predetermined threshold are the same value.

9. The image processing apparatus according to claim 1, wherein the first predetermined threshold is greater than the second predetermined threshold.

10. An image processing method performed in an image processing apparatus, the image processing method comprising:
receiving at least one of a first left eye image and a first right eye image photographed from different viewpoints and applicable to stereoscopic vision;
receiving one of the first left eye image and the first right eye image and generating a second left eye image and a second right eye image applicable to the stereoscopic vision through an image conversion process; and
outputting, based on a depth map, two images as images to be applied to the stereoscopic vision from the first left eye image and the first right eye image input in the image input step and the second left eye image and the second right eye image generated by a stereoscopic image generation processing unit,
wherein the first left eye image and the first right eye image input to the image input unit are selected as the output images when it is determined that the object distance is greater than a first predetermined threshold based on the depth map, and
the second left eye image and the second right eye image generated by the stereoscopic image generation processing unit are selected as the output images when it is determined that the object distance is less than a second predetermined threshold on the depth map.

11. A non-transitory computer-readable medium having embodied thereon a program, which when executed by a processor of for causing an image processing apparatus causes the processor to perform image processing including:
receiving at least one of a first left eye image and a first right eye image photographed from different viewpoints and applicable to stereoscopic vision;
receiving one of the first left eye image and the first right eye image and generating a second left eye image and a second right eye image applicable to the stereoscopic vision through an image conversion process; and
outputting, based on a depth map, two images as images to be applied to the stereoscopic vision from the first left eye image and the first right eye image input in the image input step and the second left eye image and the second right eye image generated by a stereoscopic image generation processing unit,
wherein the first left eye image and the first right eye image input to the image input unit are selected as the output images when it is determined that the object distance is greater than a first predetermined threshold based on the depth map, and
the second left eye image and the second right eye image generated by the stereoscopic image generation processing unit are selected as the output images when it is determined that the object distance is less than a second predetermined threshold on the depth map.

* * * * *